US011536845B2

United States Patent
Gassend et al.

(10) Patent No.: US 11,536,845 B2
(45) Date of Patent: Dec. 27, 2022

(54) LIDAR SYSTEMS WITH MULTI-FACETED MIRRORS

(71) Applicant: Waymo LLC, Mountain View, CA (US)

(72) Inventors: Blaise Gassend, East Palo Alto, CA (US); Ralph H. Shepard, Menlo Park, CA (US); Samuel Lenius, Palo Alto, CA (US); Ryan Davis, Woodside, CA (US)

(73) Assignee: Waymo LLC, Mountain View, CA (US)

( * ) Notice: Subject to any disclaimer, the term of this patent is extended or adjusted under 35 U.S.C. 154(b) by 1007 days.

(21) Appl. No.: 16/235,564

(22) Filed: Dec. 28, 2018

(65) Prior Publication Data
US 2020/0132851 A1    Apr. 30, 2020

Related U.S. Application Data

(60) Provisional application No. 62/753,586, filed on Oct. 31, 2018.

(51) Int. Cl.
*G01S 17/931* (2020.01)
*G01C 3/06* (2006.01)
(Continued)

(52) U.S. Cl.
CPC .............. *G01S 17/931* (2020.01); *G01C 3/06* (2013.01); *G01S 7/4808* (2013.01);
(Continued)

(58) Field of Classification Search
None
See application file for complete search history.

(56) References Cited

U.S. PATENT DOCUMENTS 3,622,221 A    11/1971    Kossyk et al.
3,668,409 A    6/1972    Tuhro et al.
(Continued)

FOREIGN PATENT DOCUMENTS

CN    105973150 A    9/2016
CN    108351511 A  *  7/2018    ........... G02B 26/124
(Continued)

OTHER PUBLICATIONS

English version of JP-2003035880-A.*
(Continued)

*Primary Examiner* — Yuqing Xiao
*Assistant Examiner* — Jempson Noel
(74) *Attorney, Agent, or Firm* — McDonnell Boehnen Hulbert & Berghoff LLP

(57) ABSTRACT

Example embodiments relate to LIDAR systems with multi-faceted mirrors. An example embodiment includes a LIDAR system. The system includes a multi-faceted mirror that includes a plurality of reflective facets, which rotates about a first rotational axis. The system also includes a light emitter configured to emit a light signal toward one or more regions of a scene. Further, the system includes a light detector configured to detect a reflected light signal. In addition, the system includes an optical window positioned between the multi-faceted mirror and the one or more regions of the scene such that light reflected from one or more of the reflective facets is transmitted through the optical window. The optical window is positioned such that the optical window is non-perpendicular to the direction toward which the light emitted along the optical axis is directed for all angles of the multi-faceted mirror.

25 Claims, 27 Drawing Sheets

(51) Int. Cl.
  *G01S 17/10* (2020.01)
  *G01S 17/42* (2006.01)
  *G01S 7/481* (2006.01)
  *G01S 7/48* (2006.01)
  *G01S 17/89* (2020.01)

(52) U.S. Cl.
  CPC .......... *G01S 7/4813* (2013.01); *G01S 7/4815* (2013.01); *G01S 7/4816* (2013.01); *G01S 7/4817* (2013.01); *G01S 17/10* (2013.01); *G01S 17/42* (2013.01); *G01S 17/89* (2013.01)

(56) References Cited

U.S. PATENT DOCUMENTS

| | | | |
|---|---|---|---|
| 3,790,277 A | 2/1974 | Hogan | |
| 3,824,000 A | 7/1974 | Burns | |
| 4,043,632 A | 8/1977 | Jeffery et al. | |
| 4,099,591 A | 7/1978 | Carr | |
| 4,141,620 A | 2/1979 | Goshima et al. | |
| 4,601,554 A | 7/1986 | Plante et al. | |
| 4,700,301 A | 10/1987 | Dyke | |
| 4,709,195 A | 11/1987 | Hellekson et al. | |
| 4,875,764 A | 10/1989 | Marino et al. | |
| 4,966,427 A | 10/1990 | Parker | |
| 4,967,076 A | 10/1990 | Schuhmacher | |
| 4,993,823 A | 2/1991 | Schaffer et al. | |
| 5,006,721 A * | 4/1991 | Cameron | G01S 7/4811 250/559.16 |
| 5,162,951 A | 11/1992 | Sorce | |
| 5,173,797 A | 12/1992 | Zedekar et al. | |
| 5,202,742 A | 4/1993 | Frank et al. | |
| 5,687,017 A | 11/1997 | Katoh | |
| 5,716,036 A | 2/1998 | Isobe et al. | |
| 5,742,068 A | 4/1998 | Dybdahl et al. | |
| 5,748,356 A | 5/1998 | Park et al. | |
| 5,793,491 A | 8/1998 | Wangler | |
| 5,864,391 A | 1/1999 | Hosokawa et al. | |
| 6,069,726 A | 5/2000 | Hughes | |
| 6,219,168 B1 | 4/2001 | Wang | |
| 6,260,309 B1 | 7/2001 | Cliffton | |
| 6,427,916 B1 | 8/2002 | Ishii | |
| 6,542,227 B2 | 4/2003 | Jamieson et al. | |
| 6,650,407 B2 | 11/2003 | Jamieson et al. | |
| 7,089,114 B1 | 8/2006 | Huang | |
| 7,248,342 B1 | 7/2007 | Degnan | |
| 7,255,275 B2 | 8/2007 | Gurevich et al. | |
| 7,901,090 B2 | 3/2011 | Kao | |
| 7,969,558 B2 | 6/2011 | Hall | |
| 8,000,181 B2 | 8/2011 | Yamada | |
| 8,027,029 B2 | 9/2011 | Lu et al. | |
| 8,050,863 B2 | 11/2011 | Trepagnier et al. | |
| 8,072,581 B1 | 12/2011 | Breiholz | |
| 8,686,899 B2 | 4/2014 | Jakab et al. | |
| 8,810,796 B2 | 8/2014 | Hays et al. | |
| 8,836,922 B1 | 9/2014 | Pennecot et al. | |
| 9,041,915 B2 | 5/2015 | Earhart | |
| 9,086,488 B2 | 7/2015 | Tchoryk, Jr. et al. | |
| 9,164,511 B1 | 10/2015 | Ferguson et al. | |
| 9,378,554 B2 | 6/2016 | Chang | |
| 9,618,742 B1 | 4/2017 | Droz et al. | |
| 9,625,582 B2 | 4/2017 | Gruver et al. | |
| 9,778,364 B2 | 10/2017 | Gruver et al. | |
| 9,864,063 B2 | 1/2018 | Gruver et al. | |
| 10,001,551 B1 * | 6/2018 | Gassend | G01S 7/4814 |
| 10,324,170 B1 * | 6/2019 | Engberg, Jr. | G02B 26/0816 |
| 2002/0015211 A1 | 2/2002 | Matsui et al. | |
| 2004/0212863 A1 | 10/2004 | Schanz et al. | |
| 2006/0227317 A1 * | 10/2006 | Henderson | G01S 17/89 356/28 |
| 2007/0201027 A1 | 8/2007 | Doushkina et al. | |
| 2007/0291130 A1 | 12/2007 | Broggi et al. | |
| 2008/0059015 A1 | 3/2008 | Whittaker | |
| 2008/0174761 A1 | 7/2008 | Zhao | |
| 2008/0260312 A1 | 10/2008 | Nishino et al. | |
| 2010/0020306 A1 | 1/2010 | Hall | |
| 2011/0097014 A1 | 4/2011 | Lin | |
| 2011/0170399 A1 * | 7/2011 | Chang | G01D 5/3473 369/112.23 |
| 2011/0196568 A1 | 8/2011 | Nickolaou et al. | |
| 2011/0216304 A1 | 9/2011 | Hall | |
| 2011/0239421 A1 | 10/2011 | Tertitski et al. | |
| 2012/0044476 A1 | 2/2012 | Earhart et al. | |
| 2012/0092645 A1 | 4/2012 | Inokuchi | |
| 2012/0236379 A1 | 9/2012 | da Silva et al. | |
| 2013/0103298 A1 | 4/2013 | Becker et al. | |
| 2013/0182245 A1 | 7/2013 | Yasunaga et al. | |
| 2013/0242285 A1 | 9/2013 | Zeng | |
| 2013/0245877 A1 | 9/2013 | Ferguson et al. | |
| 2014/0204385 A1 | 7/2014 | Ouyang et al. | |
| 2014/0240691 A1 | 8/2014 | Mheen et al. | |
| 2014/0332676 A1 | 11/2014 | Bayha et al. | |
| 2014/0347470 A1 | 11/2014 | Zhang et al. | |
| 2015/0131080 A1 | 5/2015 | Retterath et al. | |
| 2015/0331111 A1 | 11/2015 | Newman et al. | |
| 2016/0104289 A1 | 4/2016 | Chang | |
| 2016/0306029 A1 * | 10/2016 | Lundquist | G01S 17/08 |
| 2016/0307447 A1 | 10/2016 | Johnson | |
| 2018/0120421 A1 | 5/2018 | Holleczek et al. | |
| 2018/0172804 A1 | 6/2018 | Gassend et al. | |
| 2018/0231644 A1 | 8/2018 | Gassend et al. | |
| 2019/0154889 A1 * | 5/2019 | McWhirter | H01L 25/167 |

FOREIGN PATENT DOCUMENTS

| | | |
|---|---|---|
| EP | 3078984 B1 | 10/2016 |
| JP | S52-107576 U | 8/1977 |
| JP | 2003035880 A * | 2/2003 |
| JP | 2011-149760 A | 8/2011 |
| JP | 2012-068243 A | 4/2012 |
| JP | 2012-141191 A | 7/2012 |
| JP | 2012-225821 A | 11/2012 |
| KR | 10-1814135 B1 | 1/2018 |
| WO | 2014190208 | 11/2014 |
| WO | 2018-071043 A1 | 4/2018 |

OTHER PUBLICATIONS

English version of CN 108351511 A (Year: 2018).*
https://www.photofab.co.uk/products/encoder-discs-and-actuators.*
PCT International Search Report and Written Opinion, PCT International Application No. PCT/US2019/054982, dated Feb. 25, 2020, 10 pages.
Vantech Precision Technology Co., Ltd.—Encoder Disc, retrieved from URL: https://vantech.en.alibaba.com/product/711045220-215587756/encoder_disc.html?spm=a2700.icbuShop.41413.28.6d623b72A2J9ZN; retrieved on Dec. 19, 2018.
International Search Report and Written Opinion of International Application No. PCT/US20161019229, dated Jun. 16, 2016.
Written Opinion, International Application No. PCT/US2017/067037, dated Apr. 16, 2018.

* cited by examiner

LIDAR SYSTEMS WITH MULTI-FACETED MIRRORS

CROSS-REFERENCE TO RELATED APPLICATIONS

The present application hereby incorporates by reference U.S. patent application Ser. No. 15/445,971, U.S. patent application Ser. No. 13/790,934, U.S. patent application Ser. No. 14/668,452, U.S. patent application Ser. No. 15/455,009, U.S. patent application Ser. No. 15/493,066, U.S. patent application Ser. No. 15/383,842, U.S. patent application Ser. No. 15/951,491, and U.S. patent application Ser. No. 16/229,182. The present application claims priority to U.S. Provisional Patent Application No. 62/753,586 filed on Oct. 31, 2018, the contents of which are hereby incorporated by reference.

BACKGROUND

Unless otherwise indicated herein, the materials described in this section are not prior art to the claims in this application and are not admitted to be prior art by inclusion in this section.

Vehicles can be configured to operate in an autonomous mode in which the vehicle navigates through an environment with little or no input from a driver. Such autonomous vehicles can include one or more sensors that are configured to detect information about the environment in which the vehicle operates.

Light detection and ranging (LIDAR) devices may estimate distances to objects in a given environment. For example, an emitter subsystem of a LIDAR system may emit near-infrared light pulses, which may interact with objects in the LIDAR system's environment. At least a portion of the light pulses may be redirected back toward the LIDAR (e.g., due to reflection or scattering) and detected by a receiver subsystem. Conventional receiver subsystems may include a plurality of detectors and a corresponding controller configured to determine an arrival time of the respective light pulses with high temporal resolution (e.g., ~400 ps). The distance between the LIDAR system and a given object may be determined based on a time of flight of the corresponding light pulses that interact with the given object.

SUMMARY

Embodiments described herein may include LIDAR systems having light emitter(s) and light detector(s), as well as a rotating mirror configured to direct a light signal from the light emitter through an optical window and toward a surrounding environment. Upon reflection from the surrounding environment, the light signal may travel back through the optical window and toward the light detector. Spurious light detected by the light detector can lead to inaccuracies in determined distances to and/or determined locations of objects within a scene. To prevent spurious light from being detected by the LIDAR system, example embodiments may include baffles that reduce internal reflections that would otherwise cause spurious light detections by the light detector. Additionally or alternatively, the optical window may be angled with respect to the rotating mirror to reduce reflections from an interior side of the optical window from reaching the light detector. Still further, the rotating mirror may be flanked by one or more baffles that absorb spurious light signals and/or improve mechanical qualities of the rotating mirror. External light (e.g., sunlight) can also give rise to thermal expansion within the LIDAR system. To reduce the amount of exterior light entering the LIDAR system, some embodiments may include one or more optical filters on an exterior side of the optical window.

In one aspect, a light detection and ranging (LIDAR) system is provided. The LIDAR system includes a multi-faceted mirror that includes a plurality of reflective facets. The multi-faceted mirror is configured to rotate about a first rotational axis. The LIDAR system also includes a light emitter configured to emit a light signal along an optical axis. Light emitted along the optical axis is reflected from one or more of the reflective facets and is directed toward one or more regions of a scene. Further, the LIDAR system includes a light detector configured to detect a reflected light signal that is reflected by the one or more regions of the scene. A direction toward which the light emitted along the optical axis is directed is based on a first angle of the multi-faceted mirror about the first rotational axis. Even further, the LIDAR system includes an optical window positioned between the multi-faceted mirror and the one or more regions of the scene such that light reflected from one or more of the reflective facets and directed toward the one or more regions of the scene is transmitted through the optical window. The optical window is positioned such that, for all values of the first angle of the multi-faceted mirror about the first rotational axis as the multi-faceted mirror rotates about the first rotational axis, the optical window is non-perpendicular to the direction toward which the light emitted along the optical axis is directed.

In another aspect, a light detection and ranging (LIDAR) system is provided. The LIDAR system includes a multi-faceted mirror that includes a plurality of reflective facets. The multi-faceted mirror is configured to rotate about a first rotational axis. The LIDAR system also includes a light emitter configured to emit a light signal along an optical axis. Light emitted along the optical axis is reflected from one or more of the reflective facets and is directed to one or more regions of a scene. Further, the LIDAR system includes a light detector configured to detect a reflected light signal that is reflected by the one or more regions of the scene. A direction toward which the light emitted along the optical axis is directed is based on a first rotational angle of the multi-faceted mirror about the first rotational axis. Even further, the LIDAR system includes an optical window positioned between the multi-faceted mirror and the one or more regions of the scene such that light reflected from one or more of the reflective facets and directed toward the one or more regions of the scene is transmitted through the optical window. Yet further, the LIDAR system includes a filter covering at least a portion of an exterior side of the optical window. The filter reduces transmission of at least some wavelengths that are not produced by the light emitter.

In an additional aspect, a light detection and ranging (LIDAR) system is provided. The LIDAR system includes a multi-faceted mirror that includes a plurality of reflective facets. The multi-faceted mirror is configured to rotate about a first rotational axis. The LIDAR system also includes a light emitter configured to emit a light signal along an optical axis. Light emitted along the optical axis is reflected from one or more of the reflective facets and is directed to one or more regions of a scene. Further, the LIDAR system includes a light detector configured to detect a reflected light signal that is reflected by the one or more regions of the scene. A direction toward which the light emitted along the optical axis is directed is based on a first rotational angle of the multi-faceted mirror about the first rotational axis. Even further, the LIDAR system includes an optical window positioned between the multi-faceted mirror and the one or more regions of the scene such that light reflected from one or more of the reflective facets and directed toward the one or more regions of the scene is transmitted through the optical window. Yet further, the LIDAR system includes one or more baffles positioned adjacent to one or more non-reflective sides of the multi-faceted mirror. The one or more baffles are configured to reduce an amount of power used to rotate the multi-faceted mirror about the first rotational axis.

In yet another aspect, a light detection and ranging (LIDAR) system is provided. The LIDAR system includes a multi-faceted mirror that includes a plurality of reflective facets. The multi-faceted mirror is configured to rotate about a first rotational axis. The LIDAR system also includes a light emitter configured to emit a light signal along an optical axis. Light emitted along the optical axis is reflected from one or more of the reflective facets and is directed toward one or more regions of a scene. Further, the LIDAR system includes a light detector configured to detect a reflected light signal that is reflected by the one or more regions of the scene. A direction toward which the light emitted along the optical axis is directed is based on a first angle of the multi-faceted mirror about the first rotational axis. Even further, the LIDAR system includes an optical window positioned between the multi-faceted mirror and the one or more regions of the scene such that light reflected from one or more of the reflective facets and directed toward the one or more regions of the scene is transmitted through the optical window. The optical window is positioned such that, for all values of the first angle of the multi-faceted mirror about the first rotational axis as the multi-faceted mirror rotates about the first rotational axis, the optical window is non-perpendicular to the direction toward which the light emitted along the optical axis is directed. Still further, the LIDAR system includes one or more baffles positioned adjacent to one or more non-reflective sides of the multi-faceted mirror. The one or more baffles are configured to reduce an amount of power used to rotate the multi-faceted mirror about the first rotational axis.

These as well as other aspects, advantages, and alternatives will become apparent to those of ordinary skill in the art by reading the following detailed description, with reference, where appropriate, to the accompanying drawings.

DETAILED DESCRIPTION

Figure 1:
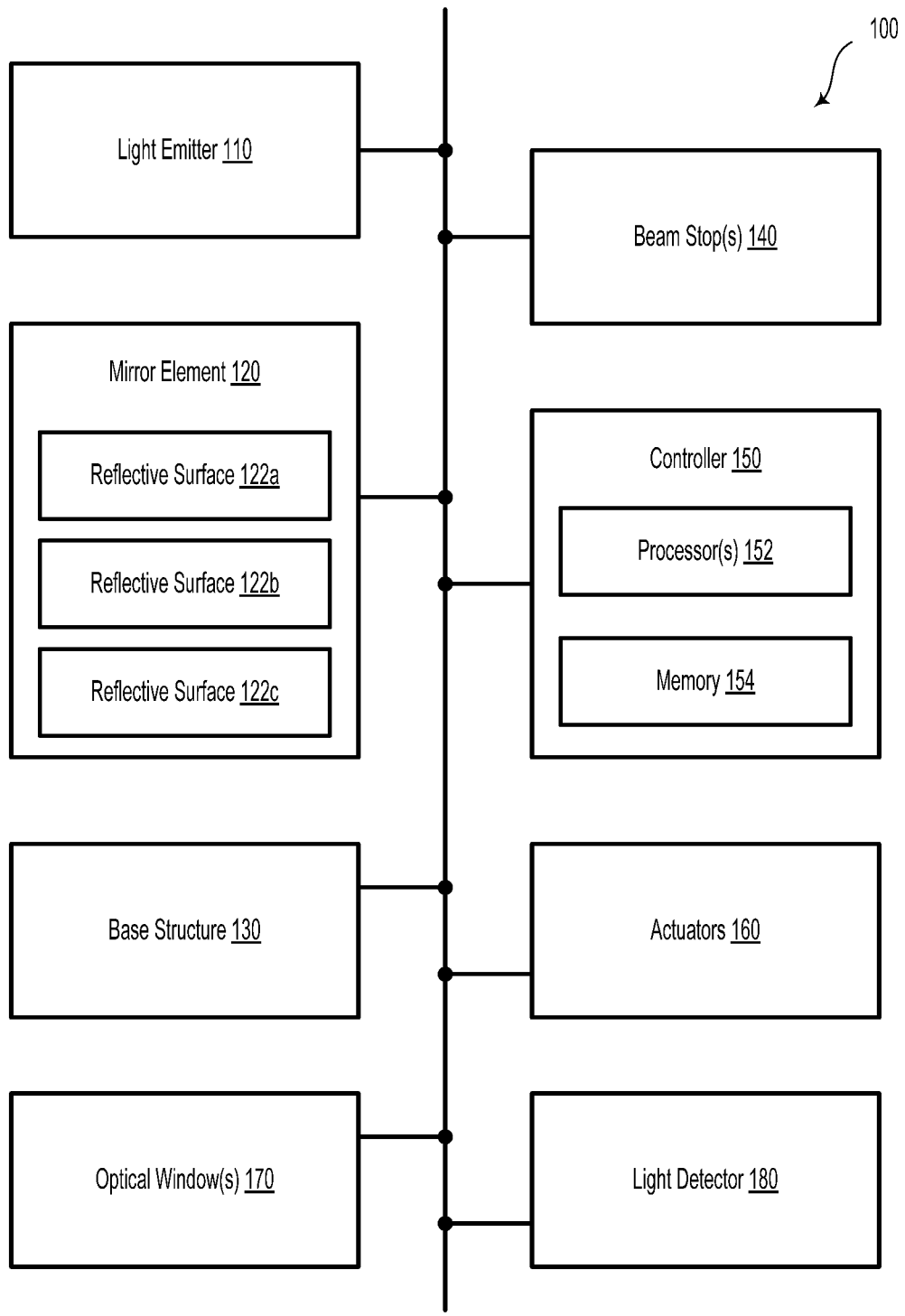
FIG. 1 is an illustration of a system, according to example embodiments.

Example methods and systems are contemplated herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the figures should not be viewed as limiting. It should be understood that other embodiments might include more or less of each element shown in a given figure. Further, some of the illustrated elements may be combined or omitted. Yet further, an example embodiment may include elements that are not illustrated in the figures.

I. OVERVIEW

An example LIDAR system may include a single light emitter and a single light detector (alternate embodiments may include additional light emitters and/or light detectors).

The single light emitter may emit light (alternatively referred to as a "primary signal") that is reflected toward a surrounding environment/scene by a rotating, multi-faceted mirror (e.g., a rotating triangular mirror having three facets). The light may be transmitted through an optical window (e.g., a slab of glass or plastic that is approximately 1 mm in thickness) before being transmitted to the environment/scene. Upon reflection of a portion of the light transmitted from the LIDAR system by an object in the environment, reflected light (i.e., a "reflected primary signal") may be transmitted back through the optical window and may be directed to the single light detector for light detection. Directing the reflected light back to the single light detector may include reflecting the light toward the single light detector off of the rotating, multi-faceted mirror, for example. Based on the timing of the detected light and/or the position of the rotating, multi-faceted mirror, a distance to and/or location of the target may be determined.

In some cases, after light is emitted from the single light emitter and prior to the emitted light being transmitted through the optical window, a portion of the emitted light may be reflected off an interior side of the optical window. This may occur if the optical window material has a non-zero reflectance or if one or more substances (e.g., dust or water) are present on the interior side of the optical window, for example. The internally reflected light (alternatively referred to as a "ghost signal") may be inadvertently directed to a different region of the scene than the region of the scene to which the primary signal is directed. Upon being reflected from the different region of the scene, the reflected ghost signal may then be directed back to the single light detector (e.g., after reflecting off of the multi-faceted mirror) and detected. Because the different region of the scene may be at a different distance from the LIDAR system than the region of the scene to which the primary signal is directed, the detected ghost signal might lead to errors in determined target distances. For example, a three-dimensional point cloud intended to be representative of a scene could be inaccurate based on the detection of ghost signals.

Errors might arise because the light detector is detecting light at an incorrect or unexpected time. This could lead to an incorrect determination that a target is closer to or farther from the LIDAR system than it actually is. Additionally or alternatively, a ghost beam (which, we reflected/detected corresponds to a ghost signal) may be internally reflected off of additional components within the LIDAR system. For example, in some embodiments of the LIDAR system, there may be a second optical window on an opposing side of the rotating, multi-faceted mirror (e.g., for transmitting emitted light toward the scene when such light is reflected from a back-facing facet of the rotating, multi-faceted mirror rather than a front-facing facet). Further, as the ghost beam travels from the interior side of an optical window toward an exterior side of the optical window, the ghost beam may be reflected from either or both surfaces of the optical window (e.g., the reflection can occur at the air-to-glass interface as the ghost beam enters the optical window or the glass-to-air interface as the ghost beam leaves the optical window). These additional internal reflections can lead to an improperly determined distance relative to the LIDAR system (and, correspondingly, an improperly determined vertical position within the scene) of objects within the scene as such additional reflections increase the round-trip travel time of the ghost beam, thereby increasing the time between emission by the light emitter and detection by the light detector (the round-trip travel time being used to determine distance to an object). In still other cases, ghost beams may be internally reflected multiple times off of the rotating mirror and/or the interior side of the optical window before being transmitted to the scene and ultimately reflected from the scene back toward the LIDAR system. Such reflections may cause incorrect distances to objects or incorrect positions of objects to be determined and/or may result in false positives (e.g., the detection of an object when an object is actually not present in the surrounding scene).

Embodiments disclosed herein are used to address the issues arising from detecting ghost signals. In various embodiments, ghost signals may be reduced in intensity, eliminated entirely, or blocked (in whole or in part) from being detected by the single light detector. In one approach, baffles (e.g., circular baffles) are positioned on the edge(s) of the rotating, multi-faceted mirror. Such baffles may be absorptive (e.g., may be black in color and/or specifically designed to absorb the wavelength of light emitted by the light emitter) and thereby able to reduce ghost beams from propagating to the light detector. The baffles may be fabricated from blackened steel or aluminum, for example. Further, the baffles may extend between 0.5 mm and 3.0 mm (e.g., 1.0 mm) away from the edges of the rotating, multi-faceted mirror, in various embodiments. In some embodiments, the baffles may be regions of a disk (e.g., a disk having thickness between 5.0 mm and 10.0 mm and/or radius between 5.0 mm and 10.0 mm) attached to a non-faceted side (i.e., end or base) of the rotating, multi-faceted mirror, where the regions of the disk overhang the edges of the rotating, multi-faceted mirror. As such, the baffles may be arc-shaped relative to the rotating mirror facets. In other embodiments, rather than a disk, the baffles may be regions of a hemispherically shaped component attached to a non-faceted side of the rotating, multi-faceted mirror.

In addition to optical functions, the baffles may enhance the mechanical properties of the rotating, multi-faceted mirror and/or the LIDAR system. For example, the baffles may reduce the vibration of the multi-faceted mirror when the multi-faceted mirror is rotating about a drive shaft connected to a motor (e.g., thereby reducing the sound produced when the multi-faceted mirror is being driven by the motor). Additionally or alternatively, the baffles may enhance the aerodynamic properties of the multi-faceted mirror (e.g., by blocking a transverse path for air to flow across the multi-faceted mirror and/or by streamlining air flowing in the rotational direction of the multi-faceted mirror). Such enhanced aerodynamic properties may reduce the drag force produced on the multi-faceted mirror, thereby reducing the amount of power needed by the motor to drive the multi-faceted mirror. To further increase the aerodynamic properties of the LIDAR system, in some embodiments, a chamber in which the multi-faceted mirror rotates may be evacuated, thereby producing a vacuum and eliminating all drag forces. Other methods of enhancing the mechanical properties of the rotating, multi-faceted mirror are also possible.

In addition to or instead of baffles on the edge(s) of the rotating, multi-faceted mirror, one or more baffles could be placed in between the rotating, multi-faceted mirror and the optical window to reduce ghost beams from propagating to the single light detector. Baffles may be offset from the center of the rotating mirror such that the baffles intercept ghost beams but do not inhibit propagation of the primary signal. In still other embodiments, the optical windows may be tilted (e.g., between 5°-15°) horizontally and/or vertically with respect to the rotating, multi-faceted mirror. The optical windows may be tilted symmetrically (e.g., both +5°), exactly oppositely (e.g., one +5° and one −5°), or simply differently (e.g., one +5° and one +2°). Tilting the optical windows could prevent internal reflections from being aligned with the optical detector, thereby preventing a detection of ghost signals by the optical detector. Additionally or alternatively, tilting the optical windows could prevent ghost signals due to reflected beams from making it to the scene. Other methods of reducing or eliminating ghost signal detection are also possible.

In addition to light emitted by the light emitter, ambient light (e.g., light within an environment of the LIDAR system that was not transmitted by the LIDAR system) may enter the interior of the LIDAR system through the optical window. Ambient light may include sunlight, for example. Such ambient light can be absorbed by one or more components within the LIDAR system (e.g., the light detector, the light emitter, one or more mirrors, the optical window, an optical cavity, optical lenses, etc.). Absorption of ambient light within the LIDAR system can lead to the heating of one or more components of the LIDAR system. Consequently, heating can adversely affect alignment (e.g., through thermal expansion of one or more components, such as mirrors, lenses, or optical windows) or other optical properties (e.g., linewidth of a laser or resonant wavelength of an optical cavity) of the LIDAR system. In extreme cases, heating could also lead to degradation of components within the LIDAR system (e.g., melting plastic components within the LIDAR system).

One way of mitigating the adverse effects of stray light within the LIDAR system includes coating exterior components of the LIDAR system (e.g., optical windows) with an optical filter. The optical filter may be optimized to have a predefined reflectivity (e.g., 25%, 50%, 75%, 90%, 95%, 99%, 99.9%, etc.) for wavelengths other than the wavelength emitted by the light emitter (e.g., wavelengths in the visible spectrum).

In some embodiments, for example, one or more portions of the exterior of the LIDAR system may be covered by a dichroic window. For example, exterior sides of one or more optical windows of the LIDAR system may be covered, either partially or entirely, by one or more dichroic windows. In some embodiments, the dichroic windows may be optimized to transmit light of the wavelength emitted by the light emitter (e.g., laser light at 1.55 μm or 905 nm) and/or optimized to block light having wavelengths other than the wavelength emitted by the light emitter. Additionally or alternatively, the dichroic windows may be optimized to reflect light within the visible spectrum and/or the solar spectrum. In some embodiments, the dichroic windows may be characterized by an average reflectivity value (e.g., 50% reflectivity) throughout the visible spectrum. In some embodiments, such dichroic windows may constitute a relatively inexpensive technique of mitigating internal heating of the LIDAR system, of obscuring from view components internal to the LIDAR system, and/or of improving an aesthetic appearance of the LIDAR system (e.g., due to a mirror-like appearance of the window surfaces). Other techniques of mitigating undesirable ambient light are also possible.

II. EXAMPLE SYSTEMS

The following description and accompanying drawings will elucidate features of various example embodiments. The embodiments provided are by way of example, and are not intended to be limiting. As such, the dimensions of the drawings are not necessarily to scale.

FIG. 1 illustrates a system 100, according to an example embodiment. The system 100 may be, or may represent a portion of, a LIDAR system. In example embodiments, system 100 may be a LIDAR system configured to provide information about an environment. For example, system 100 may be a LIDAR system for an autonomous vehicle (e.g., a self-driving car, an autonomous drone, an autonomous truck, an autonomous boat, an autonomous submarine, an autonomous helicopter, etc.) or a vehicle operating in an autonomous mode or semi-autonomous mode. The system 100 may be used for navigation and/or object detection and avoidance, in various embodiments. In some embodiments, the system 100 may provide point cloud information, object information, mapping information, terrain information, or other information to the vehicle. Alternatively, the system 100 may be used for other computer vision purposes (e.g., unrelated to vehicles).

System 100 includes a light emitter 110. The light emitter 110 may include a laser (e.g., a laser diode), a light-emitting diode (LED), or an array of lasers and/or LEDs, in various embodiments. Other light emitters 110 are also possible. The light emitted by the light emitter 110 may be modulated at a predetermined frequency, in some embodiments. In example embodiments, the light emitter 110 may be operable to emit light along a first axis (e.g., an optical axis). In some embodiments, the light emitter 110 may include any light source configured to provide substantially collimated and/or coherent light. For instance, the light emitter 110 could be a semiconductor waveguide laser, a fiber laser, an excimer laser, a laser diode, a gas laser, a vertical cavity surface emitting laser (VCSEL), or another type of laser system. In order to produce collimated light, the light emitter 110 may include one or more lenses (e.g., a fast axis collimating (FAC) lens), in some embodiments. Further, the light emitter 110 may be disposed on one or more substrates (e.g., a printed circuit board (PCB) or a flexible PCB).

In example embodiments, the light emitted from the light emitter 110 may include pulses of laser light. For instance, the laser light pulses may have durations in the 1-100 nanosecond range. However, other laser light pulse durations are also possible. The energy in the laser light pulses may be between 100 nanojoules and 200 nanojoules, for example. Other pulse energies are also possible. In some embodiments, the peak power of the light emitted by the light emitter 110 may be between 50 and 100 nanowatts. Other peak powers are also possible.

The light emitted by the light emitter 110 may have an emission wavelength within the infrared (IR) wavelength range, however other wavelengths are contemplated. For example, the emission wavelength could be in the visible wavelength spectrum or the ultraviolet (UV) wavelength spectrum. In an example embodiment, the emission wavelength may be about 905 nanometers. Alternatively, the emission wavelength could be about 1.55 microns. Further, in some embodiments, the emission wavelength and power of the light emitter 110 may satisfy conditions for use as a Class 1 laser under the International Electrotechnical Commission (IEC) 60825-1 standard (i.e., the maximum permissible exposure (MPE) is not exceeded when the light emitter 110 is viewed with the naked eye or with the aid of magnifying optics).

System 100 also includes a mirror element 120 with a plurality of reflective surfaces 122. The mirror element 120 may be alternatively referred to herein as a "multi-faceted mirror." Similarly, the plurality of reflective surfaces 122 may be alternatively referred to herein as a plurality of reflective facets. The reflective surfaces 122 may be configured to reflect light of the emission wavelength. In some embodiments, the reflective surfaces 122 may be formed from, and/or coated with, a metal, such as aluminum, gold, silver, or another reflective material. Additionally or alternatively, the reflective surfaces 122 may include a high-reflectance (HR) coating. In an example embodiment, the HR coating may include a dielectric stack configured to reflect incident light at the emission wavelength. The dielectric stack may include, for example, a periodic layer system alternating between two materials having different indices of refraction. Other types of HR coatings are possible and contemplated herein.

In some example embodiments, the mirror element 120 may include three reflective surfaces 122a, 122b, and 122c. Mirror elements 120 having more or less reflective surfaces 122 are contemplated. For example, the mirror element 120 could include four or more reflective surfaces.

The mirror element 120 is configured to rotate about a second axis. Furthermore, in some embodiments, the plurality of reflective surfaces may be disposed about the second axis. In such scenarios, the mirror element 120 may be prism-shaped and each facet of the prism shape may be a reflective surface 122. In other words, the reflective surfaces 122a, 122b, and 122c may be arranged symmetrically about the second axis such that the mirror element 120 has a triangular prism shape. As an example, the first axis and the second axis may be perpendicular with respect to one another, however other arrangements of the first axis and the second axis are contemplated. In some embodiments, the first axis may intersect with the second axis.

System 100 may additionally include a base structure 130. The mirror element 120 and the light emitter 110 may be coupled to the base structure 130. In some embodiments, the base structure 130 may be configured to rotate about a third axis. While a variety of arrangements of the third axis are contemplated, an example embodiment includes the third axis being parallel to or collinear with the first axis.

System 100 further includes one or more beam stops 140. The beam stop(s) 140 may be configured to prevent laser light from being reflected into the environment at angles outside a predetermined emission angle range. Additionally or alternatively, beam stop(s) 140 may be positioned so as to prevent multiple simultaneous readings/signals. In example embodiments, the emission angle range could be expressed as the range of angles with respect to the mirror element 120 that may receive laser light emission from system 100. In other words, the emission angle range may represent the angles from which ranging information may be obtained from the environment around the system 100. In some embodiments, the emission angle range may be defined with respect to the second axis. In such scenarios, the emission angle range may be greater than 240 degrees.

The system 100 includes a controller 150 configured to carry out operations. In example embodiments, the controller 150 may include one or more logic blocks, a programmable logic device (PLD), a field programmable gate array (FPGA), and/or an application-specific integrated circuit (ASIC). Other types of controller circuits are contemplated in the present disclosure (e.g., a laptop computing device, a desktop computing device, a server computing device, a tablet computing device, a mobile computing device, a cloud computing device, etc.). In some embodiments, for example, the controller circuit may be located remotely from system 100 (e.g., when the controller circuit is contained in a cloud computing device or a mobile computing device).

In some embodiments, the controller 150 may include one or more processors 152 (e.g., a central processing unit (CPU), a digital signal processor (DSP), a network processor, etc.) and a memory 154 (e.g., a cloud server, a random access memory (RAM), a read-only memory (ROM), a hard drive, a programmable read-only memory (PROM), erasable programmable read-only memory (EPROM), electrically erasable programmable read-only memory (EEPROM), non-volatile memory, a solid state drive (SSD), a hard disk drive (HDD), a compact disc (CD), a digital video disk (DVD), a digital tape, a read/write (RW) CD, an RW DVD, etc.). In such scenarios, the processor(s) 152 may be configured to execute instructions stored in the memory 154 so as to carry out the operations. Alternatively, the operations performed by the processor(s) 152 may be defined by hardware, firmware, and/or any combination of hardware, firmware, and software. The controller 150 may be configured to control a transmit portion of the system 100 and/or a receive portion of the system 100. For example, in embodiments where the system 100 includes one or more light detectors, the controller 150 may receive data from the one or more light detectors and use the data to make determinations about an environment surrounding the system 100 (e.g., perform object detection and avoidance of any objects present in the environment).

The operations may include causing the mirror element 120 to rotate about the second axis. As an example, the mirror element 120 may rotate about the second axis at rotational frequency $\Omega$. The rotation about the second axis includes a first angular range and a second angular range. In some embodiments, the mirror element 120 may rotate about the second axis at a rotational frequency of about 30 kRPM. Other rotational frequencies of mirror element 120 are possible. For example, the mirror element 120 may rotate about the second axis within a rotational frequency range between 100 RPM and 100 kRPM.

The operations may also include causing the light emitter 110 to emit laser light along the first axis such that the emitted laser light interacts with the mirror element 120.

The operations may additionally include, while the rotational angle of the mirror element 120 is within the first angular range, causing the emitted laser light to interact with a first reflective surface (e.g., 122a) of the plurality of reflective surfaces 122. Upon interacting with the first reflective surface, the reflected laser light is reflected into an environment by the first reflective surface.

The operations may also include, while the rotational angle of the mirror element is within the second angular range, causing the emitted laser light to interact with both the first reflective surface (e.g., 122a) and a second reflective surface (e.g., 122b) of the plurality of reflective surfaces 122. The reflected laser light is reflected into the environment by the first and second reflective surfaces.

The operations may also include causing the base structure 130 to rotate about the third axis. The base structure may rotate about the third axis at rotational frequency 1. As an example, the base structure 130 may rotate about the third axis at a rotational frequency of about 600 RPM. Other rotational frequencies are possible. For instance, the base structure 130 may rotate about the third axis at rotational frequencies between 10 RPM and 10 kRPM.

The system 100 may also include one or more actuators 160. The actuators 160 may include direct-current (DC) motors configured to rotate the mirror element 120 and/or the base structure 130. Furthermore, the actuator 160 may include an actuator to adjust a position and/or angle of the light emitter 110. In some embodiments, the actuators 160 may include one or more actuators configured to adjust a position and/or angle of the beam stop(s) 140. That is, in such a scenario, the actuators 160 may move the beam stops 140 so as to adjust the emission angle range and/or avoid multiple simultaneous readings.

Optionally, the operations may also include, while the rotational angle of the mirror element is within a third angular range, causing the emitted laser light to interact with a third reflective surface (e.g., 122c) of the plurality of reflective surfaces. In such scenarios, the reflected laser light may be reflected into the environment by the third reflective surface.

In some embodiments, the operations further include operating the system in an interlaced condition. In such scenarios, the interlaced condition may occur when $\Omega/\Phi=2N+1$, where N is an integer. An interlaced condition may provide a desired laser scanning pattern for scanning the three-dimensional environment around the system 100. Namely, the desired laser scanning pattern may include overlapping scanning areas and/or may provide for less time between subsequent scans for a given location within the environment. Reducing the time between subsequent scans may provide better safety as more up-to-date information may be available about the environment, such as map data and/or object data.

In some embodiments, causing the light emitter 110 to emit laser light may include causing the light emitter 110 to emit laser light pulses based on at least one of rotational frequency $\Omega$ or rotational frequency $\Phi$.

In some embodiments, the operations may include communicating resulting data from the system 100 to one or more other devices (e.g., other LIDAR systems and/or remote storage/a control device). Communicating with one or more other devices may be done over one or more wireline connections, such as an Ethernet connection, high-definition multimedia interface (HDMI) connection, or a universal serial bus (USB) connection. Additionally or alternatively, communicating with one or more other devices may be done over one or more wireless interfaces, such as Institute of Electronics and Electrical Engineers (IEEE) standard 802.11 (WIFI®), BLUETOOTH®, BLUETOOTH LOW ENERGY (BLE®), cellular technology (e.g., global system for mobile communications (GSM), code-division multiple access (CDMA), universal mobile telecommunications system (UMTS), evolution-data optimized (EV-DO), worldwide interoperability for microwave access (WiMAX), long-term evolution (LTE®)), dedicated short range communications (DSRC), communication protocols described in IEEE standard 802.15.4 (e.g., ZIGBEE®), or a wide-area wireless connection. Other forms of physical layer connections and other types of standard or proprietary communication protocols are contemplated herein.

In some embodiments, the system 100 also includes optical window(s) 170. The optical window(s) 170 may separate an interior of the system 100 from a surrounding environment. Further, the optical windows(s) 170 may transmit light emitted from the light emitter 110 and reflected from the mirror element 120 toward the environment and/or receive light reflected from objects in a surrounding environment. In some embodiments, the optical window(s) 170 may be fabricated from glass (e.g., GORILLA® glass, optical glass, poly(methyl methacrylate), etc.). Additionally or alternatively, the optical window(s) 170 may be fabricated from one or more plastics (e.g., optical plastics or plastics formed via injection molding). The optical window(s) 170 may have various thicknesses. For example, the optical window(s) 170 may be between about 1 millimeter and about 2 millimeters thick.

The system 100 may also include a light detector 180. The light detector 180 may be configured to detect light received from the environment around the system 100 (e.g., via the optical window(s) 170). Based on the received light, the light detector 180 may provide information about a scene of the environment around the system 100. The light detector 180 may include a detector array. The detector array may include a plurality of single photon avalanche detectors (SPADs). Additionally or alternatively, the detector array may include other types of photodetectors configured to detect light (e.g., avalanche photodiodes (APDs), silicon photomultipliers (SiPMs), photodiodes, phototransistors, cameras, active pixel sensors (APSs), charge-coupled devices (CCDs), cryogenic detectors, etc.). Further, the detector array may be sensitive to a polarization or a wavelength range emitted by the light emitter 110.

Figure 2A:
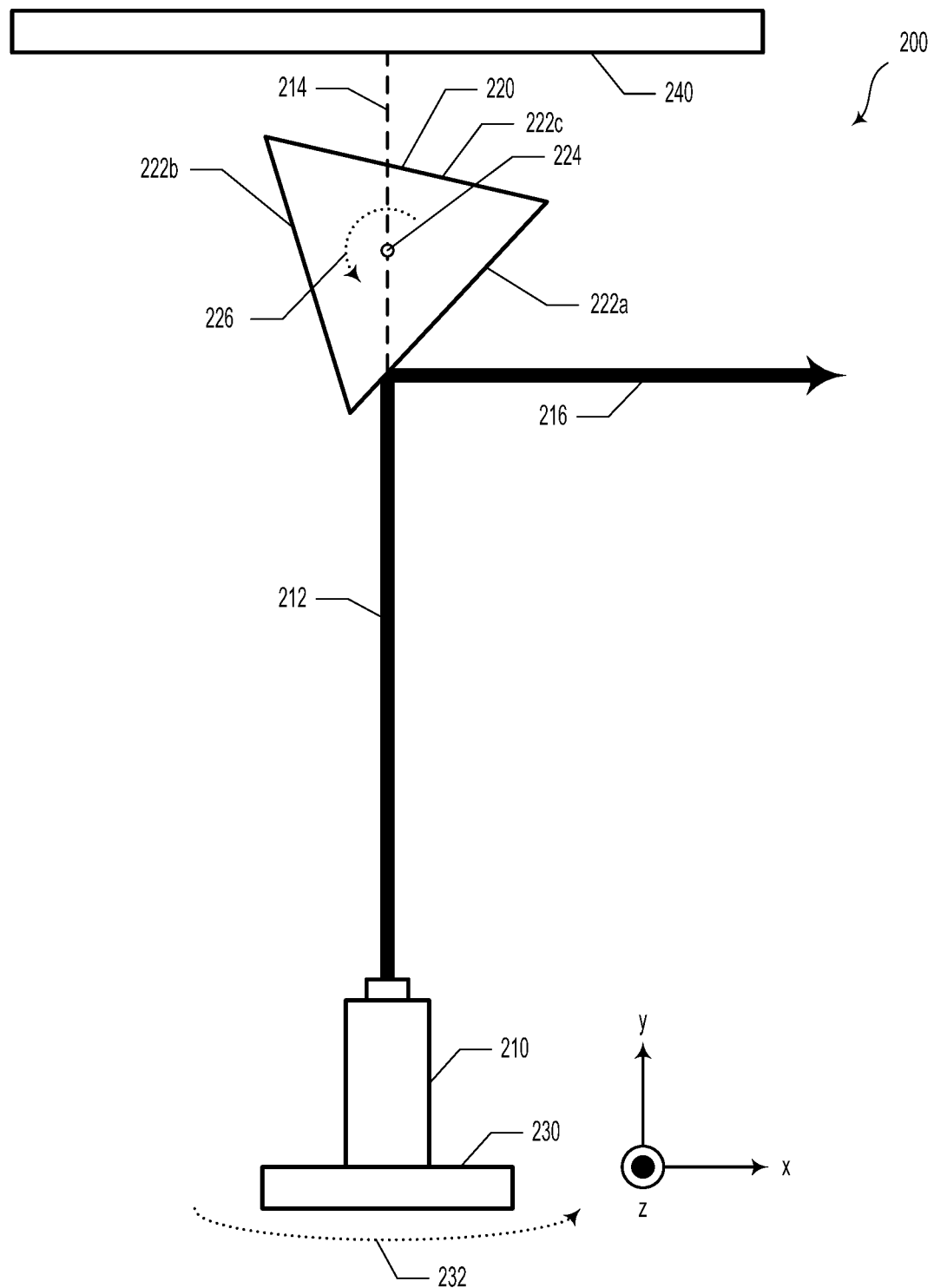
FIG. 2A is an illustration of a LIDAR system, according to example embodiments.
Figure 2B:
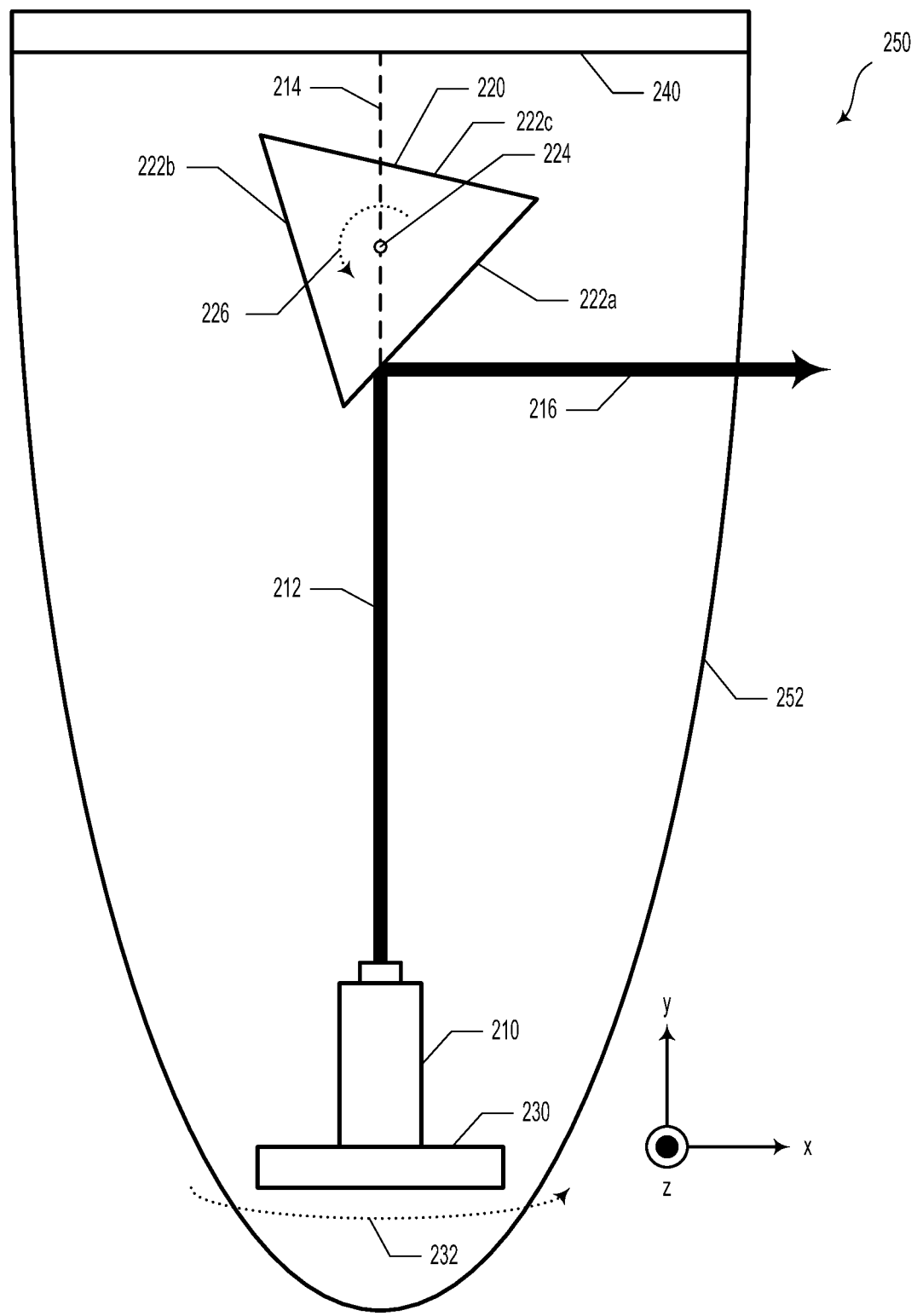
FIG. 2B is an illustration of a LIDAR system, according to example embodiments.
Figure 2C:
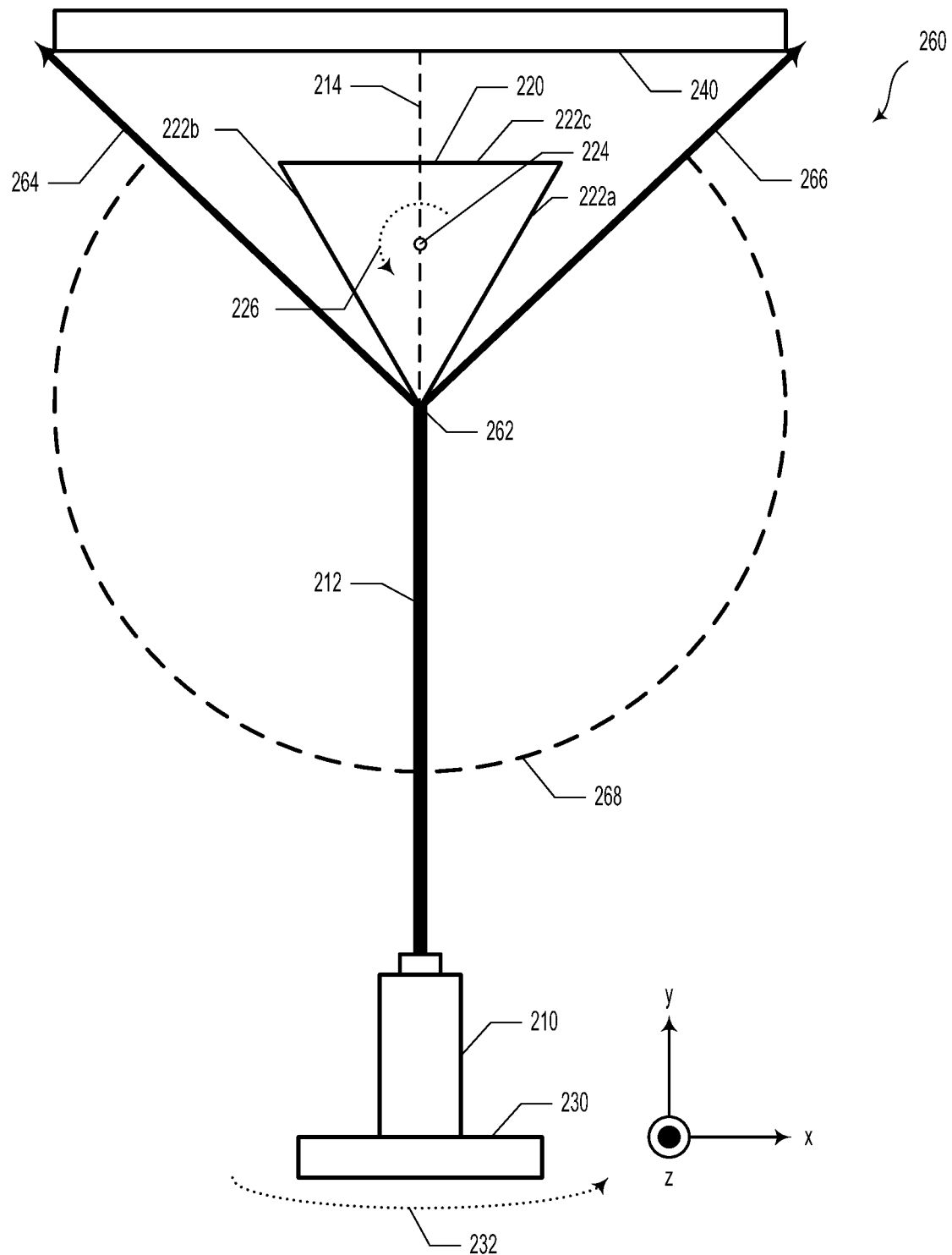
FIG. 2C is an illustration of a LIDAR system, according to example embodiments.

FIGS. 2A, 2B, and 2C illustrate optical systems according to various example embodiments. The optical systems described in relation to FIGS. 2A, 2B, and 2C may be similar or identical to the system 100 illustrated and described with regard to FIG. 1. FIG. 2A illustrates an optical system 200, according to an example embodiment. In some embodiments, optical system 200 may be part of a LIDAR system.

The optical system 200 includes a light emitter 210 that may be operable to emit laser light along a first axis 214. As illustrated in FIG. 2A, the first axis 214 may be along (or parallel to) the y-axis pictured. As such, the light emitter 210 may emit light 212 along the y-axis. As described with regard to light emitter 110, light emitter 210 may include a semiconductor laser, a fiber laser, a laser diode, a gas laser, or another type of light source configured to provide a coherent pulse of light.

The optical system 200 may also include a mirror element 220. The mirror element 220 may include a plurality of reflective surfaces 222a, 222b, and 222c. The mirror element 220 may be configured to rotate about a second axis 224. As illustrated in FIG. 2A, the second axis 224 may be parallel to the z-axis pictured. The plurality of reflective surfaces 222 (i.e., reflective facets) is disposed about the second axis 224. For example, the plurality of reflective surfaces 222 may include three reflective surfaces (222a, 222b, and 222c) arranged symmetrically about the second axis such that the mirror element 220 has a triangular prism shape.

In some embodiments, the first axis (e.g., the optical axis along which light 212 is emitted) may intersect the second axis 224. Furthermore, the first axis 214 may be perpendicular to the second axis 224.

In example embodiments, the optical system 200 may also include a mirror element actuator configured to rotate the mirror element 220 about the second axis at rotational frequency $\Omega$. The mirror element actuator may include a stepper motor, a brushed or brushless DC motor, or another type of rotational actuator. In other words, the mirror element actuator may be configured to rotate the mirror element 220 in a desired direction 226 at a desired rotational frequency $\Omega$.

Although not expressly depicted in FIG. 2A, the mirror element 220 and the light emitter 210 are coupled to a base 230. In some embodiments, the base 230 is configured to rotate about a third axis. Furthermore, in an example embodiment, the third axis may be coaxial with the first axis 214 (e.g., which are both coaxial with the y-axis). In some embodiments, the optical system 200 includes a base structure actuator configured to rotate the base 230 in a desired direction 232 about the third axis at rotational frequency $\Omega$. The base structure actuator may include a rotational actuator such as a stepper motor or a brushed or brushless DC motor.

The optical system 200 also includes at least one beam stop 240. The beam stop 240 may include one or more beam dumps, optically opaque materials, and/or beam blocking materials. The beam stop 240 may be formed from a polymer, metal, fabric, or other materials. The at least one beam stop 240 may be configured to prevent laser light from being emitted into the environment at angles outside an emission angle range. In an example embodiment, the emission angle range may be greater than 240 degrees about the second axis 224. As described herein, the beam stop 240 may be positioned to prevent multiple simultaneous readings/signals.

In example optical systems, while a rotational angle of the mirror element 220 is within a first angular range, the emitted light 212 interacts with a first reflective surface 222a of the plurality of reflective surfaces 222 and is reflected as reflected light 216 into an environment by the first reflective surface 222a. In some embodiments, the emitted light 212 may have a beam width, such as 2 millimeters. Other beam widths are possible.

Furthermore, in some embodiments, while the rotational angle of the mirror element 220 is within a second angular range, the emitted light 212 interacts with both the first reflective surface 222a and a second reflective surface 222b of the plurality of reflective surfaces 222. In such a scenario, the emitted light 212 is reflected as reflected light 216 into the environment by the first and second reflective surfaces 222a and 222b. Put another way, as described above, the emitted light 212 may have a beam width of 2 millimeters. A first portion (e.g., a first half of the beam width) of the emitted light 212 may interact with the first reflective surface 222a and a second portion (e.g., a second half of the beam width) of the emitted light 212 may interact with the second reflective surface 222b.

FIG. 2B illustrates an optical system 250, according to an example embodiment. Optical system 250 may be similar or identical to optical system 200, illustrated and described in reference to FIG. 2A. Optical system 250 may include a housing 252. The housing 252 may be optically transparent to the wavelength(s) of the emitted light 212 and reflected light 216. For example, housing 252 may be more than 90% transparent to the reflected light 216. In example embodiments, the housing 252 may be coupled to the beam stop 240 and the mirror element 220. In some embodiments, the housing 252 may be entirely opaque to wavelength(s) of the emitted light 212 and the reflected light 216, except for one or more optical windows defined within the housing 252 allowing the emitted light 212 and the reflected light 216 to enter/exit the housing 252. Further, in some embodiments, the housing 252 may be evacuated (e.g., little or no air may be present inside the housing 252) to improve the optical and/or mechanical properties of the components inside the housing (e.g., to reduce air resistance on the mirror element 220 when the mirror element 220 rotates about the second axis 224).

FIG. 2C illustrates an optical system 260, according to an example embodiment. The optical system 260 may be similar or identical to optical systems 200 and 250 as illustrated and described in reference to FIGS. 2A and 2B. In an example embodiment, the mirror element 220 may be oriented at a given angle with respect to the second axis 224 such that incident light 212 interacts with two reflective surfaces of the mirror element 220. That is, emitted light 212 may interact with first reflective surface 222a and second reflective surface 222b. The emitted light 212 may be reflected in a first portion as reflected light 264 and in a second portion as reflected light 266. The range of angles between reflected light 264 and reflected light 266 may define an emission angle range 268. The emission angle range 268 may be more than 240 degrees.

Figure 3A:
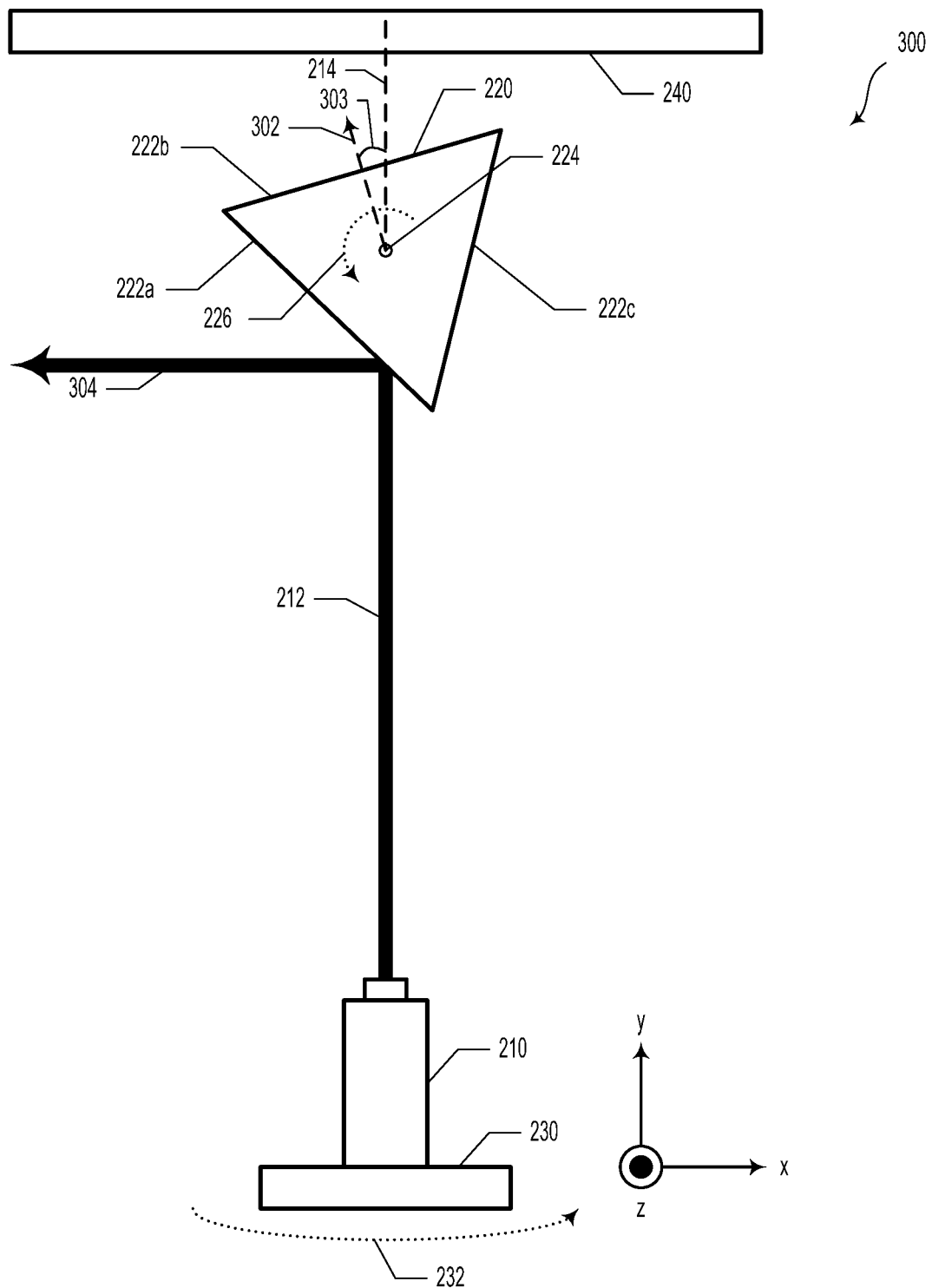
FIG. 3A is an illustration of a LIDAR system, according to example embodiments.
Figure 3B:
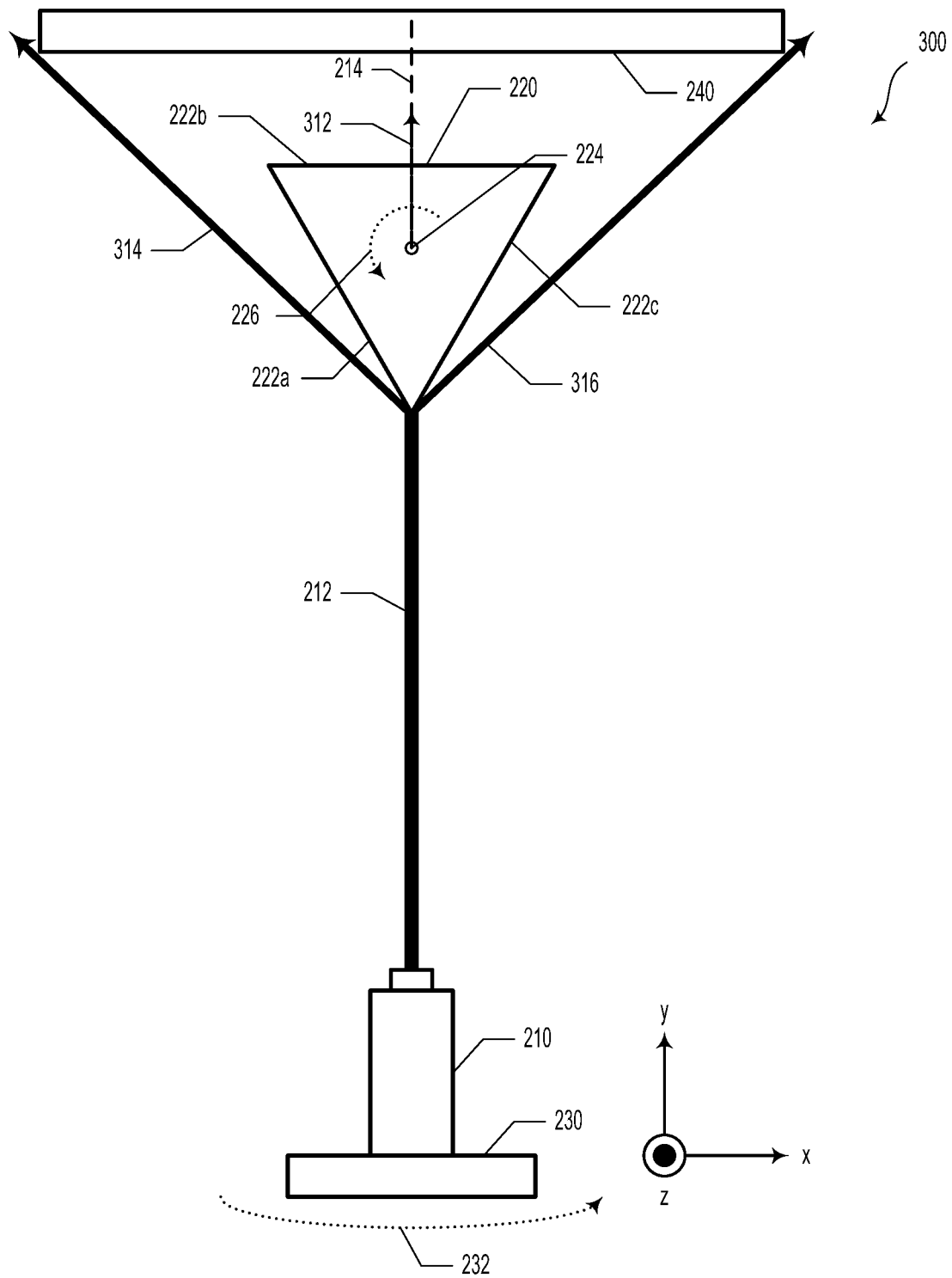
FIG. 3B is an illustration of a LIDAR system, according to example embodiments.

FIGS. 3A and 3B illustrate two different orientations of the mirror element 220 in optical system 300. Optical system 300 may be similar or identical to optical systems 200, 250, and 260 as illustrated and described with reference to FIGS. 2A, 2B, and 2C.

Namely, as illustrated in FIG. 3A, the mirror element 220 may be oriented such that an angle 303 between reference marker 302 and first axis 214 is approximately 15 degrees. In such a scenario, light 212 emitted from the light emitter 210 may interact with reflective surface 222a to form reflected light 304. For example, upon interacting with the reflective surface 222a, the reflected light 304 may be directed at a +90 degree angle with respect to first axis 214.

As illustrated in FIG. 3B, the mirror element 220 may be oriented such that reference marker 312 is oriented along first axis 214. In such a scenario, light 212 emitted from the light emitter 210 may interact with both reflective surface 222a and reflective surface 222c to provide two different reflected light rays. For example, upon interacting with reflective surface 222a and reflective surface 222c, the emitted light 212 may be reflected as reflected light 314 and reflected light 316. In some embodiments, an emission angle range between reflected light 314 and reflected light 316 could be more than 240 degrees.

Figure 3C:
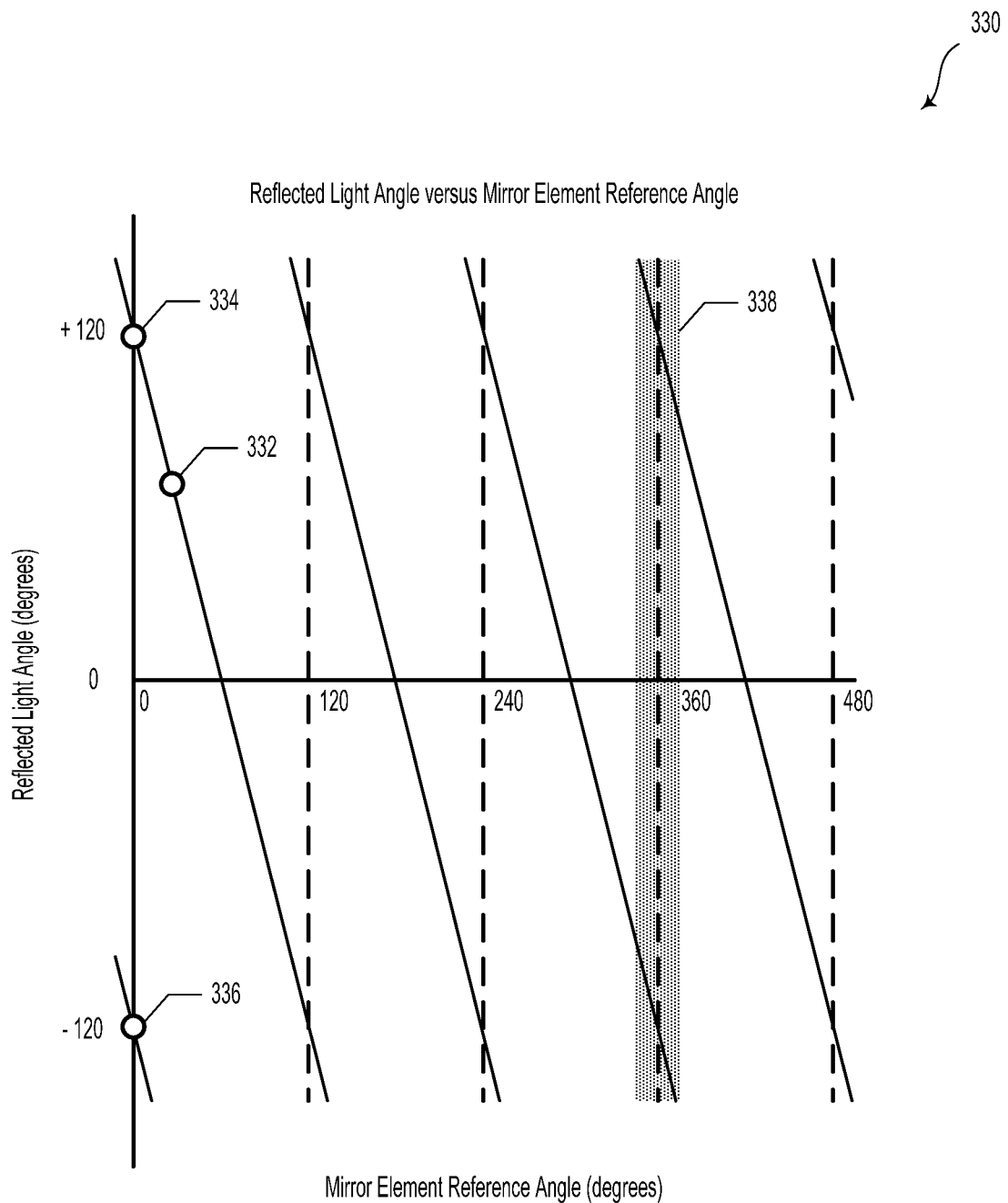
FIG. 3C is an illustration of a reflected light angle versus mirror element reference angle graph, according to example embodiments.

FIG. 3C illustrates a reflected light angle versus mirror element reference angle graph 330, according to an example embodiment. The graph 330 shows how the reflected light angle changes as the mirror element 220 rotates about the second axis 224. In example embodiments, the reflected light angle may be defined as an angle between the reflected light ray (e.g., reflected light 304) and the first axis 214. The graph 330 illustrates the three-fold symmetry when the mirror element 220 is shaped like a triangular prism. It will be understood that if the mirror element 220 takes on a different shape (e.g., a rectangular solid), the angle symmetry and emission angle range may change accordingly.

Graph point 332 illustrates the scenario described in FIG. 3A. Namely, when the mirror element reference angle 303 is approximately 15 degrees, the reflected light angle of reflected light 304 may be approximately +90 degrees.

Furthermore, graph points 334 and 336 illustrate the scenario described with reference to FIG. 3B. Namely, when the mirror element reference angle is zero degrees, emitted light 212 may be reflected via the two reflective surfaces 222a and 222b. In such a scenario, reflected light 314 may relate to graph point 334 (e.g., reflected light angle of +120 degrees) and reflected light 316 may relate to graph point 336 (e.g., reflected light angle of −120 degrees). It will be understood that graph 330 illustrates an example embodiment and that many other reflected light angle and mirror element reference angle relationships are possible. All such other relationships are contemplated herein.

In some embodiments, as illustrated in graph 330, emission light may be reflected in two different directions within an overlap range. As an example, overlap range 338 may represent a mirror element reference angle range over which the emission light is reflected in different directions. This overlap range 338 represents a range of angles of the mirror element 220 in which the laser light interacts with two reflective surfaces of the mirror element 220. Outside of this overlap range 338, the laser light interacts with only one reflective surface of the mirror element 220. This overlap range 338 may repeat based on symmetry of the mirror element 220. In graph 330, the overlap range 338 could be approximately 10 degrees wide, but other overlap ranges are possible. In some embodiments, the overlap range 338 may be adjusted based on the emission beam spot size, mirror element facet geometry, and/or beam stop position.

Figure 3D:
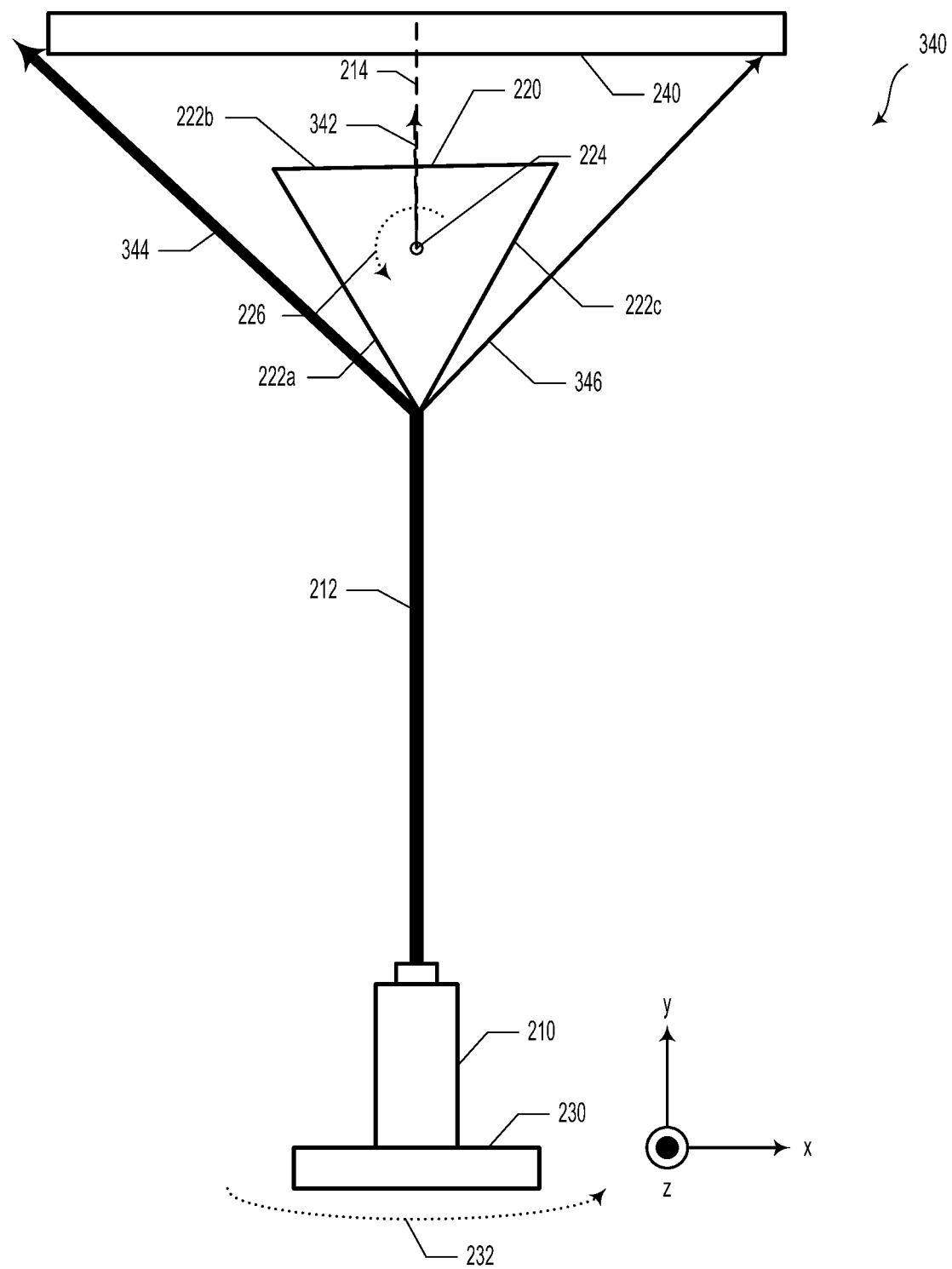
FIG. 3D is an illustration of a LIDAR system, according to example embodiments.

FIG. 3D illustrates an optical system 340, according to an example embodiment. Specifically, FIG. 3D illustrates a further possible orientation of the mirror element 220. For example, mirror element 220 may rotate counterclockwise with respect to the scenario illustrated in FIG. 3B. That is, the mirror element 220 may be oriented such that reference marker 342 is oriented approximately 1 degree counter-clockwise with respect to the first axis 214. In such a scenario, light 212 emitted from the light emitter 210 may interact with both reflective surface 222a and reflective surface 222c to provide two different reflected light rays 344 and 346. However, in contrast to FIG. 3B, the reflected light rays 344 and 346 need not be reflected at the same angle with respect to the first axis 214 and need not have a similar beam width or beam size. For example, upon interacting with reflective surface 222a and reflective surface 222c, the emitted light 212 may be reflected as reflected light 344 and reflected light 346. In such a scenario, based at least on a larger portion of light 212 interacting with reflective surface 222a, reflected light 344 may have a larger beam size. Conversely, reflected light 346 may have a smaller beam size because a smaller portion of light 212 interacts with reflective surface 222c. Furthermore, based on the position of beam stop 240, reflected light 344 may be emitted into the environment around the optical system 340 whereas reflected light 346 may be "stopped," absorbed, or otherwise attenuated by the beam stop 240.

While FIGS. 2A, 2B, 2C, 3A, 3B, and 3D illustrate light 212 as having a certain beam width, it will be understood that light 212 may have a beam width that is larger or smaller in relation to the mirror element 220. In example embodiments, the light 212 may have a beam width that is a larger fraction of the mirror size. In such scenarios, in reference to FIG. 3C, a full mirror revolution may include a larger angular range where the light 212 is split into two reflected beams.

Furthermore, while FIGS. 2A, 2B, 2C, 3A, 3B, and 3D illustrate light emitter 210 as being arranged so as to emit light 212 along a first axis 214 that intersects the second axis 224, other arrangements are possible. For example, in some embodiments, light emitter 210 may be arranged so as to emit light 212 along an axis that does not intersect the second axis 224. For instance, light emitter 210 may be arranged off-axis, tilted, or shifted away from the first axis 214 and/or the second axis 224. Such asymmetric arrangements may provide greater angle coverage and/or higher resolution coverage along one side of the mirror element 220 as compared to another side. In an example embodiment, the light emitter 210 may be positioned with respect to the mirror element 220 so as to provide greater angular coverage for a portion of the environment located within particularly desirable angular ranges (e.g., −45 degrees to +20 degrees from horizontal). Other arrangements of light emitter 210 and design considerations with regard to such arrangements are possible and contemplated herein.

Figure 4:
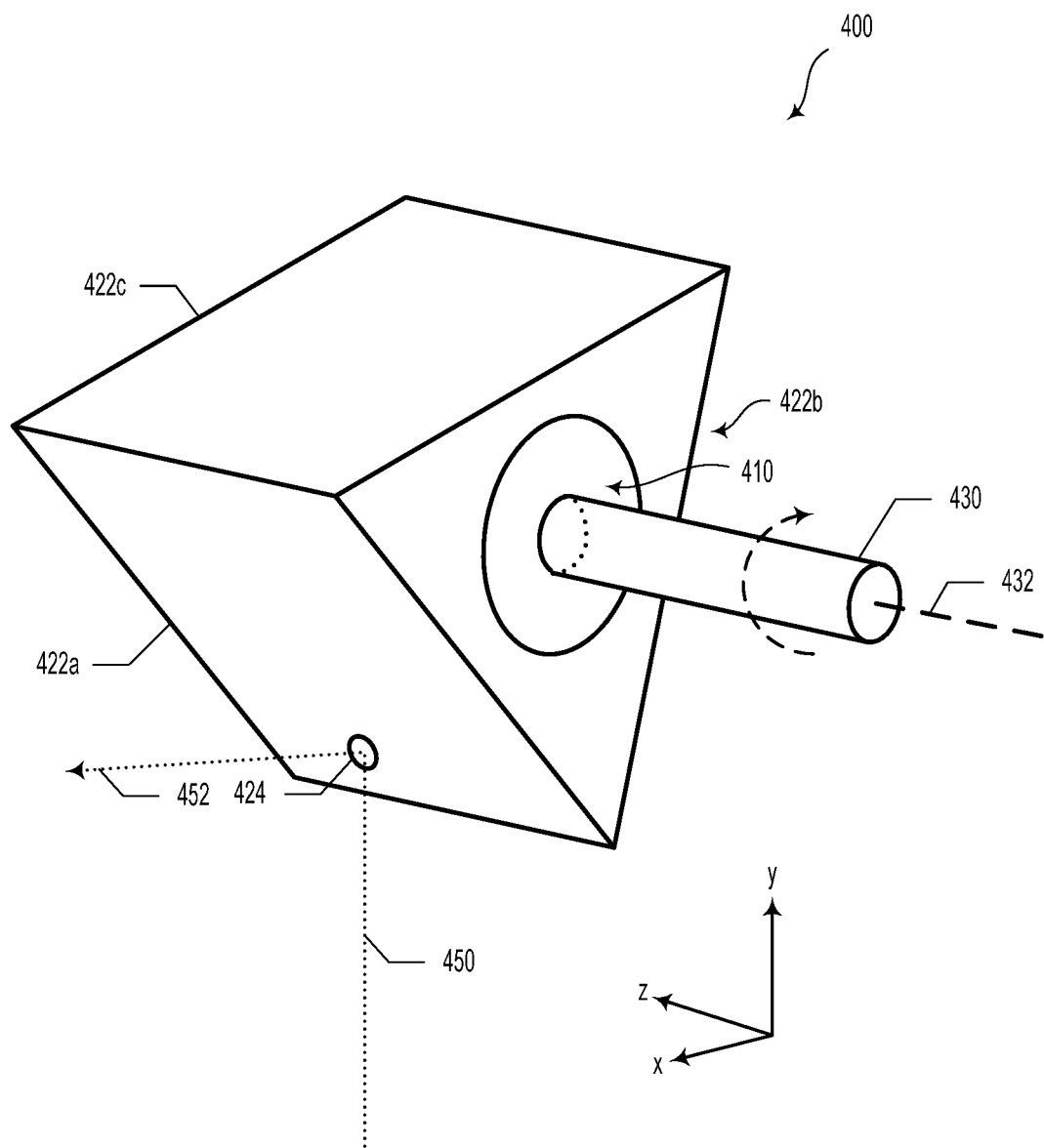
FIG. 4 is an illustration of a mirror element, according to example embodiments.

FIG. 4 illustrates a mirror element 400, according to an example embodiment. Mirror element 400 may be similar to mirror elements 120 or 220 as illustrated and described with reference to FIGS. 1, 2A, 2B, 2C, 3A, and 3B. Mirror element 400 may include reflective surfaces 422a, 422b, and 422c. The reflective surfaces 422a, 422b, and 422c may be configured to be highly reflective for incident laser light 450 at or around a given emission wavelength. For example, the reflective surfaces 422a, 422b, and 422c may reflect more than 90% of the incident light.

Mirror element 400 may additionally include a spindle 430. The spindle 430 may alternatively be referred to as an axle, a shaft, or a drive shaft herein. The mirror element 400 may be configured to rotate about the spindle 430, which may be along a rotational axis 432. The rotational axis 432 may be similar or identical to second axis 224 as illustrated in FIGS. 2A, 2B, 2C, 3A, and 3B and described elsewhere herein. Namely, spindle 430 and mirror element 400 may be configured to rotate in a clockwise and/or counter clockwise direction with respect to the rotational axis 432. In some embodiments, the spindle 430 may be rotated via a mirror element actuator (e.g., a DC motor or a stepper motor).

In some embodiments, the mirror element 400 may be hollow, at least in part. That is, at least some material in an inner portion 410 of the mirror element 400 may be removed. Namely, inner portion 410 may be empty or may include air.

As the mirror element 400 rotates about the rotational axis 432, incident light may be reflected from one or more reflective surfaces of the mirror element toward an environment of the mirror element 400. For example, as illustrated in FIG. 4, incident laser light 450 may interact with the first reflective surface 422a at an interaction location 424. An angle of incidence of the incident laser light 450 with respect to the reflective surface 422a may determine a reflectance angle for reflected light 452.

Figure 5:
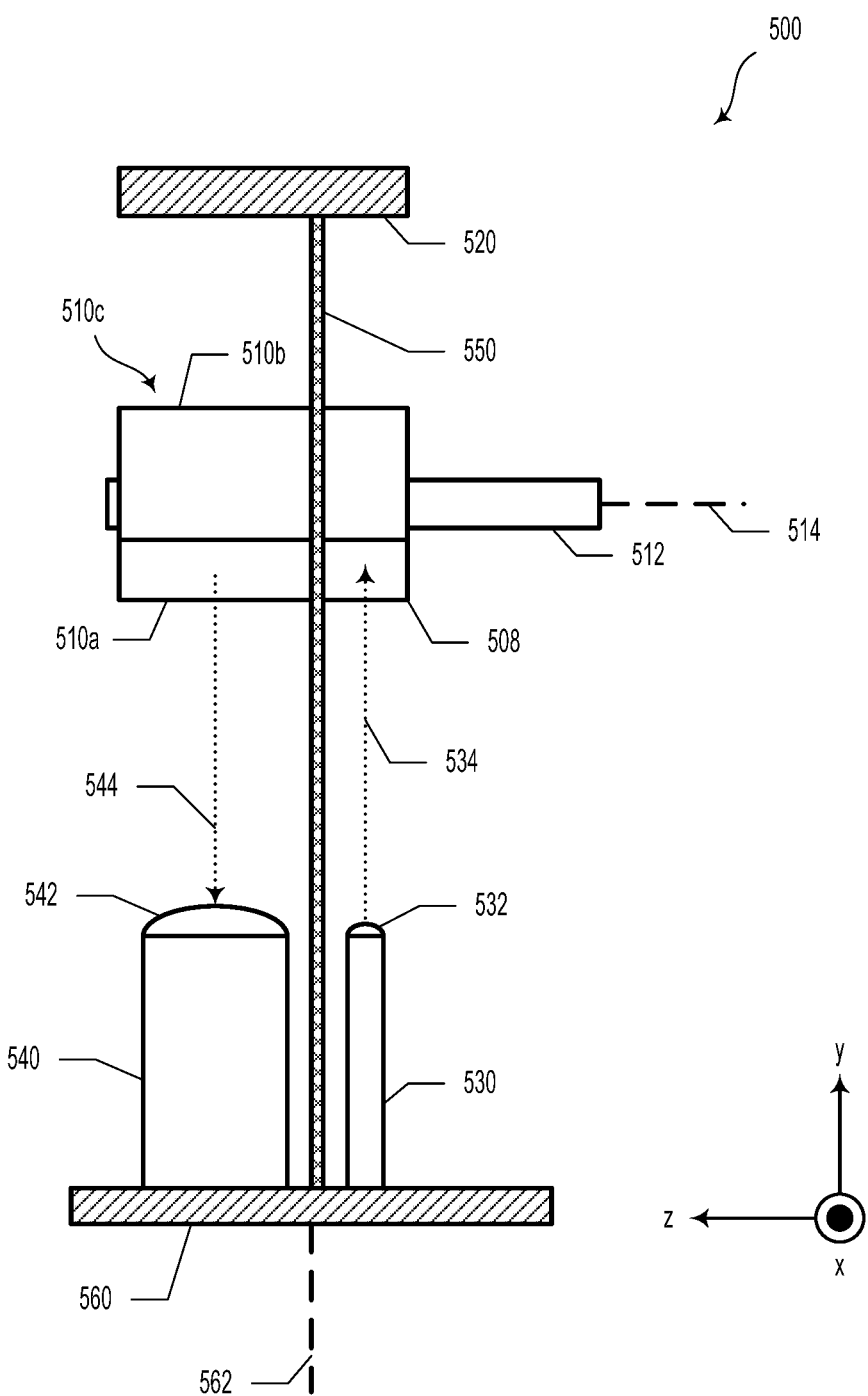
FIG. 5 is an illustration of a LIDAR system, according to example embodiments.

FIG. 5 illustrates an optical system 500, according to an example embodiment. The optical system 500 may be, at least in part, similar or identical to optical systems 200, 250, 260, and 300 and mirror element 400 as illustrated and described with regard to FIGS. 2A, 2B, 2C, 3A, 3B, and 4. For example, optical system 500 may include a mirror element 508 having reflective surfaces 510a, 510b, and 510c. The mirror element 508 may be coupled to spindle 512, which may be configured to rotate about an axis of rotation 514.

Similar to optical system 200, optical system 500 may include beam stop 520 and a light emitter 530. In an example embodiment, the light emitter 530 may emit light 534 via an optical element 532 (e.g., a lens and/or a diffuser). For example, the optical element 532 may include an FAC lens (e.g., a molded-plastic FAC lens positioned on the light emitter 530, e.g., if the light emitter 530 includes a laser diode). The emitted light 534 may interact with the reflective surface 510a and be reflected into the environment of the optical system.

The optical system 500 may also include a light detector 540. The light detector 540 may be configured to receive light 544 from the environment around the optical system 200 via an optical element 542 (e.g., a condenser lens or an FAC lens). The optical element 542 may have cross-sectional dimensions that approximately match the cross-sectional dimensions of the light detector 540 (e.g., if the light detector 540 includes a SiPM having cross-sectional width and height of about 1.3 mm and about 1.3 mm, respectively, the optical element 542 may also have cross-sectional width and height of about 1.3 mm and about 1.3 mm, respectively). In some embodiments, the light detector 540 may receive light 544 via a polarization filter that is configured to block a particular polarization of light (e.g., horizontally polarized light), where only a certain polarization of light (e.g., vertically polarized light) is emitted by the light emitter 530. Additionally or alternatively, the light detector 540 may receive light 544 via one or more optical filters (e.g., a bandpass chromatic filter) configured to filter out all wavelengths other than those wavelengths emitted by the light emitter 530. Using such techniques, the light detector 540 may eliminate noise arising from stray light coming from sources other than the light emitter 530. In some embodiments (e.g., embodiments where the light emitter 530 is modulated at a given frequency), the light detector 540 may be configured to detect light modulated at a frequency corresponding to the modulation frequency of the light emitter 530.

Based on the received light 544, the light detector 540 may provide information about a scene of the environment around the optical system 200. The light detector 540 may include a detector array. The detector array may include a plurality of single photon avalanche detectors (SPADs). Additionally or alternatively, the detector array may include other types of photodetectors configured to detect light 544 (e.g., avalanche photodiodes (APDs), SiPMs, photodiodes, phototransistors, cameras, active pixel sensors (APSs), charge-coupled devices (CCDs), cryogenic detectors, etc.). Further, the detector array may be sensitive to a polarization or a wavelength range emitted by the light emitter 530.

The light emitter 530 and the portion of the mirror element 508 upon which the emitted light 534 is incident may be termed the transmit path. The portion of the mirror element 508 with which the received light 544 interacts and the light detector 540 may be termed the receive path. In embodiments illustrated herein, the transmit path and the receive path may be parallel. In such a scenario, the transmit path and receive path may be arranged so that a laser light pulse is transmitted into the environment, interacts with the environment (e.g., via reflection from an object) and is reflected back to the receiver. The transmit path and the receive path may be segregated to reduce noise and avoid cross talk and/or false signals. Accordingly, the optical system 200 may include a light baffle 550 that may be positioned between the transmit path and the receive path.

The optical system 500 may include a base portion 560 that may be coupled to the light detector 540, the light emitter 530, the beam stop 520, and an actuator configured to rotate the mirror element 508. Namely, the base portion 560 may be configured to rotate about a third axis 562, which may be parallel to the transmit path and/or the receive path.

Figure 6:
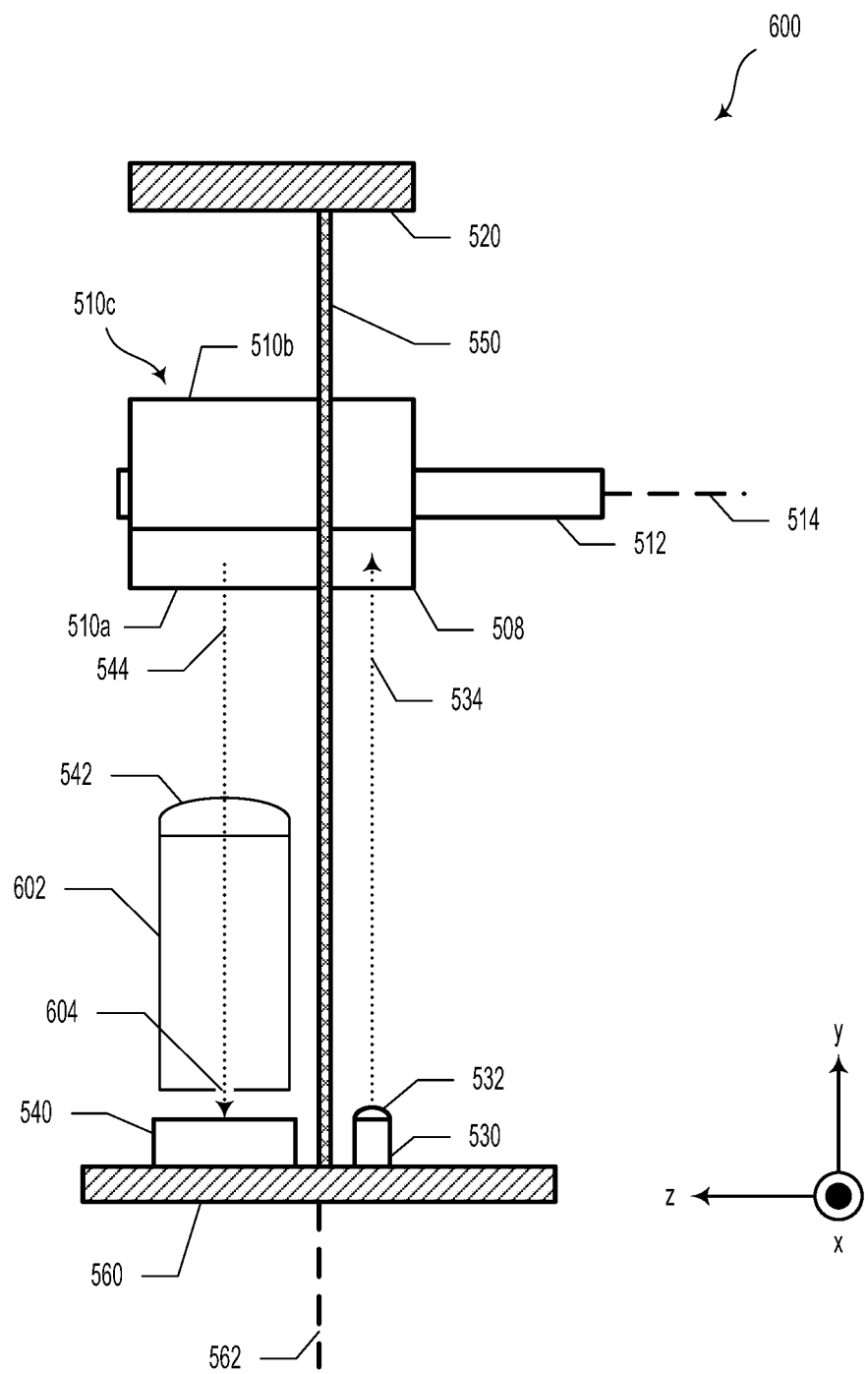
FIG. 6 is an illustration of a LIDAR system, according to example embodiments.

FIG. 6 is an illustration of a LIDAR system 600, according to example embodiments. The LIDAR system 600 may be similar to the optical system 500 illustrated in FIG. 5. For example, the LIDAR system 600 may include the mirror element 508 coupled to the spindle 512, as well as the light emitter 530 and the light detector 540. In addition to the components illustrated in FIG. 5, however, the LIDAR system 600 may also include an optical cavity 602, with an aperture 604 defined therein. The optical cavity 602 may be optically positioned between the optical element 542 (e.g., condenser lens) and the light detector 540. The optical cavity 602 may serve as a waveguide for light 544 received from the environment after being reflected from an object (e.g., to guide the received light 544 toward the light detector 540). In some embodiments, the optical cavity 602 may have a specific shape to assist in guiding the received light 544 toward the light detector 540. Additionally or alternatively, an interior of the optical cavity 602 may be reflective so that received light 544 that interacts with an inside of the optical cavity 602 is reflected toward the light detector 540 (rather than absorbed by the optical cavity 602 and rendered undetectable). In some embodiments, the interior of the optical cavity 602 may be a silvered-glass mirror, for example. Alternatively, the interior of the optical cavity 602 may be coated with a material that is absorptive for all wavelengths except for a range of wavelengths that includes the wavelength of the emitted light 534 produced by the light emitter 530.

The aperture 604 may reduce an amount of extraneous light reaching the light detector 540. For example, the aperture 604 may permit only that light which is properly aligned within the optical cavity 602 so that it intercepts the aperture 604 to reach the light detector 540. As such, the aperture 604 may reduce detection noise within the LIDAR system 600. Additionally or alternatively, the aperture 604 may be used to set a depth of focus for the LIDAR system 600. In some embodiments, the position of the aperture 604 relative to the light detector 540 and/or within the optical cavity 602 may be horizontally and/or vertically adjustable (e.g., to adjust the depth of focus of the LIDAR system 600 and/or to account for manufacturing imperfections in the light detector 540, the optical element 542, the optical cavity 602, the mirror element 508, etc.). Such an adjustment may be made by a stage (e.g., controlled by a controller).

Figure 7A:
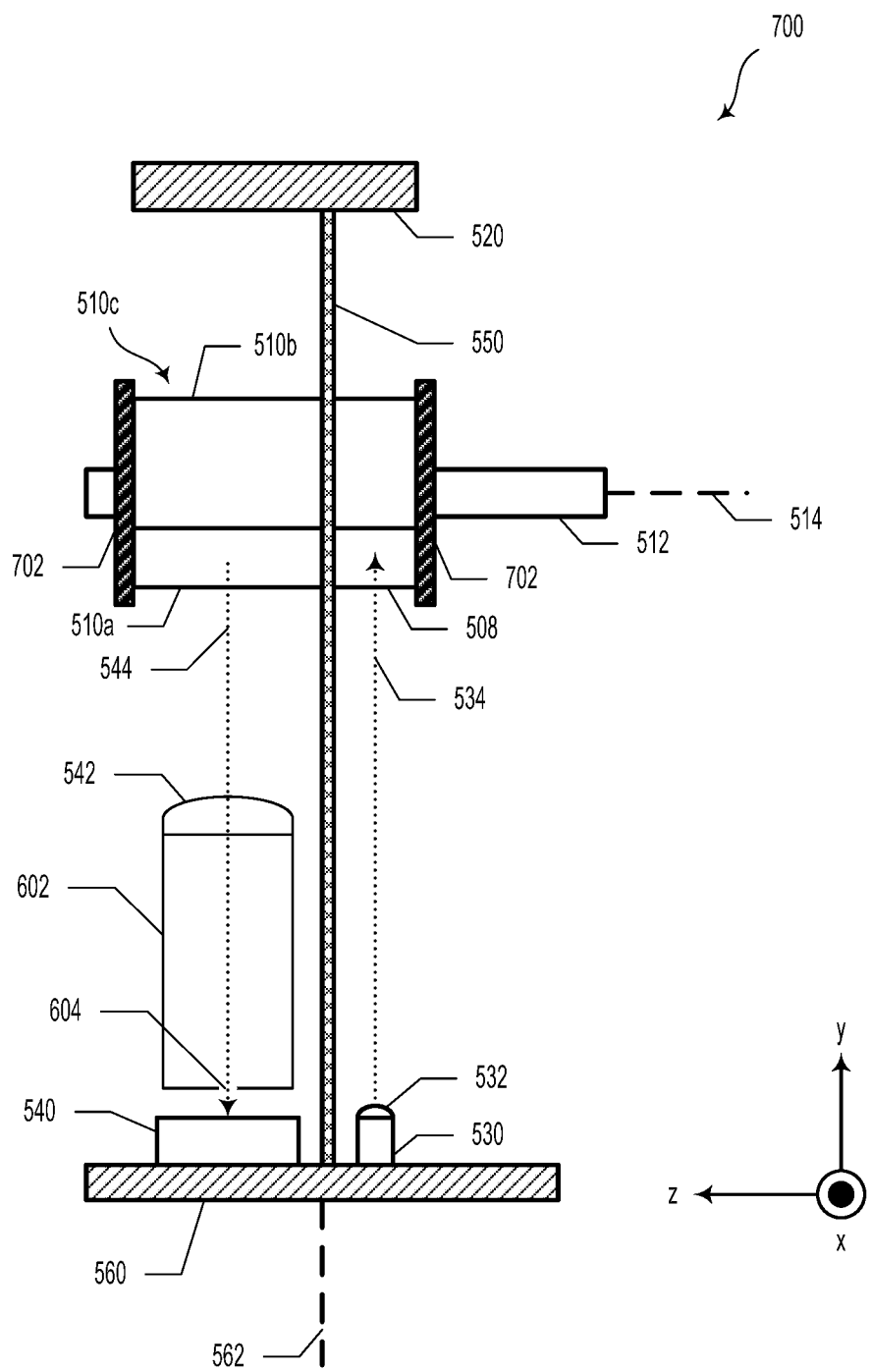
FIG. 7A is an illustration of a LIDAR system, according to example embodiments.

FIG. 7A is an illustration of a LIDAR system 700, according to example embodiments. The LIDAR system 700 may be similar to the LIDAR system 600 illustrated in FIG. 6. For example, the LIDAR system 700 may include the mirror element 508 coupled to the spindle 512, the light emitter 530, the light detector 540, and the optical cavity 602 with the aperture 604 defined therein.

Figure 7B:
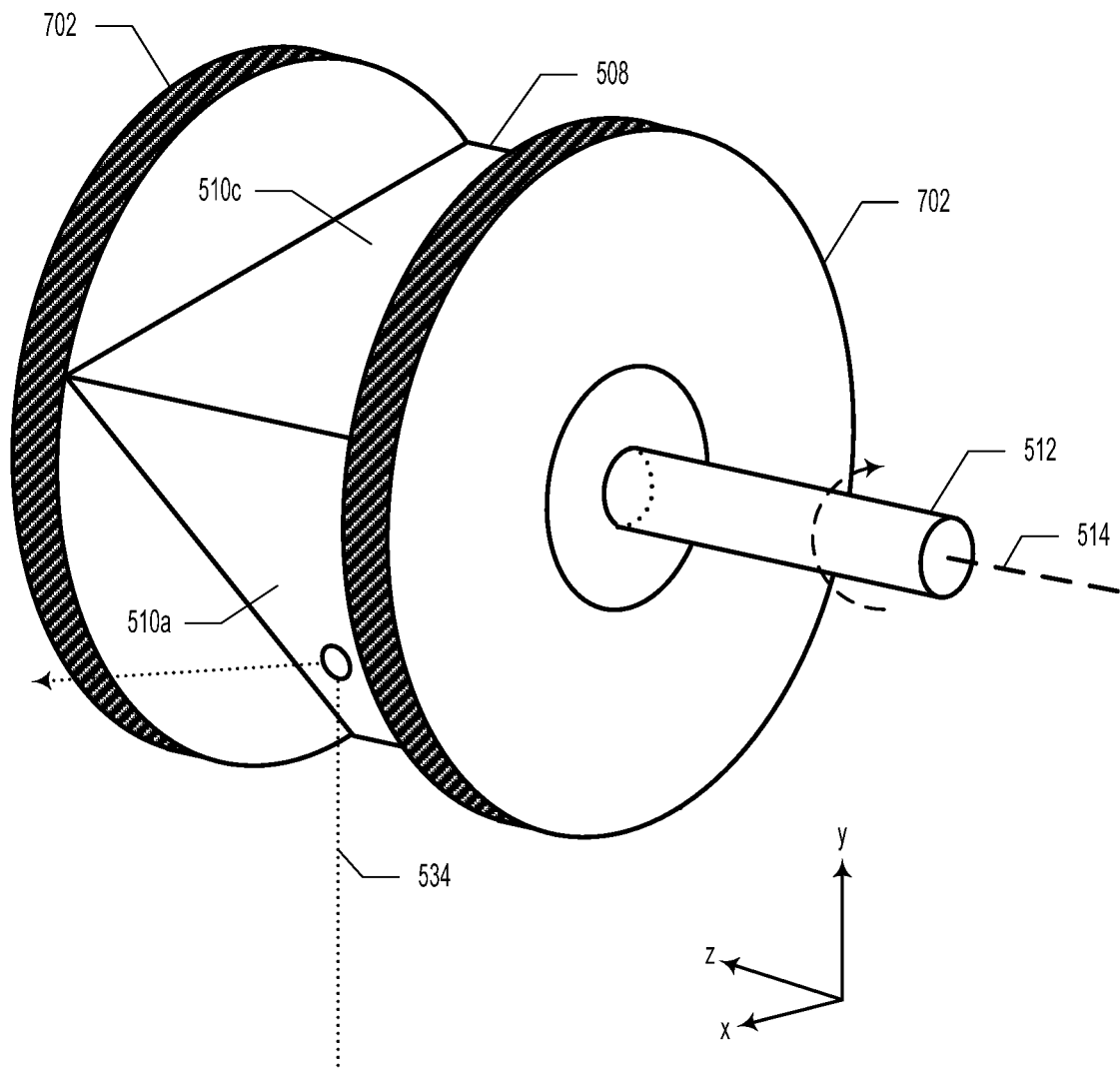
FIG. 7B is an illustration of a mirror element with baffles, according to example embodiments.

In addition to the components illustrated in FIG. 6, however, the LIDAR system 700 may also include one or more baffles 702. The baffles 702 may be disk-shaped, for example. As illustrated, the baffles 702 may be positioned along the spindle 512 adjacent to the mirror element 508 (and perpendicular to each of the reflective surfaces 510a/510b/510c). Also as illustrated, the baffles 702 may be positioned on the spindle 512 on opposing ends of the mirror element 508 (i.e., both baffles 702 positioned on the spindle 512 at different z-positions, one z-position being less than the z-position of the entirety of the mirror element 508 and one z-position being greater than the z-position of the entirety of the mirror element 508). In other words, the baffles 702 may flank the mirror element 508 along the spindle 512. FIG. 7B provides an illustration of the mirror element 508, the spindle 512, and the baffles 702 from a different perspective than FIG. 7A. In some embodiments, the baffles 702 may be movable/reorientable (e.g., using a stage controlled by a controller). For example, in some embodiments the spindle 512 may be a threaded rod and the baffles 702 may each have a threaded center section that mates with the threaded rod of the spindle 512. As such, the baffles 702 may linearly translate along the spindle 512 by rotating the baffles 702 about the spindle 512 (e.g., while keeping the spindle 512 rotationally stationary). Hence, in order to move/reorient the baffles 702 along the spindle 512, one or more electric motors (e.g., servos) may cause the baffle 702 to rotate about the spindle 512 (e.g., using a gear on a shaft of the electric motor that is mated with teeth defined along the perimeter of the baffle 702).

In other embodiments, there may be greater than or fewer than two baffles 702 (e.g., there may be one, three, four, five, six, seven, eight, nine, ten, eleven, twelve, thirteen, fourteen, fifteen, sixteen, etc. baffles). Further, in some embodiments, the baffles 702 and/or any additional baffles may be positioned at various locations along the spindle 512. In some embodiments, the baffles 702 may be fabricated from the same or similar materials as the light baffle 550 positioned between the transmit path and the receive path (e.g., to optically separate the transmit and receive paths from one another).

In some embodiments, the baffles 702 may reduce an amount of stray light (e.g., internal reflections from the components of the LIDAR system 700) reaching the light detector 540. For example, the baffles 702 may be configured to attenuate internal reflections from one or more optical windows of the LIDAR system 700 (e.g., thereby attenuating or eliminating ghost signals). In some embodiments, rather than being positioned along the spindle 512, one or more baffles may be positioned between the multi-faceted mirror (i.e., mirror element 508) and one or more optical windows of the LIDAR system 700.

In addition, one or more of the baffles 702 may include a material (e.g., be fabricated from a material) that absorbs a wavelength of light emitted by the light emitter 530 (e.g., in order to absorb/attenuate internal reflections). For example, one or more of the baffles 702 may include a surface made of blackened steel. In various embodiments, the one or more of the baffles 702 may be made from plastic, aluminum, steel, or biaxially-oriented polyethylene terephthalate (BoPET) (e.g., the baffles 702 may be circular disks made from plastic, aluminum, steel, or BoPET). Further, in some embodiments, the baffles 702 may be between about 0.5 millimeters and about 1.0 millimeters thick or between about 0.1 millimeters and about 2.0 millimeters thick. In addition, the baffles 702 may be between about 1 centimeter and about 3 centimeters in diameter. In alternate embodiments, the baffles 702 may have other shapes besides circular disks and/or other thicknesses/diameters. For example, in some embodiments, hemispherical baffles may be used (e.g., with the lobes of the hemispheres oriented along the spindle 512 and away from the mirror element 508).

In addition to or instead of modifying optical properties of the LIDAR system 700, the baffles 702 may modify one or more mechanical properties of the LIDAR system 700. For example, the baffles 702 may reduce vibrations of the mirror element 508 when the mirror element 508 is rotating about the spindle 512 (e.g., when the spindle 512 is driven by an actuator, such as a DC motor). Reducing vibrations of the mirror element 508 may reduce the sound produced when the mirror element 508 is rotating about the spindle 512. Additionally or alternatively, the baffles 702 may enhance aerodynamic properties of the mirror element 508 (e.g., by blocking a transverse path for air to flow across the reflective surfaces 510a/510b/510c of the mirror element 508, by streamlining air flowing/improving laminar airflow in the rotational direction of the mirror element 508, and/or by reducing turbulent airflow near the mirror element 508). Such enhanced aerodynamic properties may reduce the drag torque produced on the mirror element 508, thereby reducing the amount of power expended (e.g., by the motor driving the spindle 512) to rotate the mirror element 508. To further increase the aerodynamic properties of the LIDAR system, in some embodiments, a chamber (e.g., the housing 252) in which the mirror element 508 rotates may be evacuated (e.g., may have air removed to produce a lower atmospheric pressure within the housing 252) or a low-density gas (e.g., helium) may be inserted into the chamber, thereby producing a vacuum or near-vacuum and eliminating all or nearly all drag forces/torques. Other methods of enhancing the mechanical properties of the mirror element 508 or other portions of the LIDAR system 700 are also possible and contemplated herein.

Figure 7C:
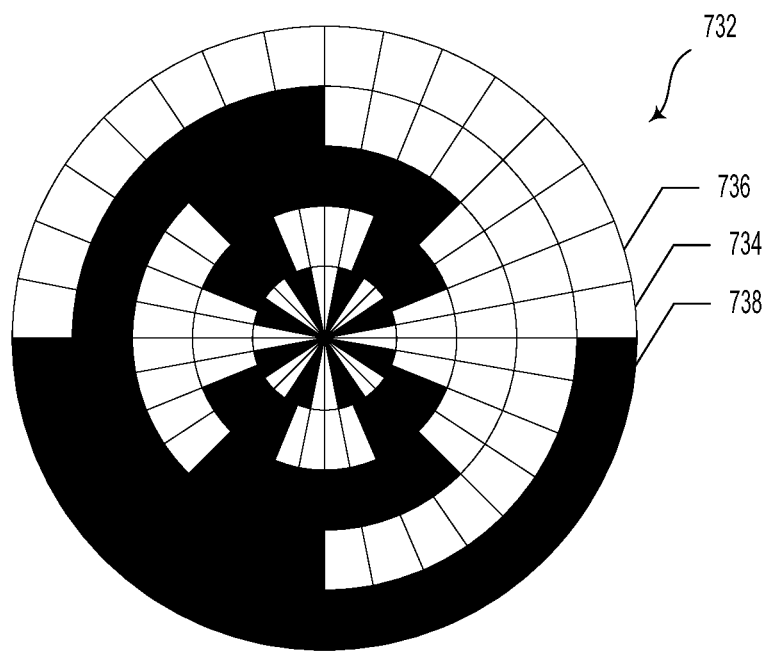
FIG. 7C is an illustration of a baffle, according to example embodiments.

FIG. 7C is an illustration of a baffle 732, according to example embodiments. In some embodiments, the baffle 732 may be used as one or more of the baffles 702 of the LIDAR system 700 illustrated in FIG. 7A. In addition to or instead of modifying mechanical properties of the LIDAR system 700, the baffle 732 may be used as a rotary encoder for the spindle 512 and, correspondingly, the mirror element 508. The baffle 732 may act as an optical, rotary encoder represented by a series of bits (e.g., from innermost bits to outermost bits). For example, the bits illustrated as white in FIG. 7C may permit light transmission (e.g., the white bits may correspond to optical apertures defined within the baffle 732), while the bits illustrated as black in FIG. 7C may block or reduce light transmission (e.g., the black bits may correspond to solid regions of the baffle 732). By emitting light behind a given region (e.g., a given sliver) of the baffle 732 and detecting the resulting arrangement of bits (e.g., transmissions and non-transmissions), a determination of the angular orientation of the baffle 732 can be made (e.g., by a controller of a motor and/or of the LIDAR system 700). In alternate embodiments, a reflective rotary encoder may be incorporated into the baffle 732 (e.g., in addition to or instead of a transmissive rotary encoder).

Based on the determination of the angular orientation of the baffle 732, as well as a predetermined angular offset of the reflective surfaces 510a/510b/510c of the mirror element 508 about axis of rotation 514 relative to the baffle 732 and an angular position of the base portion 560 about the third axis 562, a determination can be made (e.g., by a controller of a motor and/or of the LIDAR system 700) regarding toward which regions of an environment/scene the emitted light 534 will be directed. Such regions of the scene may be referred to as "target regions," for example. Based on a series of target regions coupled with evaluated ranges for the target regions (e.g., based on the transit time of emitted light 534 between when the emitted light 534 is emitted by the light emitter 530 and detected by the light detector 540), a map of a surrounding environment (e.g., a three-dimensional point cloud) can be generated by the LIDAR system 700.

As illustrated in FIG. 7C, in order to serve as an optical, rotary encoder, the baffle 732 may be divided into five concentric rings, with each ring divided into thirty-two adjacent sections. This defines thirty-two sliver regions, each sliver region corresponding to one set of five bits. For example, a first sliver region 734 may correspond to a series of bits as follows: [0 0 0 0 0]. The encoding scheme for the baffle 732 may be a reflected binary code (i.e., a Gray code). As such, the series of bits in the sliver regions adjacent to the first sliver region 734 may vary from the series of bits of the first sliver region 734 by only one bit. For example, as illustrated, a second sliver region 736 that is rotated 11.25° (360°/32 sliver regions) counterclockwise relative to the first sliver region 734 may be as follows: [1 0 0 0 0] and a third sliver region 738 that is rotated 11.25° clockwise relative to the first sliver region 734 may be as follows: [0 0 0 0 1]. In some embodiments, the innermost bit may correspond to the most-significant bit and the outermost bit may correspond to the least-significant bit. In other embodiments, the innermost bit may correspond to the least-significant bit and the outermost bit may correspond to the most-significant bit. Other bit arrangements are also possible.

The reflected binary code may continue around the baffle 732 to complete a five bit encoding scheme that uniquely identifies each of the 11.25° sliver regions. In various embodiments, an encoding scheme may be used for the baffle 732 that provides an angular resolution greater than 11.25° (e.g., 10° angular resolution, 5.625° angular resolution, 5° angular resolution, 2.8125° angular resolution, 1.40625° angular resolution, 1° angular resolution, 0.703125° angular resolution, etc.) or an angular resolution less than 11.25° (e.g., 15° angular resolution, 20° angular resolution, 22.5° angular resolution, 30° angular resolution, 45° angular resolution, 90° angular resolution).

Figure 7D:
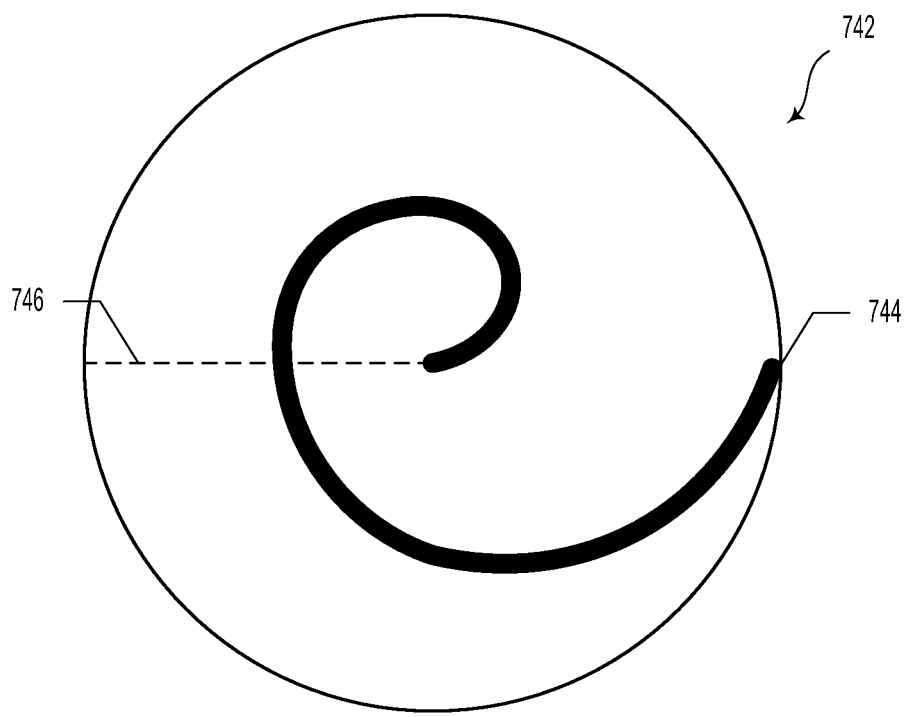
FIG. 7D is an illustration of a baffle, according to example embodiments.

FIG. 7D is an illustration of a baffle 742, according to example embodiments. In some embodiments, the baffle 742 may be used as one or more baffles 702 of the LIDAR system 700 illustrated in FIG. 7A. Similar to the baffle 732 illustrated in FIG. 7C, the baffle 742 may be used as a rotary encoder for the spindle 512 and, correspondingly, the mirror element 508. As with the baffle 732 illustrated in FIG. 7C, the baffle 742 may act as an optical, rotary encoder. However, unlike the baffle 732 illustrated in FIG. 7C, the baffle 742 illustrated in FIG. 7D may be a spiral encoder. The baffle 742 may include a spiral portion 744 used to determine the angular orientation of the baffle 742/the spindle 512. For example, light may be illuminated along one line 746 (e.g., behind the baffle 742 and stationary relative to the baffle 742 as the baffle 742 rotates) and then, based on detection of the light transmitted through the spiral portion 744 (e.g., based on a distance from a center of the baffle 742 to the detected light), an angular orientation of the baffle 742 can be determined (e.g., by a controller of a motor and/or of the LIDAR system 700). Alternate shapes/sizes of spiral portions, as well as other types of encoders (both spiral and non-spiral) are possible and contemplated herein. For example, in some embodiments, one or more optical apertures may be arranged in a spiral arrangement, thereby defining a rotary, optical encoder. In some embodiments, rather than transmission encoders, the baffles 732/742 may be reflective encoders (e.g., where reflected light rather than transmitted light is detected to determine angular orientation).

Figure 7E:
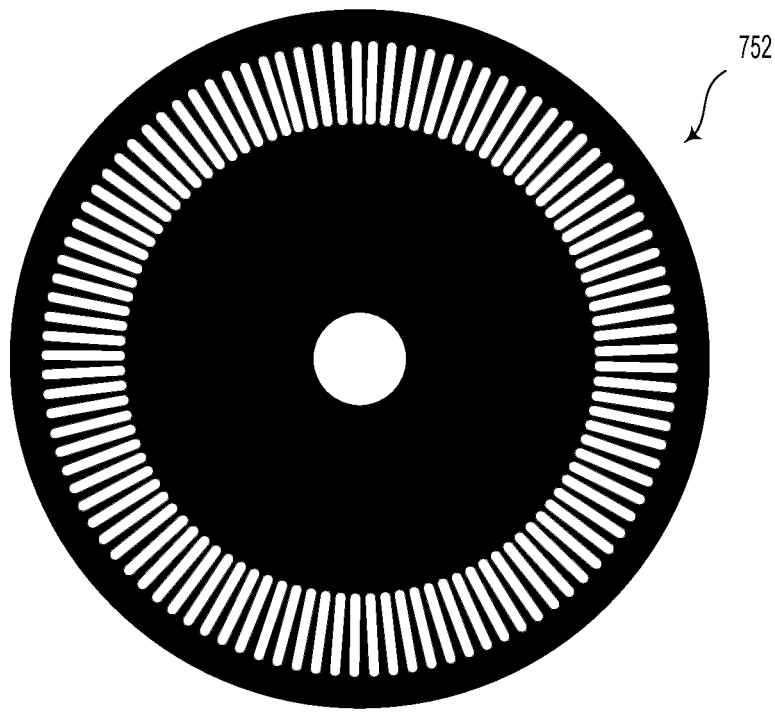
FIG. 7E is an illustration of a baffle, according to example embodiments.

FIG. 7E is an illustration of a baffle 752, according to example embodiments. In some embodiments, the baffle 752 may be used as one or more baffles 702 of the LIDAR system 700 illustrated in FIG. 7A. Similar to the baffle 732 illustrated in FIG. 7C, the baffle 752 may be used as a rotary encoder for the spindle 512 and, correspondingly, the mirror element 508. As with the baffle 732 illustrated in FIG. 7C, the baffle 752 may act as an optical, rotary encoder.

Figure 7F:
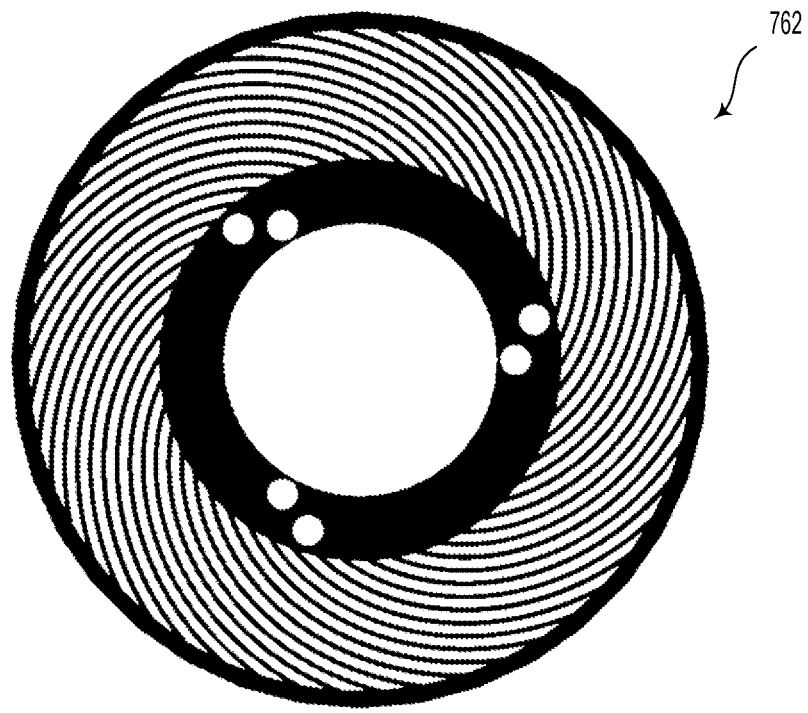
FIG. 7F is an illustration of a baffle, according to example embodiments.

FIG. 7F is an illustration of a baffle 762, according to example embodiments. In some embodiments, the baffle 762 may be used as one or more baffles 702 of the LIDAR system 700 illustrated in FIG. 7A. Similar to the baffle 732 illustrated in FIG. 7C, the baffle 762 may be used as a rotary encoder for the spindle 512 and, correspondingly, the mirror element 508. As with the baffle 732 illustrated in FIG. 7C, the baffle 762 may act as an optical, rotary encoder. The baffle 752 illustrated in FIG. 7E and the baffle 762 illustrated in FIG. 7F may have an accompanying optical encoder module that counts the number of open regions as the respective baffle 752/762 rotates. In this way, the optical encoder module may be configured to measure the angular orientation of the given baffle 752/762 (which could be used to determine a direction toward which a light signal is directed based on the shape/orientation of an associated multi-faceted mirror, for example).

Figure 8A:
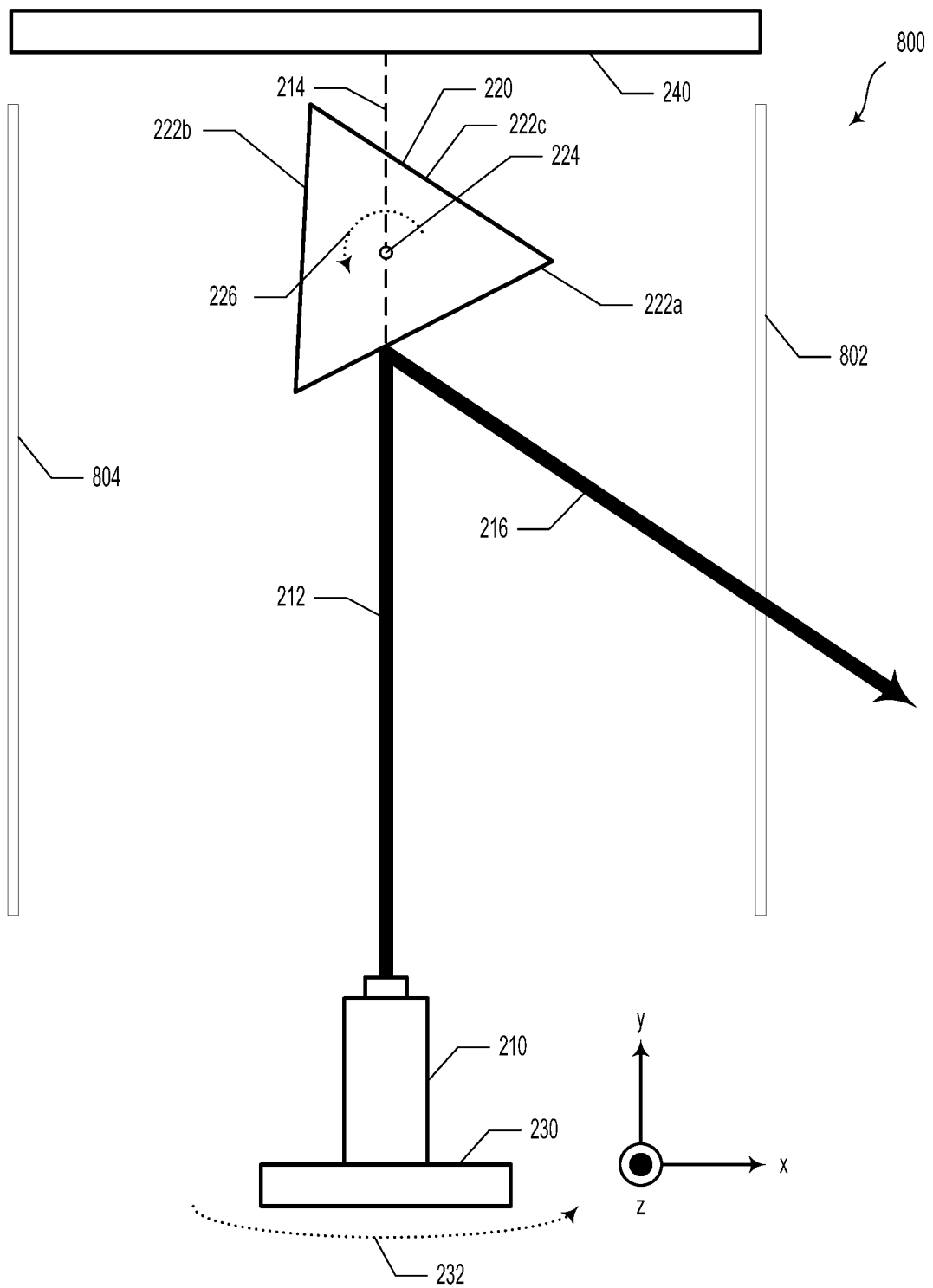
FIG. 8A is an illustration of a LIDAR system, according to example embodiments.

FIG. 8A is an illustration of a LIDAR system 800, according to example embodiments. The LIDAR system 800 may be similar to the optical system 200 illustrated in FIG. 2A (e.g., with the mirror element 220 at a slightly different angular orientation than illustrated in FIG. 2A, resulting in a different angle between the emitted light 212 and the reflected light 216). As such, the LIDAR system 800 may include the mirror element 220, the light emitter 210, the base 230, the beam stop 240, etc. The LIDAR system 800 illustrated in FIG. 8A, however, may also include a light detector (e.g., a light detector similar to the light detector 540 illustrated in FIG. 6 and positioned at a z-location such that it is behind and occluded by the light emitter 210 and the base 230 in the illustration of FIG. 8A). Further, unlike the optical system 200 of FIG. 2A, the LIDAR system 800 may include one or more optical windows through which the reflected light 216 is transmitted toward a scene/surrounding environment of the LIDAR system 800. In alternate embodiments, in addition to a light detector, the LIDAR system 800 may also include an optical element 542 and an optical cavity 602 with an aperture 604 defined therein to transmit light to the light detector 540 (e.g., similar to the LIDAR system 600 illustrated in FIG. 6).

In some embodiments, as illustrated, the LIDAR system 800 may include a first optical window 802. Also as illustrated, the LIDAR system 800 may include a second optical window 804. Further, the first optical window 802 and the second optical window 804 may be positioned on opposing sides of the mirror element 220. In alternate embodiments, the LIDAR system 800 may only include a single optical window or may include more than two optical windows (e.g., three, four, five, six, seven, eight, nine, ten, or more optical windows). For example, in some embodiments the LIDAR system 800 may include four optical windows each positioned angularly around a circumference of the base 230 and spaced by 90° relative to one another about the first axis 214. The first optical window 802 and/or the second optical window 804 may be coupled, either directly or indirectly, to the base 230 so as to rotate with the base 230 about the first axis 214. Alternatively, the first optical window 802 and/or the second optical window 804 may be detached from the base 230 so the base 230 can rotate independently of the first optical window 802 and/or the second optical window 804.

In some embodiments, one or more of the optical windows in the LIDAR system 800 may be curved (e.g., may have a curvature similar to the curvature of the housing 252 illustrated in FIG. 2B). For example, one or more of the optical windows could have a vertical curvature (e.g., a curvature about the y-axis illustrated in FIG. 8A) or a horizontal curvature (e.g., a curvature about the z-axis illustrated in FIG. 8A). Such curvatures may act to defocus reflected light prior to the light reaching the environment around the LIDAR system 800. Such a technique may, therefore, limit the intensity of any ghost beams produced, thereby limiting the detectability of and error caused by the ghost signals.

The first optical window 802 and the second optical window 804 may be fabricated from the same material or different materials. In some embodiments, one or more of the optical windows 802/804 may be fabricated from glass (e.g., GORILLA® glass, optical glass, poly(methyl methacrylate), etc.). Additionally or alternatively, one or more of the optical windows 802/804 may be fabricated from one or more plastics (e.g., optical plastics or plastics formed via injection molding). In still other embodiments, one or more of the optical windows 802/804 may be fabricated from one or more types of filter glasses (e.g., glasses that reflect and/or absorb a non-negligible portion of incident light within visible wavelengths). The optical windows 802/804 in such embodiments may serve to obscure components inside the LIDAR system 800 from outside observers, may enhance the aesthetic qualities of the LIDAR system 800, and/or prevent internal heating of components within the LIDAR system 800 due to incident light. Further, the first optical window 802 and the second optical window 804 may have the same or different thicknesses. For example, the first optical window 802 and the second optical window 804 may be between about 1 millimeter and about 4 millimeters thick.

Figure 8B:
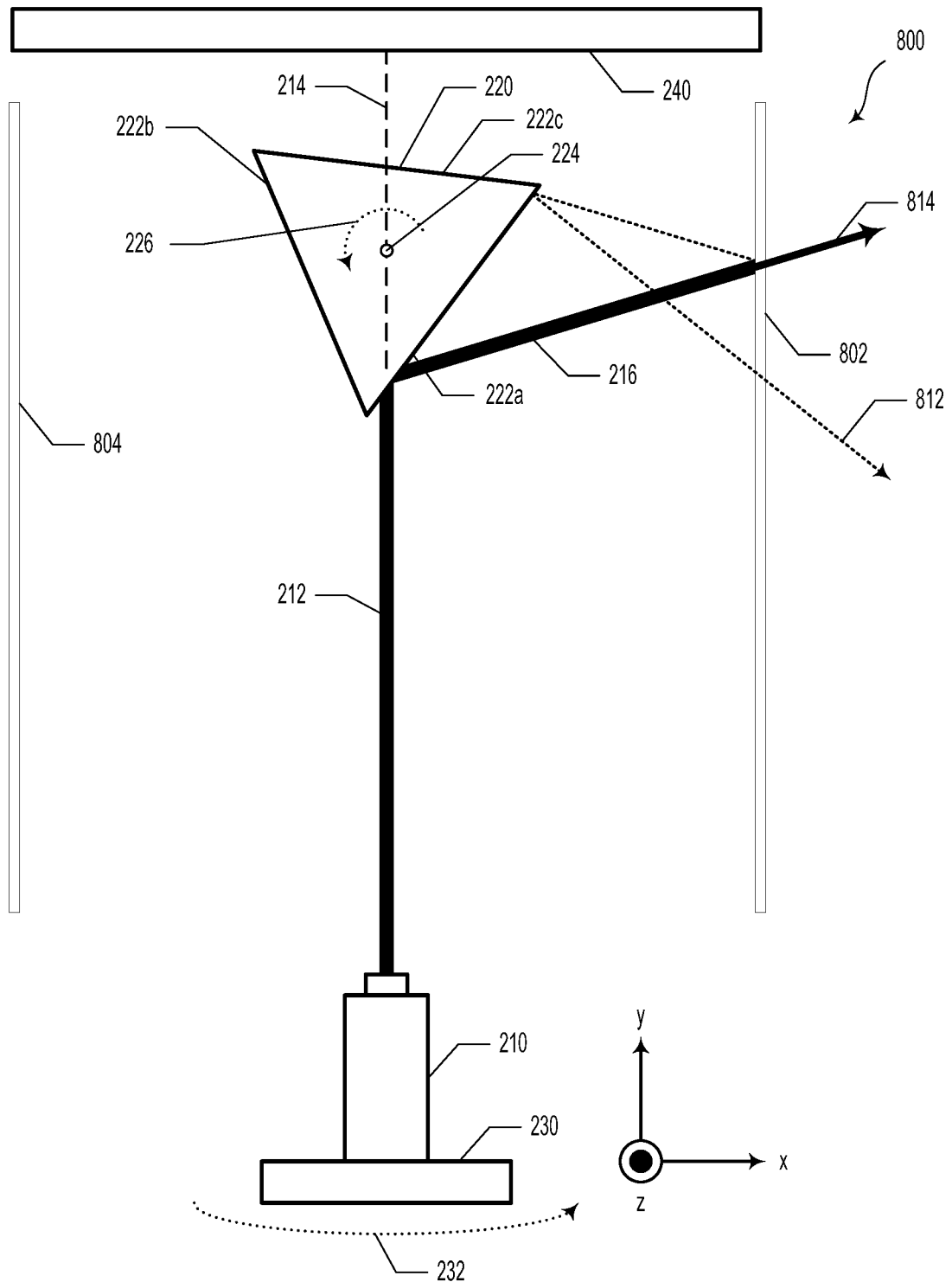
FIG. 8B is an illustration of a LIDAR system, according to example embodiments.

FIG. 8B is an illustration of the LIDAR system 800 illustrated in FIG. 8A, according to example embodiments. The angular orientation of the mirror element 220, and thus the reflected light 216, in FIG. 8B is different from the angular orientation illustrated in FIG. 8A. As described above, internal reflections off of one or more optical windows (e.g., off of the first optical window 802) may cause a ghost beam 812. The ghost beam 812 is illustrated in FIG. 8B using a dashed line. It may be the case that the ghost beam 812 causes inaccuracies in mappings generated using the LIDAR system 800, as described further below. Hence, the accuracy of three-dimensional point clouds or other maps made using the LIDAR system 800 may be increased if the ghost beam 812 can be attenuated in intensity or eliminated altogether. Additionally or alternatively, the ghost beam 812 may increase the minimum range at which objects in the environment can be detected by the LIDAR system 800. As such, the elimination or mitigation of the ghost beam 812 may increase detectability of objects in the surrounding environment that are nearby the LIDAR system 800.

As illustrated in FIG. 8B, the ghost beam 812 may result from a portion of the reflected light 216 being reflected off of an interior side and/or exterior side of an optical window (e.g., the interior side and/or the exterior side of the first optical window 802). The ghost beam 812 may be reflected from one or more imperfections on the interior side and/or exterior side of the first optical window 802 (e.g., fabrication imperfections such as surface roughness) or within the first optical window 802 itself (e.g., bubbles within the glass of the first optical window 802). Additionally or alternatively, the ghost beam 812 may be reflected from one or more foreign objects located on a surface of the interior side and/or exterior side of the first optical window 802 (e.g., dust, dirt, water, etc.). In addition, the ghost beam 812 may be reflected from the interior side and/or exterior of the first optical window 802 as a result of Fresnel reflections.

Upon being reflected from the interior side and/or exterior side of the first optical window 802, the ghost beam 812 may be reflected off of the first reflective surface 222a and then transmitted, via the first optical window 802, to the environment surrounding the LIDAR system 800. In various embodiments, the ghost beam 812 may have various intensities relative to the primary signal 814 when both signals leave the LIDAR system 800. For example, in various embodiments, the ghost beam 812 may have an intensity that is 0.1%, 1%, 2%, 3%, 5%, 10%, 15%, 20%, 25%, 30%, 40%, 50%, 60%, 70%, 80%, 90%, or 100% of the intensity of the primary signal 814. After leaving the LIDAR system 800, the ghost beam 812 may be reflected by an object in the environment and then retrace its path back to the LIDAR system 800 and, ultimately, to a light detector of the LIDAR system 800. The light detector may detect the ghost beam 812 in addition to the primary signal 814 reflected from the intended target (i.e., the target in the environment located at a position toward which the primary signal 814 is being directed). If the reflected ghost beam 812 has a non-negligible intensity compared with the reflected primary signal 814, the light detector (e.g., and an associated controller of the light detector/the LIDAR system 800) may register a false positive based on the ghost beam 812.

Figure 8C:
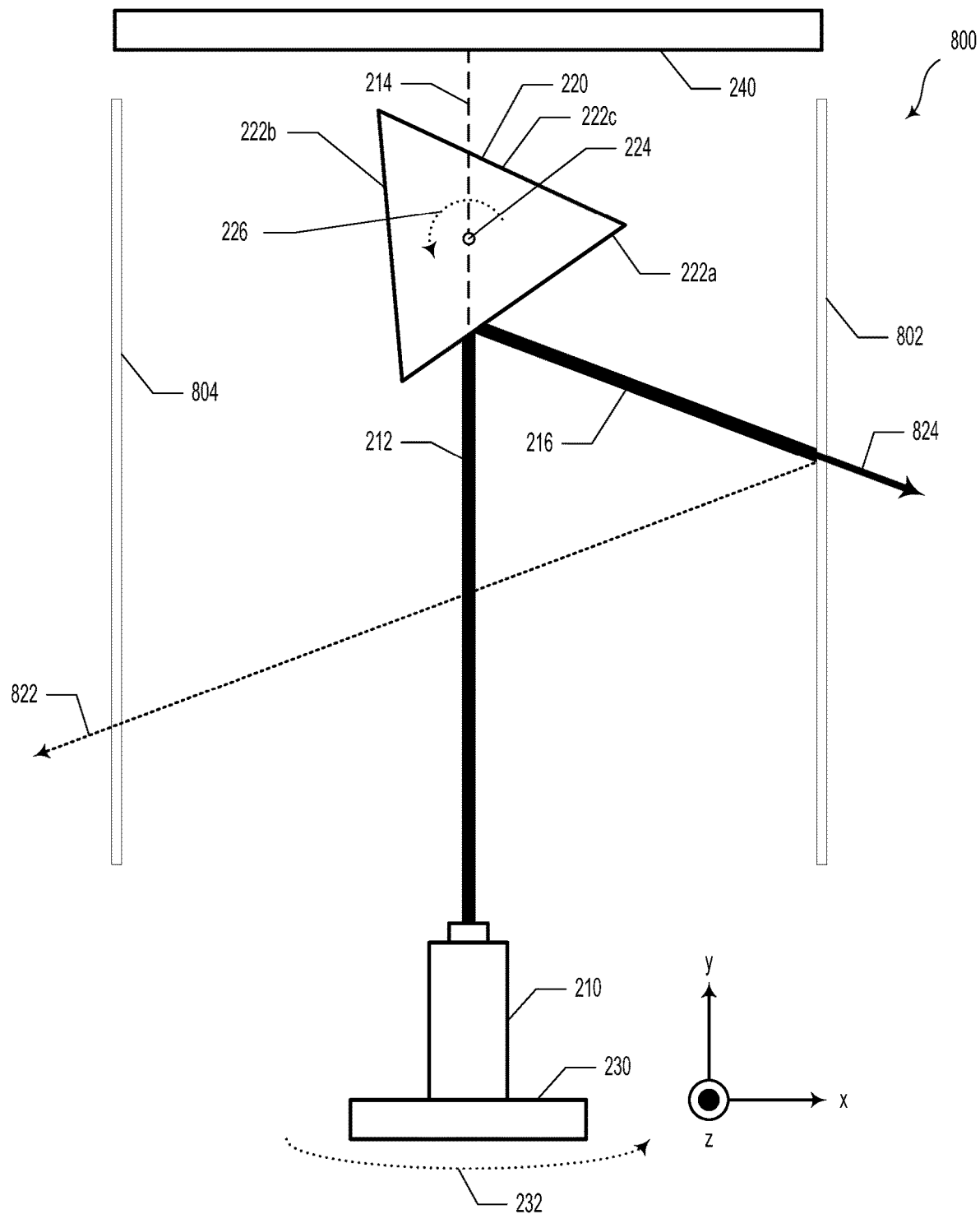
FIG. 8C is an illustration of a LIDAR system, according to example embodiments.

FIG. 8C is an illustration of the LIDAR system 800, according to example embodiments. The LIDAR system 800 may be the same LIDAR system 800 as illustrated in FIGS. 8A and 8B with the mirror element 220 being at a different angular orientation, thereby directing the reflected light 216 and the corresponding primary signal 824 at a different angle than the angle illustrated in FIG. 8B. Similarly, the ghost beam 822 illustrated in FIG. 8C is reflected from the interior side of the first optical window 802 at a different angle than the angle at which the ghost beam 812 was reflected in FIG. 8B. As illustrated, similar to the ghost beam 812 in FIG. 8B, the ghost beam 822 in FIG. 8C may arise due to a reflection of a portion of the reflected light 216 off of an interior side of the first optical window 802. However, unlike the ghost beam 812 illustrated in FIG. 8B, the ghost beam 822 in FIG. 8C may be transmitted to the environment surrounding the LIDAR system 800 via the second optical window 804 (rather than being re-reflected off of the first reflective surface 222a and then transmitted to the environment via the first optical window 802, like the ghost beam 812 in FIG. 8B). Hence, the ghost beams 812/822 illustrated in FIGS. 8B and 8C may represent two possible mechanisms by which ghost beams, and, possibly ultimately, spurious detections (e.g., ghost signals) at a light detector of the LIDAR system 800 are made. Which of the two types of ghost beams 812/822 is more dominant may depend on a reflection angle of the reflected light 216 from the mirror element 220, and, thus, an angle of the reflected light 216 relative to the first optical window 802. In other embodiments, additional or alternative mechanisms (e.g., additional types of internal reflections) may give rise to other types of ghost beams. For example, the ghost beam 822 illustrated in FIG. 8C could experience an additional reflection off of an interior side of the second optical window 804 resulting in an additional ghost beam. The two types of ghost beams 812/822 illustrated in FIGS. 8B and 8C are provided only as example ghost beams.

Figure 8D:
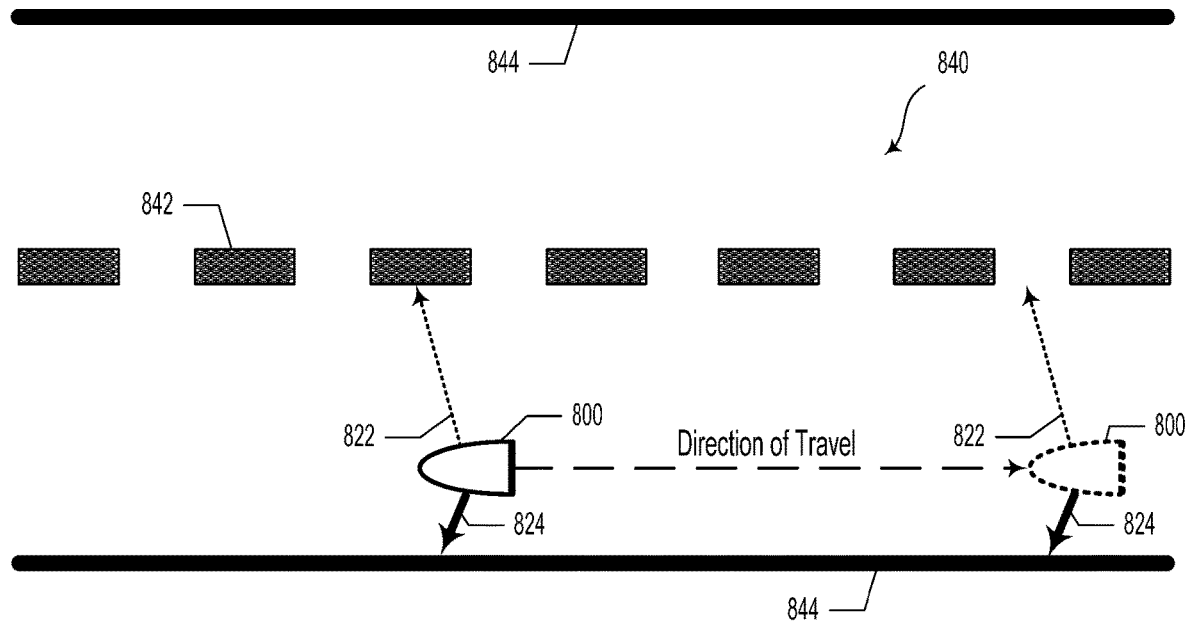
FIG. 8D is an illustration of a LIDAR system monitoring a road surface, according to example embodiments.
Figure 8E:
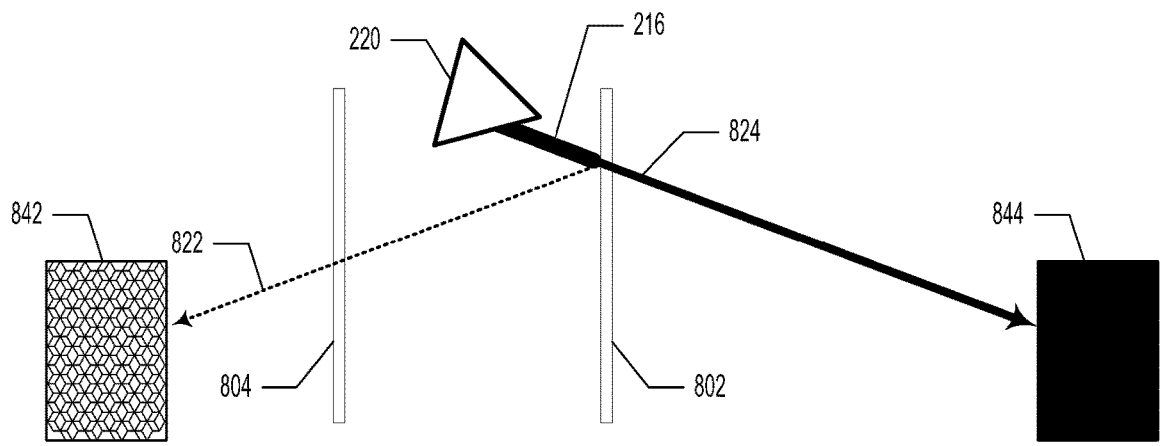
FIG. 8E is an illustration of light signals transmitted from a LIDAR system toward a road surface, according to example embodiments.
Figure 8F:
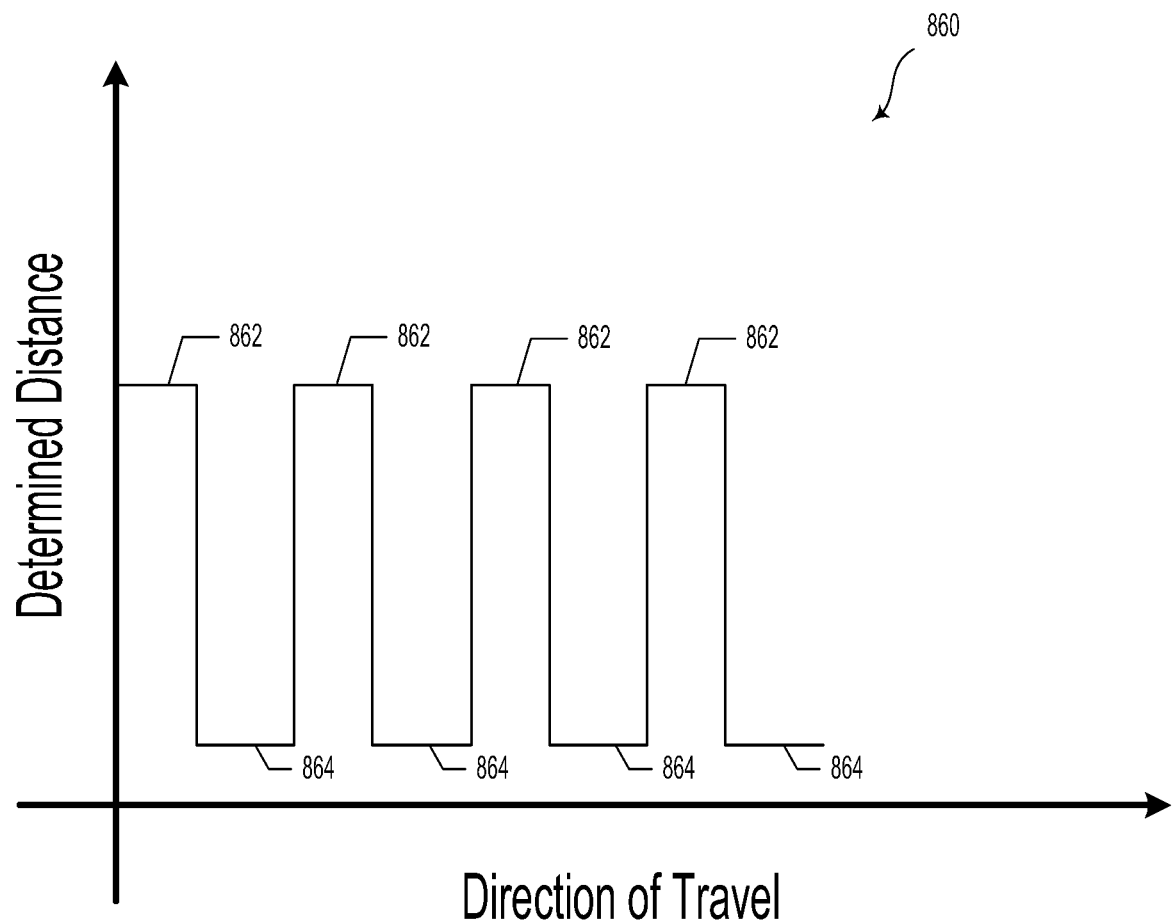
FIG. 8F is an illustration of determined distances to a road surface based on light signals transmitted from a LIDAR system, according to example embodiments.

FIG. 8D is an illustration of a LIDAR system 800 being used to monitor a road surface, according to example embodiments. FIGS. 8D-8F are provided to illustrate one of a myriad of ways in which ghost beams (e.g., the ghost beam 822 illustrated in FIG. 8C) can give rise to incorrect distance determinations for objects within a scene. The LIDAR system 800 illustrated in FIG. 8D may include the components of the LIDAR system 800 shown and described with reference to FIGS. 8A-8C.

In some embodiments, the LIDAR system 800 illustrated in FIG. 8D may be used for object detection and avoidance and/or navigation on an autonomous vehicle or a vehicle operating in an autonomous or semi-autonomous mode. As such, the LIDAR system 800 may travel along a road surface 840 (e.g., along the direction of travel indicated in FIG. 8D by the thin, dashed arrow). As the LIDAR system 800 travels along the road surface 840, the LIDAR system 800 may be located in at least two positions (e.g., a first position indicated by the solid-lined illustration of the LIDAR system 800 and a second position indicated by the dashed-lined illustration of the LIDAR system 800). The road surface 840 may include lane markers 842 (e.g., lane lines) that mark an approximate center of the road surface 840 and edge lines 844 that mark an approximate edge of a lane on the road surface 840. Further, the lane markers 842 may include retroreflectors or retroreflective portions (e.g., such that they brightly reflect light from headlights of traffic traveling on the road surface 840). Conversely, the edge lines 844 may not include retroreflectors or retroreflective portions.

As illustrated in FIG. 8D, and further detailed in FIG. 8E, when the LIDAR system 800 is in the first position illustrated in FIG. 8D, based on internal reflections off of the first optical window 802 within the LIDAR system 800, the ghost beam 822 may be directed toward one of the lane markers 842 (e.g., a retroreflector of the lane marker 842 as illustrated in FIG. 8E). Additionally, the primary signal 824 may be directed toward one of the edge lines 844 on the road surface 840. This is contrasted with the second position illustrated in FIG. 8D, where, although the primary signal 824 may still be directed toward one of the edge lines 844 on the road surface 840, the ghost beam 822 may be directed toward an unadorned portion of the road surface 840. The unadorned portion of the road surface 840 may be a section of tar or asphalt and, therefore, may not be retroreflective. As the LIDAR system 800 travels along the direction of travel indicated in FIG. 8D, it is understood that the primary signal 824 may continually be directed toward one of the edge lines 844, while the ghost beam 822 may alternate between being directed toward lane markers 842 and toward unadorned portions of the road surface 840.

FIG. 8F is an illustration of determined distances to the road surface 840 based on light signals transmitted by the LIDAR system 800 illustrated in FIG. 8D, according to example embodiments. The determined distances are presented in a graph 860 depicting the determined distance as a function of location along the direction of travel. If the LIDAR system 800 does not include a technique for acknowledging the presence of and compensating for the ghost beam 822, a controller of the LIDAR system 800 may presume that the distance that is being determined at any given position along the direction of travel is the distance to the edge line 844, because the edge line 844 is the region of the road surface 840 toward which the primary signal 824 is being directed. Hence, if the existence of the ghost beam 822 is unknown or unaccounted for, a controller of the LIDAR system 800 may determine, based on the return time of any optical signal (not solely the primary signal 824), a distance to the region of the road surface 840 toward which the primary signal 824 is being directed. If, however, the ghost beam 822 is reflected by an object in the environment (e.g., the lane markers 842) and is detected by a light detector of the LIDAR system 800 prior to detection of the reflected primary signal 824 and/or if the intensity of the reflected ghost beam 822 surpasses the intensity of the reflected primary signal 824, a controller of the LIDAR system 800 and/or the light detector may erroneously equate the distance to the lane marker 842 (based on the timing of the reflected ghost beam 822) to the distance to the region of the road surface 840 toward which the primary signal 824 is being directed (e.g., to the distance to the edge line 844). Depending on the processing algorithms of the LIDAR system 800, the reflected ghost beam 822 may lead to additional returns being detected by the LIDAR system 800 (e.g., leading to an inaccurate point cloud). Additionally or alternatively, the reflected ghost beam 822 may lead to error because the distance to the lane marker 842 is not necessarily the same as the distance to the region of the road surface 840 toward which the primary signal 824 is being directed. Still further, the reflected ghost beam 822 may lead to error because internal reflections within the LIDAR system 800 increase the transit time of the ghost beam 822 relative to the primary signal 824 even for distances that would otherwise be the same.

Such erroneous detection events may be most prominent (or even may only exist at all) when the ghost beam 822 is directed toward retroreflective objects (e.g., the lane markers 842, stop signs, traffic signs, construction signs, retroreflective safety clothing worn by pedestrians or bikers, retroreflectors on a bike, retroreflective portions of other vehicles, etc.), because retroreflective objects ensure a high-intensity reflection from the object in the scene. Because the ghost beam 822 may initially have an intensity that is a fraction of the intensity of the primary signal 824, a high-intensity reflection of the ghost beam 822 may be required if the intensity of the reflected ghost beam 822 is to be roughly equivalent or greater than an intensity of the reflected primary signal 824 at a light detector of the LIDAR system 800. As such, in some embodiments, if both the ghost beam 822 and the primary signal 824 are reflected from retroreflective objects, the intensity of the reflected primary signal 824 may still be significantly greater when detected by a light detector of the LIDAR system 800. Hence, in some situations where the primary signal 824 and the ghost beam 822 are reflected from retroreflective objects (e.g., depending on whether an associated controller is determining distance based on the highest intensity return detected or based on the first return above a threshold intensity detected), erroneous distance detections might not occur.

An example erroneous distance detection as a result of the ghost beam 822 of FIGS. 8D and 8E is illustrated in the graph 860 of FIG. 8F. In FIG. 8F, two determined distances are shown along the direction of travel. The distances determined may correspond to the determined location of the edge line 844 for use in a point cloud, in some embodiments. The determined distances may include a first determined distance 862 and a second determined distance 864 relative to the LIDAR system 800. The first determined distance 862 may be greater than the second determined distance 864, as illustrated. Further, the first determined distance 862 may correspond to positions along the direction of travel where the ghost beam 822 is directed toward the lane marker 842 and the second determined distance 864 may correspond to positions along the direction of travel where the ghost beam 822 is directed toward an unadorned portion of the road surface 840. As described above, in some embodiments, only when the ghost beam 822 is directed to a retroreflective object (e.g., the lane marker 842) may the intensity of the reflected ghost beam 822 be high enough to rival the intensity of the reflected primary signal 824. As such, the determined distance may only be incorrect when the ghost beam 822 is being reflected from the lane markers 842 (i.e., the distance to the edge line 844 may actually be equal to the second determined distance 864 meaning the determined distance is only incorrect when the determined distance is the first determined distance 862).

As illustrated in FIG. 8F, the determined distance may be periodic as the ghost beam 822 alternates between being directed toward one of the lane markers 842 to being directed toward an unadorned section of the road surface 840. The ghost beam 822 may alternate between one and the other as the LIDAR system 800 (e.g., and an associated autonomous vehicle) move along the direction of travel. As illustrated, the period of the determined distance, the value of the first determined distance 862, the value of the second determined distance 864, the width of each first determined distance 862 section, and the width of each second determined distance 864 section are constant in the graph 860. The graph 860 of determined distances with respect to the direction of travel illustrated in FIG. 8F is presented as an example only. The illustration in FIG. 8F may correspond to an actual detection in embodiments where the lane markers 842 are evenly spaced along the road surface 840, the LIDAR system 800 is traveling at a constant velocity, and the road surface 840 (both underneath the lane markers 842 and underneath the edge line 844) is even. However, if the LIDAR system 800 is accelerating or decelerating while traveling, the lane markers 842 are unevenly spaced, or the road surface 840 is uneven, the graph 860 might look different than illustrated.

In addition to or instead of erroneously determined distances, ghost beams (e.g., the ghost beam 822 illustrated in FIGS. 8C-8E) can result in other spurious detections by a light detector of the LIDAR system 800. In some embodiments, ghost beams can result in multiple returns for a given primary signal 824. For example, if the LIDAR system 800 emits a modulated primary signal that is pulsed at a given frequency, the LIDAR system 800 may perform object detection (in the absence of ghost beams) by evaluating a single return signal for each primary signal pulse. If, however, multiple returns are generated, and consequently detected, as a result of a single primary signal pulse, additional detection errors could result. For instance, a point cloud data generated using the multiple returns could appear to have floating objects (e.g., floating lane markers) as a result of the ghost beams. Such floating objects could appear intermittently in the generated point clouds, in some embodiments.

Figure 9A:
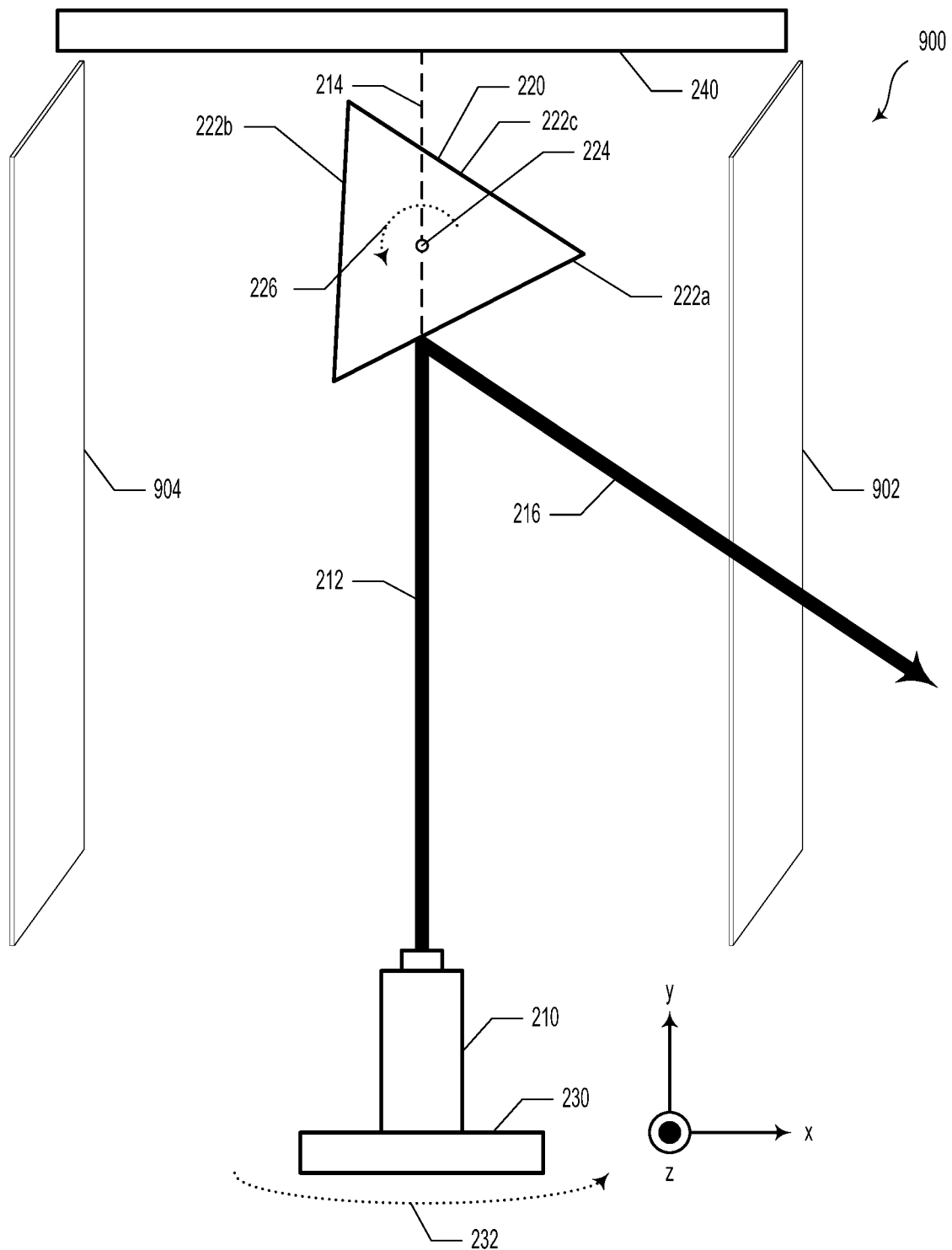
FIG. 9A is an illustration of a LIDAR system, according to example embodiments.

Presented in FIGS. 9A-10A are example techniques of mitigating the potential issues described above with respect to ghost beams 812/822 and erroneously determined distances. FIG. 9A illustrates a first technique for mitigating erroneous distance detections from ghost beams. FIG. 9A is an illustration of a LIDAR system 900, according to example embodiments. The LIDAR system 900 may be similar to the LIDAR system 800 illustrated in FIGS. 8A-8C, for example. As in the LIDAR system 800 described above, the LIDAR system 900 illustrated in FIG. 9A may include components of the optical system 200 illustrated in FIG. 2A (e.g., the mirror element 220, the light emitter 210, the base 230, the beam stop 240, etc.), as well as a light detector (e.g., a light detector similar to the light detector 540 illustrated in FIG. 6 and positioned at a z-location such that it is behind and occluded by the light emitter 210 and the base 230 illustrated in FIG. 9A). Further, the LIDAR system 900 in FIG. 9A may include optical windows 802/804. However, unlike the LIDAR system 800 in FIGS. 8A-8C, the optical windows in the LIDAR system 900 may be angled relative to the mirror element 220.

In some embodiments, the LIDAR system 900 may include a first angled optical window 902 and a second angled optical window 904. One technique of reducing or eliminating ghost beams that result in spurious distance determinations may include angling one or both of the optical windows relative to the mirror element 220, as illustrated in FIG. 9A. The first angled optical window 902 and the second angled optical window 904 may be angled such that each reflective facet (i.e., reflective surface) of the plurality of reflective facets (i.e., reflective surfaces 222a/222b/222c) remains non-parallel to the angled optical windows 902/904 as the multi-faceted mirror (i.e., the mirror element 220) rotates about the second axis 224. In various embodiments, remaining "non-parallel" to the angled optical windows 902/904 may include angles of the angled optical windows 902/904 such that the plurality of reflective facets have an angle of at least 0.01°, 0.1°, 1°, 2°, 3°, 4°, 5°, 6°, 7°, 8°, 9°, 10°, etc. with respect to the angled optical windows 902/904 for each angular position of the mirror element 220 about the second axis 224 (e.g., an angle between 5° and 15°, such as an angle between 9.5° and 10.5°). In other words, the angled optical windows 902/904 may each be non-parallel (e.g., an angle between 5° and 15°, such as an angle between 9.5° and 10.5°) relative to a plane of rotation of the multi-faceted mirror (i.e., the mirror element 220). Being non-parallel relative to the plane of rotation of the multi-faceted mirror may include the angled optical windows 902/904 being rotated about any axis that lies within the plane of rotation of the multi-faceted mirror. For example, as illustrated in FIG. 9A, the plane of rotation of the multi-faceted mirror is the x-y plane. Hence, the angled optical windows 902/904 being non-parallel relative to the plane of rotation may include rotations of the angled optical windows 902/904 about the x-axis (or an axis parallel to the x-axis), rotations about the y-axis (or an axis parallel to the y-axis), or rotations about a superposition of the x-axis and the y-axis (an a superposition of axes parallel to the x-axis and the y-axis, respectively). Further, in some embodiments, the angled optical windows 902/904 may remain non-parallel to the plurality of reflective facets for all angles of the multi-faceted mirror as the multi-faceted mirror rotates about the second axis 224. In other embodiments, however, the angled optical windows 902/904 may remain non-parallel to the plurality of reflective facets for only some angles of the multi-faceted mirror as the multi-faceted mirror rotates about the second axis 224.

As illustrated, in some embodiments, the first angled optical window 902 and the second angled optical window 904 may be positioned such that the angled optical windows 902/904 are rotated about respective axes. Such axes may be parallel to the first axis 214 (e.g., the angled optical windows 902/904 may be rotated about axes that are perpendicular to the illustrated x-z plane), in some embodiments. In some embodiments, the angled optical windows 902/904 may be movable/reorientable/rotatable (e.g., using a stage controlled by a controller).

Angling one or both of the optical windows may attenuate or eliminate ghost beams prior to the ghost beams being transmitted to an environment. For example, when the reflected light 216 is reflected from the first angled optical window 902, an intensity of the reflection (i.e., an intensity of the ghost beam) may be less than the intensity of the reflection if the reflected light 216 were reflected from a non-angled optical window (e.g., the first optical window 802 illustrated in FIGS. 8A-8C). Additionally or alternatively, any ghost beam that is generated as a result of the reflected light 216 being reflected from the first angled optical window 902 may be directed toward a non-reflective, interior portion of the LIDAR system 900 and thereby absorbed (as opposed to being directed to the environment around the LIDAR system via the second optical window 804, as illustrated in FIG. 8C). In addition to reducing the intensity of and/or redirecting ghost beams, the use of an angled optical window (e.g., the first angled optical window 902) may improve transmission of the reflected light 216 to the environment surrounding the LIDAR system 900 (i.e., may increase the intensity of primary signals, similar to the primary signals 814/824 illustrated in FIGS. 8B and 8C). By enhancing the transmission of the reflected light 216 to the environment surrounding the LIDAR system 900, a ratio of the intensity of a primary signal to a ghost signal may be improved (e.g., when compared to the same ratio that would occur as in the LIDAR system 800 of FIGS. 8B and 8C), thereby reducing the likelihood that a controller (e.g., of the LIDAR system 900 and/or of a light detector of the LIDAR system 900) erroneously uses a ghost signal rather than a primary signal to determine a distance to a target object within the scene.

In some embodiments, the degree to which the first angled optical window 902 and the second angled optical window 904 are angled may be between about 4° and about 6° (the angles being measured relative to 0°, which is illustrated in FIG. 8A, for example). Other angles are also possible (e.g., between about 5° and about 15°, such as between about 9.5° and about 10.5°). For example, any angle may be used that is less than the critical angle of the material used to fabricate the angled optical windows 902/904 (i.e., any angle less than the angle at which total internal reflection begins to occur at the optical window/external environment interface based on an incident angle of the reflected light 216 on the angled optical windows 902/904). In some embodiments (e.g., embodiments where the polarization of the emitted light 212 and/or the reflected light 216 are predetermined), the angle of the first angled optical window 902 and/or the angle of the second angled optical window 904 may be set to the Brewster's angle of the optical window/external environment interface in order to maximize transmission of the reflected light 216.

As illustrated in FIG. 9A, the first angled optical window 902 and the second angled optical window 904 may be substantially parallel to one another (i.e., a vector normal to an interior surface of the first angled optical window 902 may be about parallel to a vector normal to an interior surface of the second angled optical window 904). In various embodiments, two angled optical windows being "substantially parallel" to one another may correspond to the optical windows being within 0.01°, 0.1°, 1°, 2°, or 3° of exactly parallel.

Figure 9B:
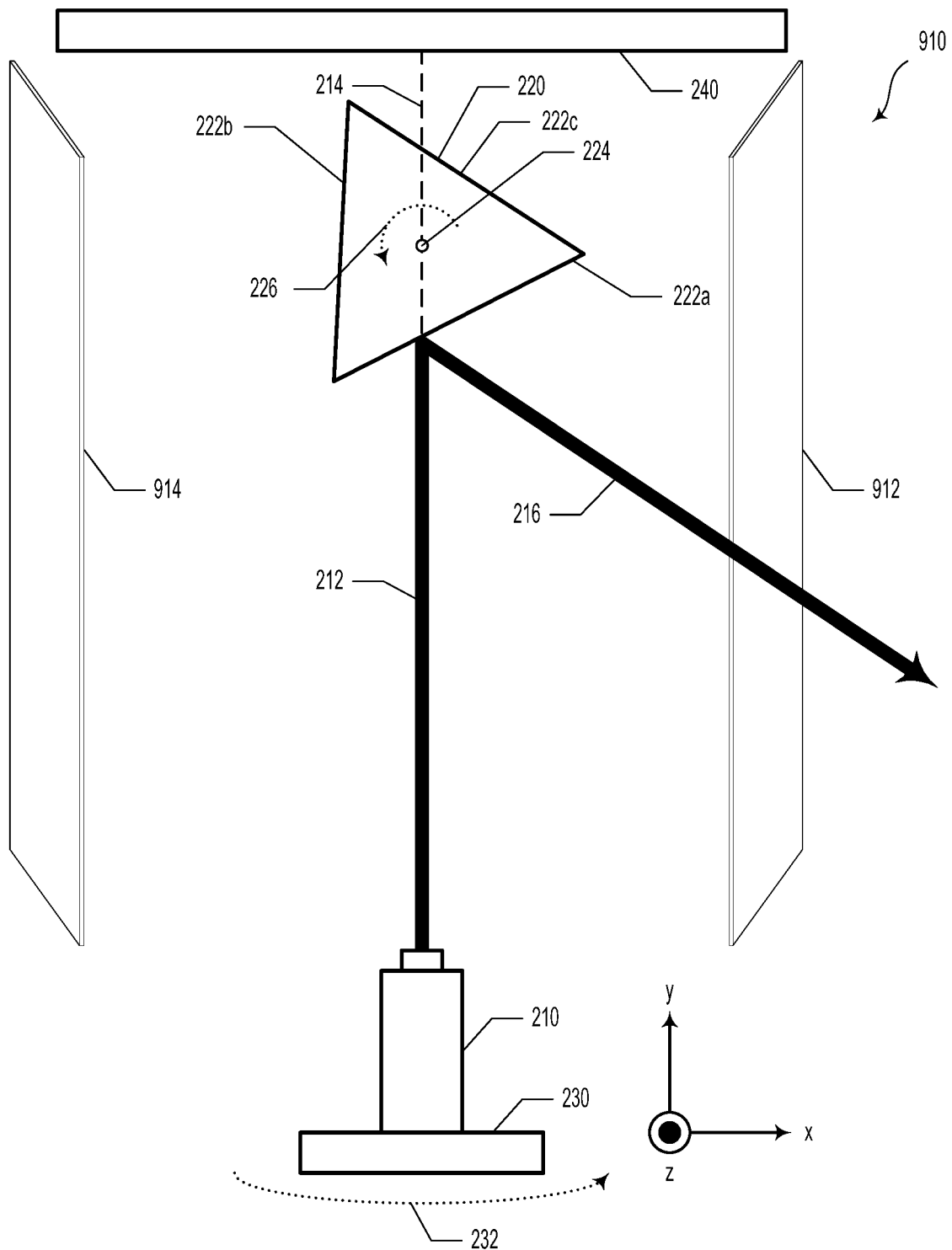
FIG. 9B is an illustration of a LIDAR system, according to example embodiments.

In alternate embodiments, the optical windows may be angled in such a way that they are not substantially parallel with one another. For example, FIG. 9B is an illustration of a LIDAR system 910 having non-substantially parallel optical windows. The LIDAR system 910 illustrated in FIG. 9B may be identical to the LIDAR system 900 shown and described with reference to FIG. 9A, with the exception that the optical windows 912/914 in the LIDAR system 910 of FIG. 9B are not oriented in the same way as the optical windows 902/904 in the LIDAR system 900 of FIG. 9A.

As illustrated in FIG. 9B, the optical windows 912/914 may be angled oppositely of one another (e.g., a first angled optical window 912 may be angled at 5° relative to the mirror element 220, whereas a second angled optical window 914 may be angled at −5° relative to the mirror element 220). In various embodiments, the optical windows 912/914 may be oriented at angles of +1°/−1°, −1°/+1°, +2°/−2°, −2°/+2°, +3°/−3°, −3°/+3°, +4°/−4°, −4°/+4°, +5°/−5°, −5°/+5°, +6°/−6°, −6°/+6°, +7°/−7°, −7°/+7°, +8°/−8°, −8°/+8°, +9°/−9°, −9°/+9°, +10°/−10°, or −10°/+10°, respectively, relative to the mirror element 220. Other angular orientations are also possible.

In other embodiments, the optical window in a LIDAR system may have non-symmetric angular orientations. For example, one optical window may be angled at about 5° relative to the mirror element 220, while another optical window may be angled at about −3° relative to the mirror element 220. In another example, one optical window may be angled at about 6° relative to the mirror element 220, while another optical window may be angled at about 4° relative to the mirror element 220. In yet another example, one optical window may be angled at −7° relative to the mirror element 220, while another optical window may be angled at about −3° relative to the mirror element 220. Alternative sets of angular orientations for optical windows within a LIDAR system are also possible and contemplated herein. Using non-substantially parallel optical window arrangements might further reduce interior reflections, thereby reducing a number of generated ghost beams.

In addition to or instead of angling optical windows, light-absorbing structures may be used within a LIDAR system to prevent or attenuate propagation of interior reflections within the LIDAR system, thereby preventing ghost signals from being detected and/or preventing ghost signals from leading to erroneous distance determinations. Example light-absorbing structures used in a LIDAR system may include the baffles 702 on the spindle 512 illustrated in FIGS. 7A and 7B.

Figure 9C:
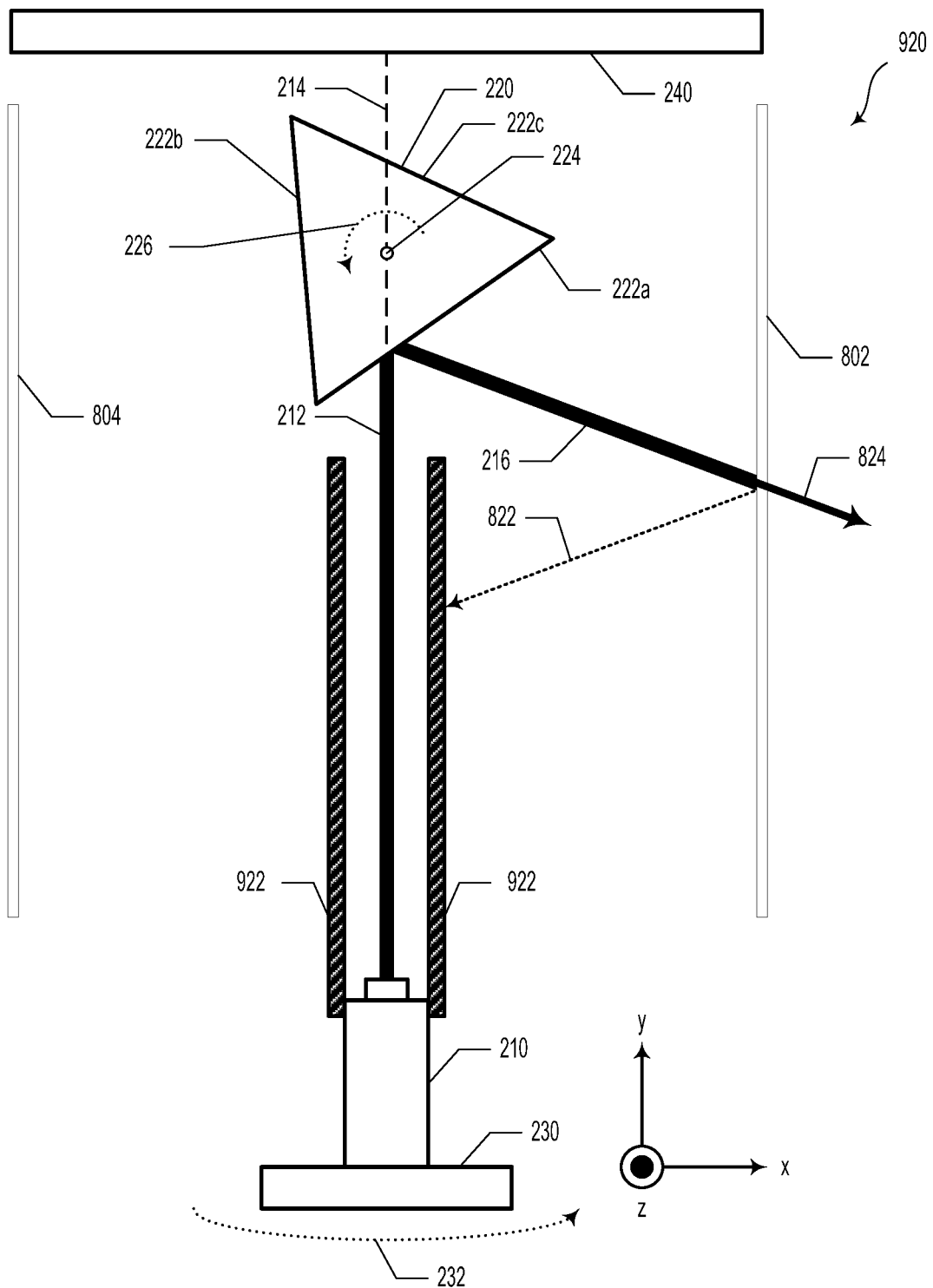
FIG. 9C is an illustration of a LIDAR system, according to example embodiments.

Another example of light-absorbing structures includes vertically oriented baffles. An example LIDAR system 920 that includes vertically oriented baffles 922 is illustrated in FIG. 9C. The LIDAR system 920 illustrated in FIG. 9C may be identical to the LIDAR system 800 shown and described with reference to FIGS. 8A-8C, with the addition of the vertically oriented baffles 922. As illustrated, the vertically oriented baffles 922 may be positioned parallel to the y-z plane and adjacent to the light emitter 210 (e.g., flanking the light emitter 210 such that emitted light 212 is permitted to reach the mirror element 220 but a ghost beam 822 reflected from the first optical window 802 is absorbed by the vertically oriented baffles 922).

The vertically oriented baffles 922 may be absorptive (e.g., the vertically oriented baffles 922 may include a material specifically designed to absorb wavelengths of light emitted by the light emitter 210). For example, the vertically oriented baffles 922 may include a surface made of blackened steel. Additionally or alternatively, the vertically oriented baffles 922 may be made from plastic, aluminum, steel, or BoPET. In some embodiments, additional or alternative absorptive baffles may be included in the LIDAR system 920. As such, greater or fewer than two absorptive baffles 922 may be included (e.g., one, three, four, five, six, seven, eight, nine, ten, etc. absorptive baffles may be included in the LIDAR system 920).

Additionally or alternatively, other positions of baffles within the LIDAR system 920 to absorb internal reflections/attenuate ghost beams are also possible. For example, one or more baffles may be located parallel to the y-z plane near the top of the LIDAR system 920 (e.g., positioned at an x-location between the mirror element 220 and the first optical window 802 and at a greater y-location than the second axis 224 or positioned at an x-location between the mirror element 220 and the second optical window 804 and at a greater y-location than the second axis 224). Additionally or alternatively, two absorptive baffles may be vertically oriented and positioned substantially parallel to the first optical window 802 and flanking the reflected light 216 (i.e., one absorptive baffle positioned at a z-location less than the z-location of the reflected light 216 and another absorptive baffle positioned at a z-location greater than the z-location of the reflected light 216).

Additionally, in some embodiments, an angular orientation of one or more of the optical windows (e.g., the first optical window 802 and/or the second optical window 804) relative to the mirror element 220 may be chosen such that ghost beams generated as a result of reflections off of the respective optical window are directed towards baffles that will absorb or scatter the ghost beams. Such absorption or scattering may prevent the respective ghost beam from being directed to and reflected from objects in the scene. Such absorptive/scattering baffles may each be substantially parallel to the x-y plane (e.g., within 1°, 5°, 10°, or 15° of parallel with the x-y plane) such that the respective baffle does not interfere with beams emitted by the light emitter 210 toward the mirror element 820 (i.e., the emitted light 212) or with beams reflected by the mirror element 820 and directed toward the scene (i.e., the reflected light 216). In other words, each baffle may be oriented such that the baffle does not interfere with the primary signal 824 being transmitted by the LIDAR system 920. In some embodiments, such absorptive/scattering baffles may be fixed relative to the base 230 or to the mirror element 220. Further, such absorptive/scattering baffles could be placed on either side of an optical axis of the emitted light 212 and/or the reflected light 216. Additionally or alternatively, such absorptive/scattering baffles could be placed between the receive and transmit beam paths. As examples, light baffle 550 is fixed relative to base 230 and is between the receive and transmit beam paths, and baffle 702 is fixed relative to mirror element 220 and is placed on either side of the beam paths (baffle 702 therefore rotates with respect to other elements in the LIDAR system 920, such as the light emitter 210). In various embodiments, the mirror element 220 may be fixed relative to absorptive/scattering baffles (e.g., baffle 702) or may be in motion (e.g., may rotate) relative to absorptive/scattering baffles (e.g., light baffle 550). Other orientations, positions, and motion relative to the mirror element 220 for absorptive/scattering baffles are also possible and contemplated herein.

Figure 10A:
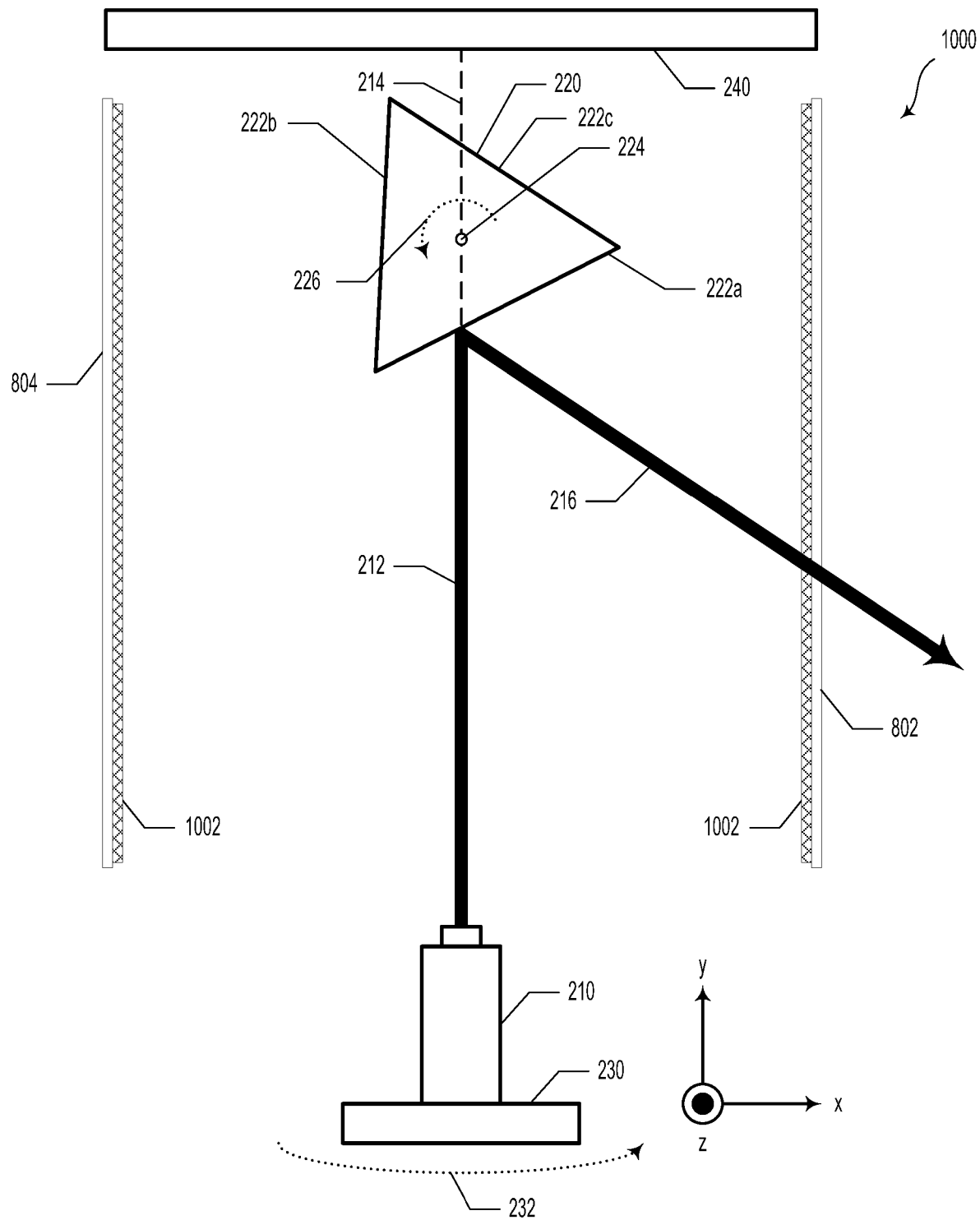
FIG. 10A is an illustration of a LIDAR system, according to example embodiments.

An additional technique for mitigating reflections off of interior sides of optical windows (e.g., off of an interior side of the first optical window 802 and/or an interior side of the second optical window 804) may include the use of one or more anti-reflection coatings. FIG. 10A is an illustration of a LIDAR system 1000, according to example embodiments, that may include anti-reflection coatings 1002 to attenuate or eliminate internal reflections within the LIDAR system 1000.

As illustrated in FIG. 10A, the LIDAR system 1000 may include anti-reflection coatings 1002 on interior sides of the first optical window 802 and the second optical window 804. In various embodiments, the anti-reflection coatings 1002 may cover portions of the interior sides of the optical windows 802/804 or the entirety of the interior sides of the optical windows 802/804. Further, in some embodiments, the anti-reflection coating 1002 on the interior side of the first optical window 802 may be a different size than the anti-reflection coating 1002 on the interior side of the second optical window 804. In some embodiments, in addition to or instead of anti-reflection coatings 1002 on interior sides of the first optical window 802 and the second optical window 804, the LIDAR system 1000 may include anti-reflection coatings on exterior sides of the first optical window 802 and/or the second optical window 804. The anti-reflection coatings 1002 may be designed to reduce internal reflections of the reflected light 216 off of the interior sides of the first optical window 802 and the second optical window 804. In some embodiments without the anti-reflection coatings 1002 (e.g., as in the LIDAR system 800 illustrated in FIGS. 8A-8C), the internal reflections off of the first optical window 802 and the second optical window 804 may range from about 4% to about 100% of the intensity of an incident light signal (e.g., depending on angle of incidence between the first reflective surface 222a and the first optical window 802). Conversely, in various embodiments with the anti-reflection coatings 1002 (e.g., the LIDAR system 1000 illustrated in FIG. 10A), the internal reflections off of the first optical window 802 and the second optical window 804 may be less than about 2% of the intensity of the incident light signal (e.g., for small angles of incidence), between 2% and 10% of the intensity of the incident light signal (e.g., for moderate angles of incidence), and/or between 10% and 30% of the intensity of the incident light signal (e.g., for large angles of incidence). Further, in some embodiments, the anti-reflection coatings 1002 may be designed to reduce reflections for large angles of incidence (e.g., angles of incidence above about 30°, above about 45°, above about 60°, or above about 75°). In addition to reducing the intensity of ghost beams, the inclusion of the anti-reflection coatings 1002 may improve transmission of the reflected light 216 to the environment surrounding the LIDAR system 1000 (i.e., may increase the intensity of primary signals, similar to the primary signals 814/824 illustrated in FIGS. 8B and 8C). By enhancing the transmission of primary signals to the environment surrounding the LIDAR system 1000, a ratio of the intensity of a primary signal to a ghost signal may be improved (e.g., when compared to the same ratio that would occur as in the LIDAR system 800 of FIGS. 8B and 8C), thereby reducing the likelihood that a controller (e.g., of the LIDAR system 1000 and/or of a light detector of the LIDAR system 1000) erroneously uses a ghost signal rather than a primary signal to determine a distance to a target object within the scene.

In addition to or instead of using the techniques described with reference to FIGS. 9A-10A, alternative techniques may be used to attenuate and/or eliminate ghost beams (e.g., thereby eliminating erroneous distance detections resulting from ghost signals). For example, one alternative technique may include reducing a number of optical windows (e.g., eliminating the second optical window 804 illustrated in FIG. 9C) in a LIDAR system. Reducing the number of optical windows may reduce a number of paths from an interior of the LIDAR system to the external environment which can be taken by a ghost beam. As such, ghost beams may be prevented from propagating to an environment surrounding the LIDAR system (e.g., the ghost beam 822 illustrated in FIG. 8C would not be transmitted to the environment surrounding the LIDAR system 800, and would consequently not be detected by a light detector of the LIDAR system 800). Removing one or more of the optical windows may limit the emission angle range 268 (e.g., as illustrated in FIG. 2C) of the light emitter 210 for a given angular position of the base 230, however.

Figure 10B:
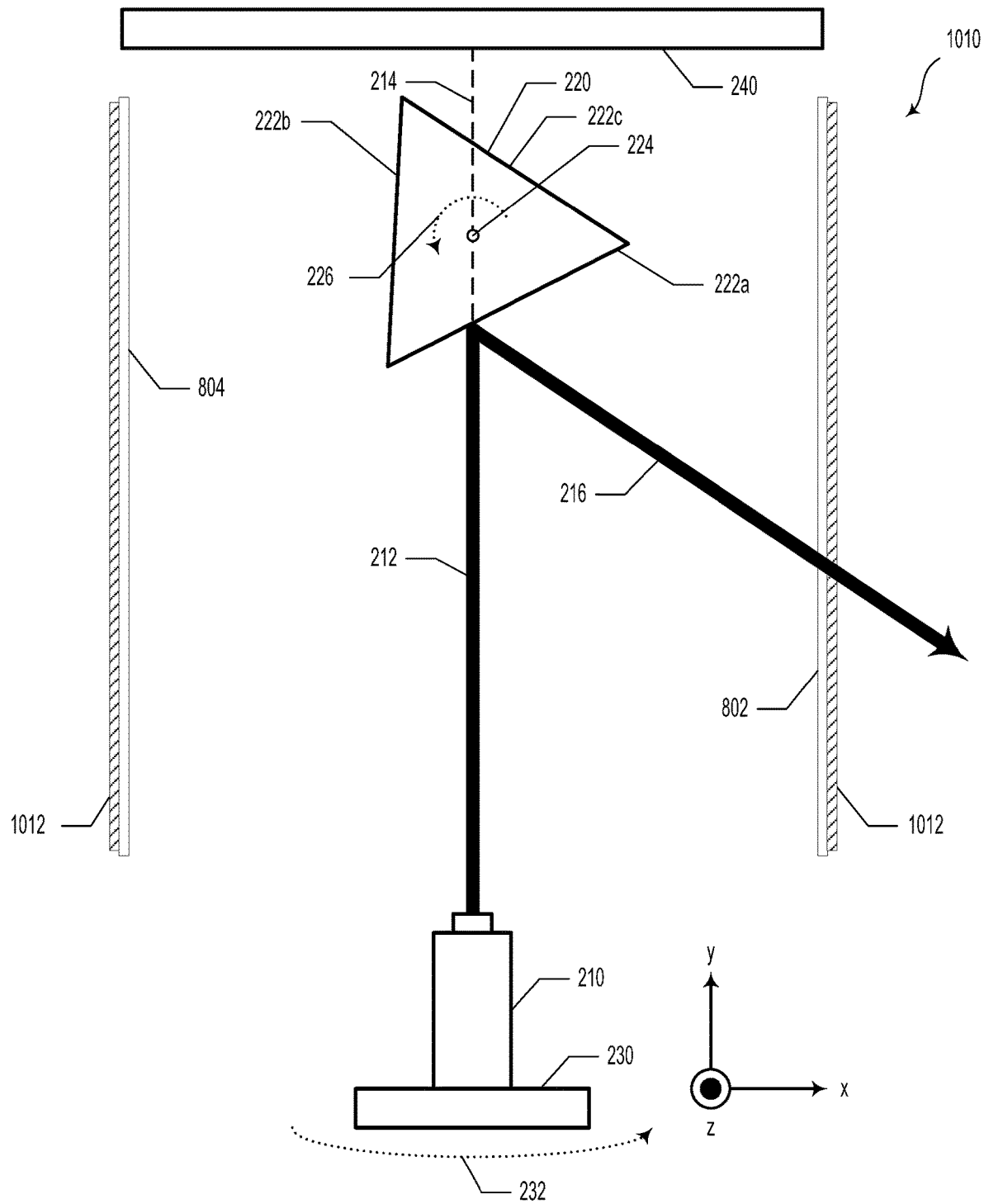
FIG. 10B is an illustration of a LIDAR system, according to example embodiments.

FIG. 10B is an illustration of a LIDAR system 1010, according to example embodiments. The LIDAR system 1010 may be similar to the LIDAR system 800 illustrated in FIGS. 8A-8C, for example. As in the LIDAR system 800 described above, the LIDAR system 1010 illustrated in FIG. 10B may include components of the optical system 200 illustrated in FIG. 2A (e.g., the mirror element 220, the light emitter 210, the base 230, the beam stop 240, etc.), as well as a light detector (e.g., a light detector similar to the light detector 540 illustrated in FIG. 6 and positioned at a z-location such that it is behind and occluded by the light emitter 210 and the base 230 illustrated in FIG. 10B). Further, the LIDAR system 1010 in FIG. 10B may include optical windows 802/804. However, unlike the LIDAR system 800 in FIGS. 8A-8C, the LIDAR system 1010 may also include optical filters 1012. The optical filters 1012 may cover a portion of an exterior side of a respective optical window 802/804. In some embodiments, the optical filters 1012 may cover an entirety of the exterior side of a respective optical window 802/804. Further, in some embodiments, the optical filter 1012 on the exterior side of the first optical window 802 may be a different size than the optical filter 1012 on the exterior side of the second optical window 804. Additionally or alternatively, some embodiments may include optical filters that cover at least a portion of an interior side of a respective optical window 802/804.

The optical filters 1012 illustrated in FIG. 10B may be used to reduce ambient light (e.g., light of wavelengths other than the wavelength emitted by the light emitter 210) entering the LIDAR system 1010. In some embodiments, ambient light may cause thermal expansion of components within the LIDAR system 1010 (e.g., thermal expansion of the mirror element 220, the light emitter 210, a light detector, etc.). Thermal expansion can lead to in inaccuracies in measurements. For example, one or more optical components within the LIDAR system 1010 could become misaligned as a result of thermal expansion (e.g., the light emitter 210 is no longer aligned with the mirror element 220 or the mirror element 220 is no longer aligned with the light detector and/or the optical windows 802/804). This can yield particularly inaccurate results if various components of the LIDAR system 1010 are fabricated from different materials (thereby having different coefficients of thermal expansion resulting in incongruent expansions as a result of heating).

Other deleterious thermal effects can also be caused by ambient light. For example, heating of a light detector within the LIDAR system 1010 can result in a modification of the optical sensitivity of the light detector (e.g., if the light detector includes one or more SiPMs, APDs, or other semiconductor devices). Additionally or alternatively, heating of the light emitter 210 (e.g., if the light emitter 210 is a laser diode) can result in thermal drift of a gain medium and/or resonator of the light emitter 210, which can in turn lead to a change in the output wavelength of the light emitter 210. A change in light emitter 210 wavelength can lead to inaccurate detections (e.g., because a corresponding light detector is tuned to be sensitive to a different wavelength and/or because one or more optical components of the LIDAR system 1010, such as optical filters, are tuned to filter out wavelengths other than the original wavelength emitted light emitter 210, i.e., the wavelength of the light emitter 210 emitted prior to any thermal changes). Any and all of the preceding issues may be particularly detrimental when the ambient light includes high-intensity sunlight.

For at least the foregoing reasons, some embodiments may include one or more techniques for mitigating an amount of ambient light entering a LIDAR system. For example, the LIDAR system 1010 illustrated in FIG. 10B includes the optical filters 1012. The optical filters 1012 may include various types of filters (e.g., polarization filters, dichroic filters, neutral-density filters, etc.) used to reduce ambient light entering the LIDAR system 1010. In an example embodiment, the reflectivity of one or more of the optical filters 1012 with respect to wavelength may correspond to the reflectivity plot illustrated in and described with reference to FIG. 11.

Figure 11:
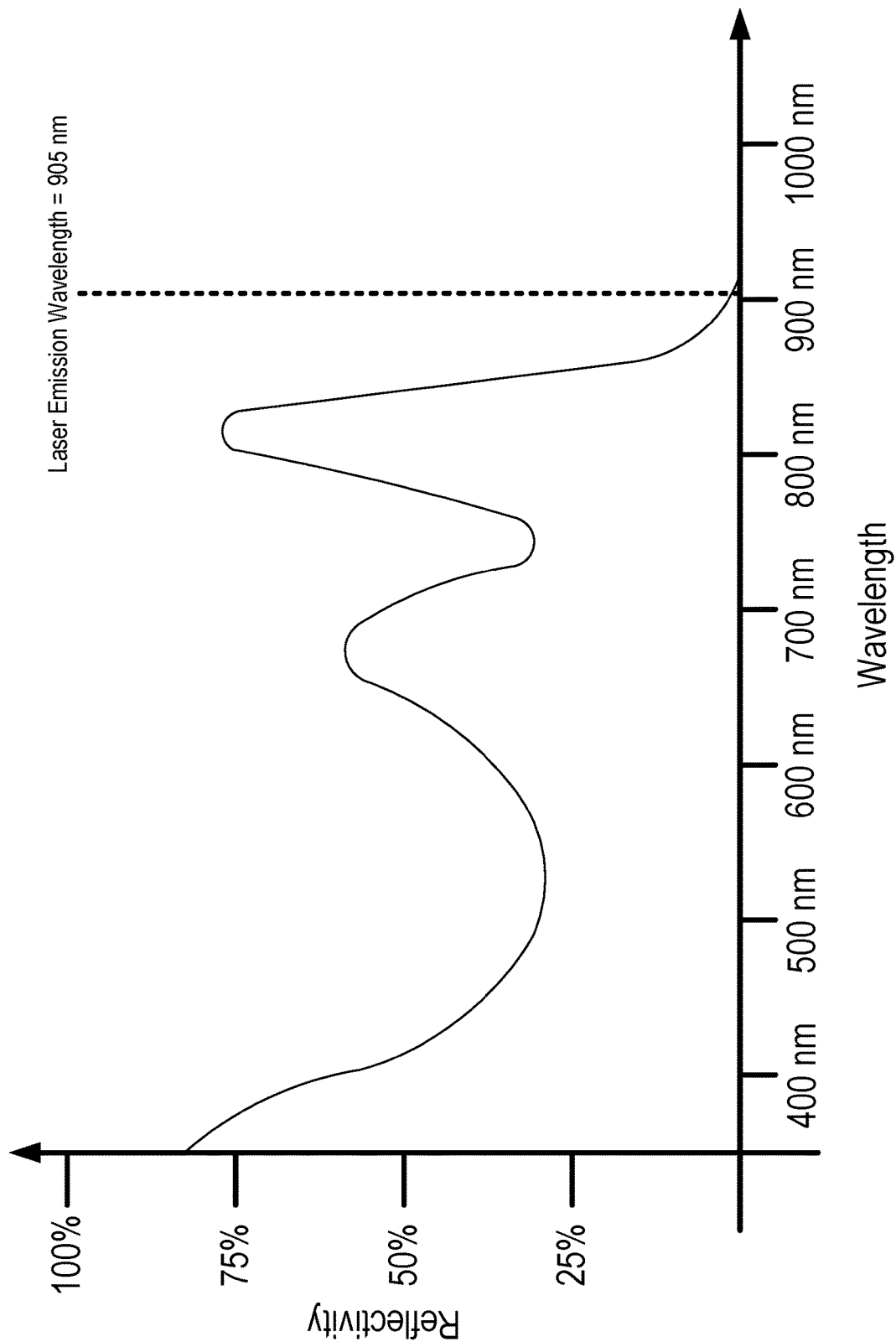
FIG. 11 is an illustration of reflectivity of a filter used in a LIDAR system, according to example embodiments.

FIG. 11 is an illustration of reflectivity of a filter used in a LIDAR system (e.g., one of the optical filters 1012 illustrated in FIG. 10B), according to an example embodiment. In this example, the filter includes one or more dichroic filters. As illustrated, the reflectivity of the filter may be non-zero for wavelengths between about 400 nanometers and about 900 nanometers. As such, the filter may reduce transmission of wavelengths of light within a visible spectrum (e.g., wavelengths between about 400 nanometers and about 700 nanometers). In some embodiments, the average reflectivity across visible wavelengths may be between about 40% and about 60% (e.g., about 50% or at least about 50%). In alternate embodiments, the average reflectivity across visible wavelengths may have other values (e.g., above 95%, above 90%, above 85%, above 80%, above 75%, above 70%, above 65%, above 60%, above 55%, above 50%, above 45%, above 40%, above 35%, above 30%, above 25%, above 20%, above 15%, above 10%, or above 5%). Additionally, in alternate embodiments, the reflectivity across the visible spectrum may be substantially constant (e.g., less variable than illustrated). In various embodiments, a "substantially constant" reflectivity across the visible spectrum may include only reflectivities that are within 0.1%, 1%, 2%, 3%, 4%, 5%, 10%, 15%, or 20% of each other across the entirety of the visible spectrum. In embodiments having a substantially constant reflectivity across the visible spectrum, the optical filter 1012 may act as a perceptually un-tinted mirror for light within the visible spectrum (e.g., the optical filter 1012 may appear to an observer exterior to the LIDAR system as a standard mirror). Other techniques of achieving a perceptually un-tinted mirror are also possible (e.g., reflectivities that are not substantially constant across the visible spectrum, but that still appears un-tinted based on color receptors in eyes of observers). It is understood that the specifications of optical filters in the LIDAR system (e.g., the optical filters 1012 illustrated in FIG. 10B) may depend on the number of dielectric layers used to fabricate the respective optical filter. For example, the values of the reflectivity across the visible spectrum and the amount of variation of reflectivity values across the visible spectrum may depend on the number of dielectric layers. Hence, to flatten the spectral reflectivity of the optical filter or to increase any given reflectivity value within the spectrum, additional dielectric layers may be included in the optical filter. Adding additional dielectric layers may correspond to additional time and/or difficulty in fabricating the optical filter.

Further, the filter from which the plot in FIG. 11 is generated may be designed to have a high transmissivity (e.g., greater than 75%, greater than 80%, greater than 85%, greater than 90%, greater than 95%, greater than 99%, or greater than 99.9%) for a wavelength corresponding to the wavelength of light emitted by a light emitter of the LIDAR system (i.e., a laser emission wavelength). As illustrated, this may correspond to a low reflectivity for a wavelength of about 905 nm (though other laser emission wavelengths are possible). In some embodiments, the filter may include one or more visible-spectrum neutral-density filters that reduce the transmission of all wavelengths within the visible spectrum approximately equally (e.g., but passes wavelengths in the infrared without attenuation).

III. EXAMPLE PROCESSES

Figure 12:
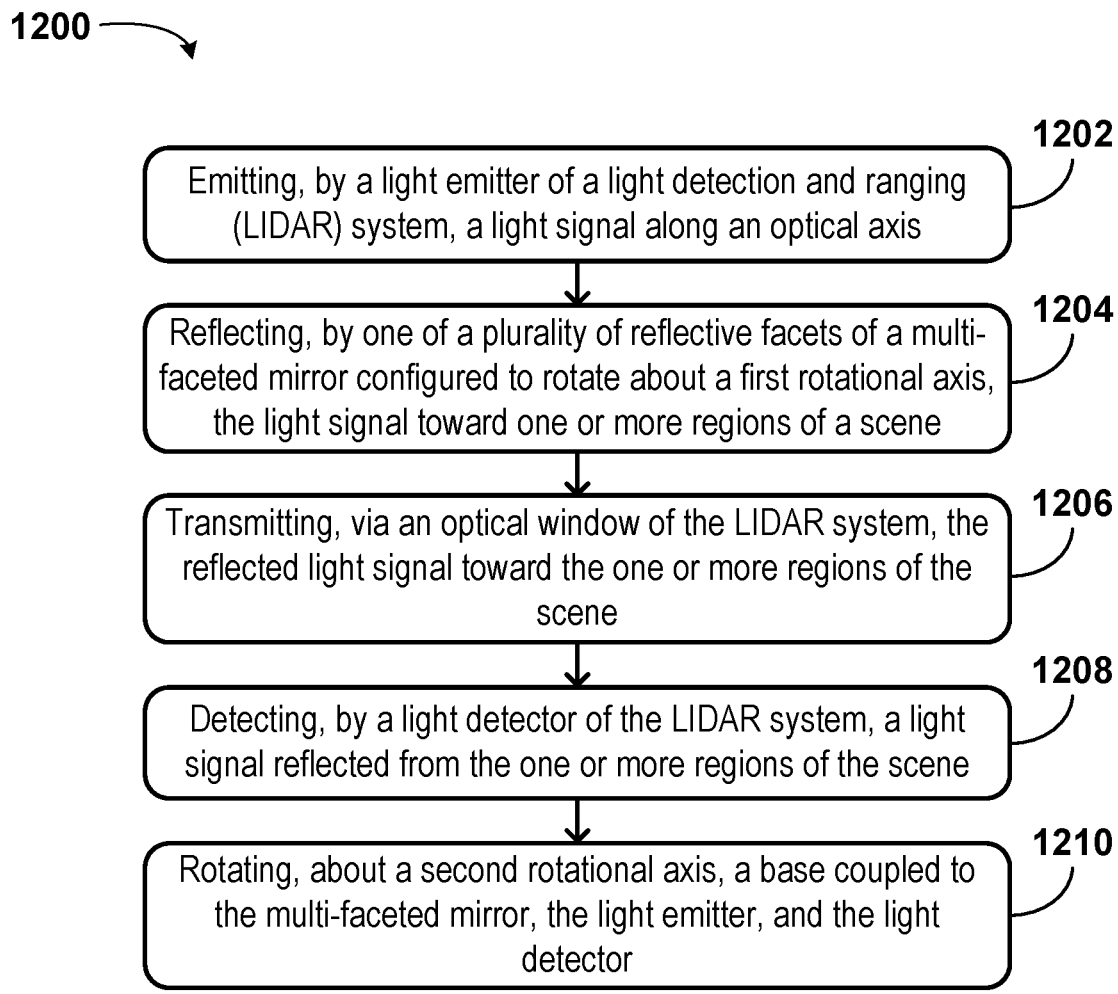
FIG. 12 is an illustration of a method, according to example embodiments.

FIG. 12 is a flowchart diagram of a method 1200, according to example embodiments. One or more blocks of the method 1200 may be performed by a LIDAR system (e.g., by any of the LIDAR systems 900/910/920/1000 illustrated in FIGS. 9A-10A or other LIDAR systems described or contemplated herein), in various embodiments. In some embodiments, one or more of the blocks of the method 1200 may be performed by a computing device (e.g., a controller of one or more components of the LIDAR system). The computing device may include computing components such as a non-volatile memory (e.g., a hard drive or a ROM), a volatile memory (e.g., a random-access memory (RAM), such as dynamic random-access memory (DRAM) or static random-access memory (SRAM)), a user-input device (e.g., a mouse or a keyboard), a display (e.g., an LED display or a liquid-crystal display (LCD)), and/or a network communication controller (e.g., a WIFI® controller, based on IEEE 802.11 standards, or an Ethernet controller). The computing device, for example, may execute instructions stored on a non-transitory, computer-readable medium (e.g., a hard drive) to perform one or more of the operations contemplated herein.

At block 1202, the method 1200 may include emitting, by a light emitter of a light detection and ranging (LIDAR) system, a light signal along an optical axis.

At block 1204, the method 1200 may include reflecting, by one of a plurality of reflective facets of a multi-faceted mirror configured to rotate about a first rotational axis, the light signal toward one or more regions of a scene.

At block 1206, the method 1200 may include transmitting, via an optical window of the LIDAR system, the reflected light signal toward the one or more regions of the scene. In some embodiments, the optical window may be positioned such that each reflective facet of the plurality of reflective facets remains non-parallel to the optical window as the multi-faceted mirror rotates about the first rotational axis. In some embodiments, a filter may cover at least a portion of an exterior side of the optical window. Such a filter may reduce transmission of at least some wavelengths that are not produced by the light emitter. In some embodiments, one or more baffles may be positioned adjacent to one or more non-reflective sides of the multi-faceted mirror. Such baffles may be configured to reduce an amount of power used to rotate the multi-faceted mirror about the first rotational axis.

At block 1208, the method 1200 may include detecting, by a light detector of the LIDAR system, a light signal reflected from the one or more regions of the scene. The light signal reflected from the one or more regions of the scene may be a reflection of the light signal that was reflected from the reflective facet and transmitted via the optical window.

At block 1210, the method 1200 may include rotating, about a second rotational axis, a base coupled to the multi-faceted mirror, the light emitter, and the light detector. The one or more regions of the scene toward which the light signal was directed may have been based on a first rotational angle of the multi-faceted mirror about the first rotational axis and a second rotational angle about the second rotational axis.

IV. CONCLUSION

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, operation, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step, block, or operation that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer-readable medium such as a storage device including RAM, a disk drive, a solid state drive, or another storage medium.

The computer-readable medium can also include non-transitory computer-readable media such as computer-readable media that store data for short periods of time like register memory and processor cache. The computer-readable media can further include non-transitory computer-readable media that store program code and/or data for longer periods of time. Thus, the computer-readable media may include secondary or persistent long term storage, like ROM, optical or magnetic disks, solid state drives, compact-disc read only memory (CD-ROM), for example. The computer-readable media can also be any other volatile or non-volatile storage systems. A computer-readable medium can be considered a computer-readable storage medium, for example, or a tangible storage device.

Moreover, a step, block, or operation that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

It is understood that the use of the terms "first," "second," "third," etc. throughout the disclosure are meant to be used to assist in the understanding of example embodiments and are not meant to be limiting. Further, it is understood that a "first axis" or "first optical window" in one part of the disclosure does not necessarily corresponding to a "first axis" or a "first optical window" in a second part of the disclosure or the claims. For example, the "second axis" in one portion of the disclosure may correspond to the "first rotational axis" in the claims. The use of "first," "second," "third," etc. will be clear from the surrounding context of the usage, however.

What is claimed is:

1. A light detection and ranging (LIDAR) system comprising:
a multi-faceted mirror comprising a plurality of reflective facets, wherein the multi-faceted mirror is configured to rotate about a first rotational axis;
a light emitter configured to emit a light signal along an optical axis, wherein light emitted along the optical axis is reflected from one or more of the reflective facets and is directed toward one or more regions of a scene;
a light detector configured to detect a reflected light signal that is reflected by the one or more regions of the scene, wherein a direction toward which the light emitted along the optical axis is directed is based on a first angle of the multi-faceted mirror about the first rotational axis;
an optical window positioned between the multi-faceted mirror and the one or more regions of the scene such that light reflected from one or more of the reflective facets and directed toward the one or more regions of the scene is transmitted through the optical window, wherein the optical window is positioned such that, for all values of the first angle of the multi-faceted mirror about the first rotational axis as the multi-faceted mirror rotates about the first rotational axis, the optical window is non-perpendicular to the direction toward which the light emitted along the optical axis is directed; and
one or more baffles positioned adjacent to one or more non-reflective sides of the multi-faceted mirror, wherein the one or more baffles are configured to reduce an amount of power used to rotate the multi-faceted mirror about the first rotational axis, and wherein at least one of the one or more baffles is linearly translatable along the first rotational axis.

2. The LIDAR system of claim 1, further comprising a base, wherein the multi-faceted mirror, the light emitter, and the light detector are coupled to the base, wherein the base is configured to rotate about a second rotational axis, and wherein the direction toward which the light emitted along the optical axis is directed is based on a second angle of the base about the second rotational axis.

3. The LIDAR system of claim 1, further comprising an additional optical window positioned on an opposite side of the multi-faceted mirror from the optical window, wherein the additional optical window is positioned between the multi-faceted mirror and at least one of the one or more regions of the scene such that light reflected from one or more of the reflective facets and directed toward the at least one of the one or more regions of the scene is transmitted through the additional optical window, and wherein the additional optical window is positioned such that, for all values of the first angle of the multi-faceted mirror about the first rotational axis as the multi-faceted mirror rotates about the first rotational axis, the additional optical window is non-perpendicular to the direction toward which the light emitted along the optical axis is directed.

4. The LIDAR system of claim 3, wherein the optical window and the additional optical window are non-parallel to one another.

5. The LIDAR system of claim 1, further comprising an anti-reflection coating positioned on at least a portion of an interior side of the optical window.

6. The LIDAR system of claim 1, further comprising one or more additional baffles, wherein the one or more additional baffles are configured to attenuate internal reflections from the optical window.

7. The LIDAR system of claim 6, wherein the one or more additional baffles are positioned between the multi-faceted mirror and the optical window.

8. The LIDAR system of claim 6, wherein the one or more additional baffles comprise a material that absorbs a wavelength of light emitted by the light emitter.

9. The LIDAR system of claim 1, wherein at least one of the one or more baffles comprises regions of a disk attached to at least one of the one or more non-reflective sides of the multi-faceted mirror, and wherein the regions of the disk overhang edges of the multi-faceted mirror.

10. The LIDAR system of claim 1, wherein the optical window is positioned at an angle of between 5° and 15° relative to a plane of rotation of the multi-faceted mirror.

11. The LIDAR system of claim 10, wherein the angle is between 9.5° and 10.5°.

12. A light detection and ranging (LIDAR) system comprising:
a multi-faceted mirror comprising a plurality of reflective facets, wherein the multi-faceted mirror is configured to rotate about a first rotational axis;
a light emitter configured to emit a light signal along an optical axis, wherein light emitted along the optical axis is reflected from one or more of the reflective facets and is directed toward one or more regions of a scene;
a light detector configured to detect a reflected light signal that is reflected by the one or more regions of the scene, wherein a direction toward which the light emitted along the optical axis is directed is based on a first rotational angle of the multi-faceted mirror about the first rotational axis;
an optical window positioned between the multi-faceted mirror and the one or more regions of the scene such that light reflected from one or more of the reflective facets and directed toward the one or more regions of the scene is transmitted through the optical window;
a filter covering at least a portion of an exterior side of the optical window, wherein the filter reduces transmission of at least some wavelengths that are not produced by the light emitter; and
one or more baffles positioned adjacent to one or more non-reflective sides of the multi-faceted mirror, wherein the one or more baffles are configured to reduce an amount of power used to rotate the multi-faceted mirror about the first rotational axis, and wherein at least one of the one or more baffles has a hemispherical shape.

13. The LIDAR system of claim 12, further comprising a base, wherein the multi-faceted mirror, the light emitter, and the light detector are coupled to the base, wherein the base is configured to rotate about a second rotational axis, and wherein the direction toward which the light emitted along the optical axis is directed is based on a second rotational angle of the base about the second rotational axis.

14. The LIDAR system of claim 12, wherein the filter comprises a dichroic filter.

15. The LIDAR system of claim 12, wherein the filter reduces transmission of wavelengths in a visible spectrum.

16. The LIDAR system of claim 12, wherein the filter comprises a neutral-density filter.

17. The LIDAR system of claim 15, wherein the filter is characterized by an average reflectivity value throughout the visible spectrum.

18. The LIDAR system of claim 17, wherein the average reflectivity value throughout the visible spectrum is at least 25%.

19. The LIDAR system of claim 15, wherein a reflectivity of the filter across the visible spectrum is substantially constant such that the filter acts as an un-tinted mirror for light within the visible spectrum.

20. A light detection and ranging (LIDAR) system comprising:
- a multi-faceted mirror comprising a plurality of reflective facets, wherein the multi-faceted mirror is configured to rotate about a first rotational axis;
- a light emitter configured to emit a light signal along an optical axis, wherein light emitted along the optical axis is reflected from one or more of the reflective facets and is directed toward one or more regions of a scene;
- a light detector configured to detect a reflected light signal that is reflected by the one or more regions of the scene, wherein a direction toward which the light emitted along the optical axis is directed is based on a first rotational angle of the multi-faceted mirror about the first rotational axis;
- an optical window positioned between the multi-faceted mirror and the one or more regions of the scene such that light reflected from one or more of the reflective facets and directed toward the one or more regions of the scene is transmitted through the optical window; and
- one or more baffles positioned adjacent to one or more non-reflective sides of the multi-faceted mirror, wherein the one or more baffles are configured to reduce an amount of power used to rotate the multi-faceted mirror about the first rotational axis, and wherein at least one of the one or more baffles is linearly translatable along the first rotational axis.

21. The LIDAR system of claim 20, further comprising a base, wherein the multi-faceted mirror, the light emitter, and the light detector are coupled to the base, wherein the base is configured to rotate about a second rotational axis, and wherein the direction toward which the light emitted along the optical axis is directed is based on a second rotational angle of the base about the second rotational axis.

22. The LIDAR system of claim 20, wherein the one or more baffles comprise at least two baffles, with at least one baffle adjacent to each non-reflective side of the multi-faceted mirror, and wherein the one or more baffles reduce a drag force acting on the multi-faceted mirror when the multi-faceted mirror is rotated about the first rotational axis.

23. The LIDAR system of claim 20, wherein the one or more baffles each have one or more optical apertures defined therein, and wherein the optical apertures define a rotary, optical encoder for an orientation of the multi-faceted mirror.

24. The LIDAR system of claim 23, wherein the one or more optical apertures are arranged in a spiral arrangement.

25. The LIDAR system of claim 20, wherein the multi-faceted mirror and the one or more baffles are attached to a shaft, wherein the shaft is configured to be driven by a motor, and wherein, when the shaft is driven by the motor, the multi-faceted mirror and the one or more baffles rotate about the first rotational axis.

* * * * *